(12) United States Patent
Ta et al.

(10) Patent No.: US 11,089,490 B1
(45) Date of Patent: Aug. 10, 2021

(54) METHODS AND APPARATUS FOR COLLECTING AND/OR USING WIRELESS COMMUNICATION RELATED INFORMATION TO FACILITATE WT MODE OF OPERATION DECISIONS

(71) Applicant: M87, Inc., Bellevue, WA (US)

(72) Inventors: Tuan Ta, Bellevue, WA (US); Vidur Bhargava, Bellevue, WA (US)

(73) Assignee: M87, Inc., San Diego, CA (US)

( * ) Notice: Subject to any disclaimer, the term of this patent is extended or adjusted under 35 U.S.C. 154(b) by 0 days.

(21) Appl. No.: 16/531,008

(22) Filed: Aug. 2, 2019

Related U.S. Application Data

(63) Continuation-in-part of application No. 15/081,821, filed on Mar. 25, 2016, now abandoned.

(60) Provisional application No. 62/139,308, filed on Mar. 27, 2015.

(51) Int. Cl.
 *H04W 24/02* (2009.01)

(52) U.S. Cl.
 CPC .................................. *H04W 24/02* (2013.01)

(58) Field of Classification Search
 None
 See application file for complete search history.

(56) References Cited

U.S. PATENT DOCUMENTS

| | | | |
|---|---|---|---|
| 7,742,497 B2 | 6/2010 | Ganti | |
| 8,265,550 B2 * | 9/2012 | Aaron | H04W 72/085 455/13.1 |
| 8,340,633 B1 * | 12/2012 | Rege | H04M 15/61 455/406 |
| 8,743,758 B1 | 6/2014 | Bhargava et al. | |
| 9,148,908 B2 | 9/2015 | Bhargava et al. | |
| 9,155,124 B2 * | 10/2015 | Bhargava | H04L 5/0057 |
| 9,363,006 B2 | 6/2016 | Bhargava et al. | |
| 9,414,434 B2 | 8/2016 | Bhargava et al. | |
| 9,451,514 B1 | 9/2016 | Michel et al. | |
| 9,578,591 B2 | 2/2017 | Bhargava et al. | |
| 9,788,186 B2 * | 10/2017 | Chatterjee | H04W 8/005 |
| 9,794,949 B2 | 10/2017 | Bhargava et al. | |

(Continued)

OTHER PUBLICATIONS

Croft, "Wi-Fi Service Discovery over 802.11u Using Non-Native Generic Advertising Services (GAS-SD)" May 2014.

(Continued)

*Primary Examiner* — Harry H Kim
(74) *Attorney, Agent, or Firm* — Knobbe, Martens, Olson & Bear, LLP

(57) ABSTRACT

Described herein are devices, networks, systems, media, and methods used to collect WT information and to alter, based on or taking the collected information into consideration, one or more parameters used to control a mode of operation in which WTs decide to operate. In this way the relative portions of WTs operating in a first or second mode in one or more regions can be automatically adjusted by a network control node modifying mode of operation control parameters which are then communicated to the WTs in the region in which the modified WT mode control parameter is to be used. The wireless terminals than make a decision as to the mode of operation in which to operate using the modified mode control parameter and one or more signal measurements or other information available to the WT making the mode of operation decision.

20 Claims, 33 Drawing Sheets

(56) References Cited

U.S. PATENT DOCUMENTS

| | | |
|---|---|---|
| 9,806,791 B2 | 10/2017 | Bhargava et al. |
| 9,942,921 B2 | 4/2018 | Bhargava et al. |
| 9,986,480 B2 | 5/2018 | Ta et al. |
| 10,123,268 B2 | 11/2018 | Bhargava et al. |
| 10,136,311 B2 | 11/2018 | Bhargava et al. |
| 10,205,505 B2 | 2/2019 | Michel et al. |
| 10,206,228 B2 | 2/2019 | Bhargava et al. |
| 10,292,019 B2 | 5/2019 | Ta et al. |
| 10,333,612 B2 | 6/2019 | Bhargava et al. |
| 10,517,027 B2 | 12/2019 | Ta et al. |
| 10,568,139 B2 | 2/2020 | Bhargava et al. |
| 10,575,170 B2 | 2/2020 | Bhargava et al. |
| 2006/0052099 A1 | 3/2006 | Parker |
| 2008/0219214 A1* | 9/2008 | Chen .............. H04W 88/04 370/331 |
| 2009/0168687 A1* | 7/2009 | Li .............. H04W 16/18 370/315 |
| 2010/0167743 A1* | 7/2010 | Palanki ........... H04W 72/02 455/436 |
| 2010/0278110 A1 | 11/2010 | Ozawa |
| 2010/0329148 A1* | 12/2010 | Won ............... H04B 7/15557 370/254 |
| 2012/0213100 A1* | 8/2012 | Cheng ............ H04W 72/005 370/252 |
| 2013/0295921 A1 | 11/2013 | Bhargarva |
| 2013/0308526 A1 | 11/2013 | Jaiswal et al. |
| 2013/0335528 A1 | 12/2013 | Vishwanath et al. |
| 2014/0342738 A1* | 11/2014 | Ishii ............... H04W 28/08 455/436 |
| 2015/0180635 A1* | 6/2015 | Fujishiro .......... H04L 1/1854 370/329 |
| 2015/0351044 A1* | 12/2015 | Boudreau ....... H04W 72/0473 370/329 |
| 2016/0315688 A1 | 10/2016 | Bhargava et al. |
| 2017/0188404 A1 | 6/2017 | Fodor |
| 2017/0215187 A1* | 7/2017 | Panteleev ........ H04L 5/0082 |
| 2018/0014311 A1 | 1/2018 | Bhargava et al. |
| 2019/0253844 A1 | 8/2019 | Ta et al. |

OTHER PUBLICATIONS

Balraj, "Qualcomm Research San Diego: LTE Direct Overview", 2012.

* cited by examiner

Figure 3

| Statistics | Past Hour ▽ (302) | All Devices ▽ (304) | All Base Stations ▽ (306) |
|---|---|---|---|
| Coverage Gain (dB) Avg 16  Hi 32  Low 6 | M87 Signal (dBm) Avg -67  Hi -55  Low -107 | | Cellular Signal (dBm) Avg -80  Hi -55  Low -113 |
| Gateway Data (PB) 15 | Gain (dB) 0 | Wi-Fi (dBm) — | % Time Charging 60 |
| Node Data (PB) 7 | Gain (dB) 16 | Wi-Fi (dBm) -71 | % Time Charging 32 |
| None Data (PB) 1 | Gain (dB) 0 | Wi-Fi (dBm) — | % Time Charging 27 |

1700

| FIGURE 17A |
| FIGURE 17B |
| FIGURE 17C |
| FIGURE 17D |
| FIGURE 17E |
| FIGURE 17F |
| FIGURE 17G |
| FIGURE 17H |
| FIGURE 17I |
| FIGURE 17J |
| FIGURE 17K |
| FIGURE 17L |
| FIGURE 17M |

FIGURE 17

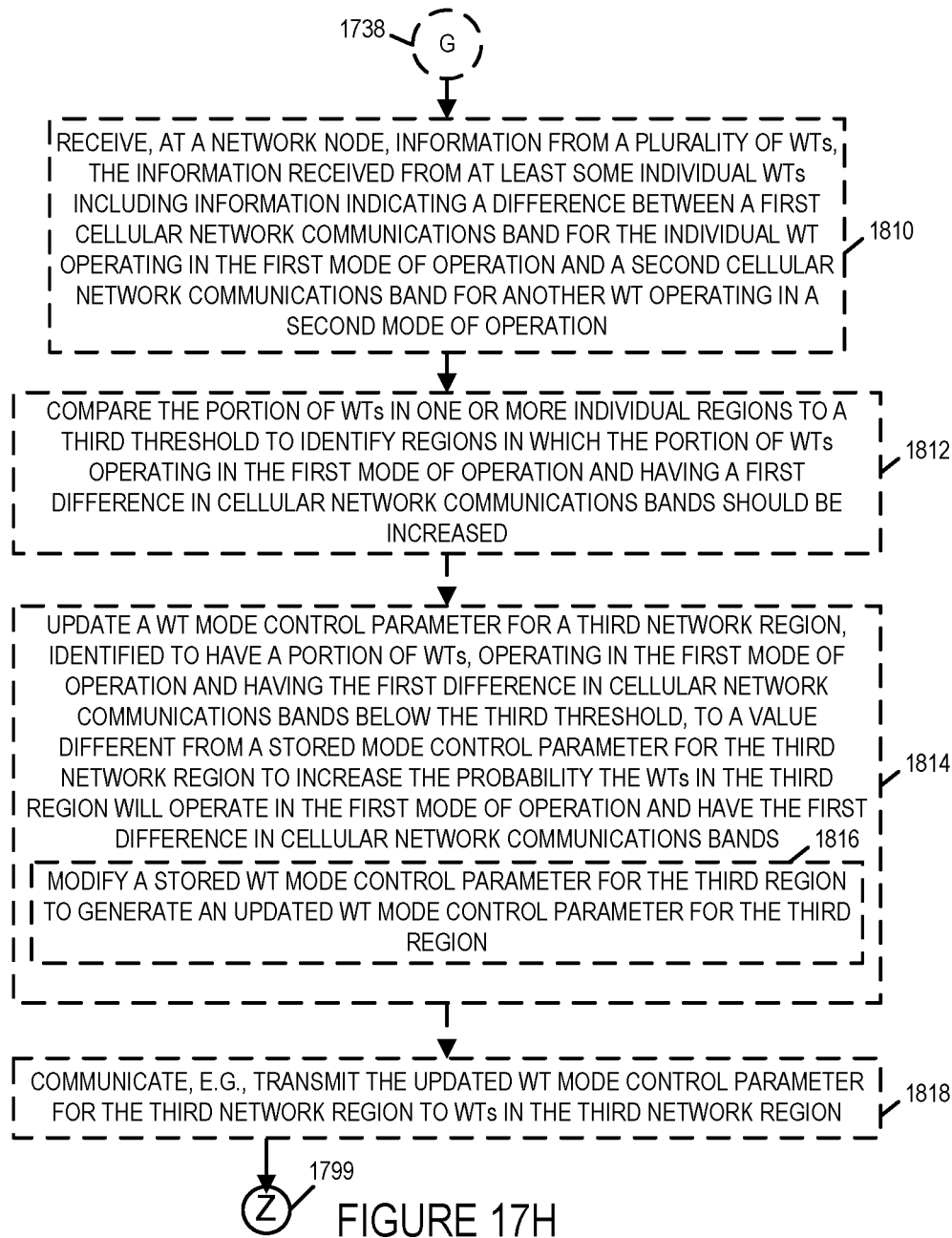

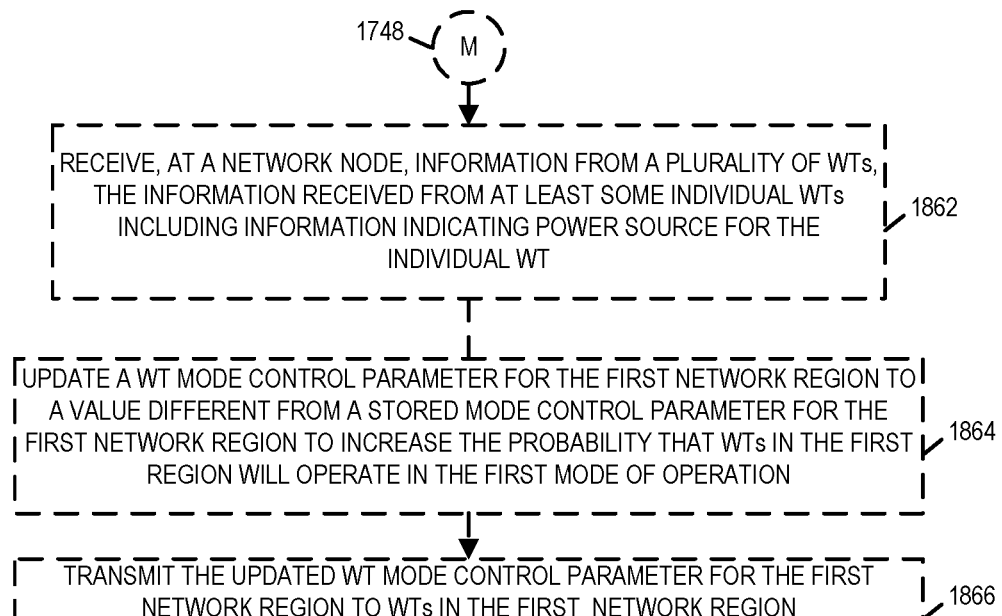
CLAIM 9A
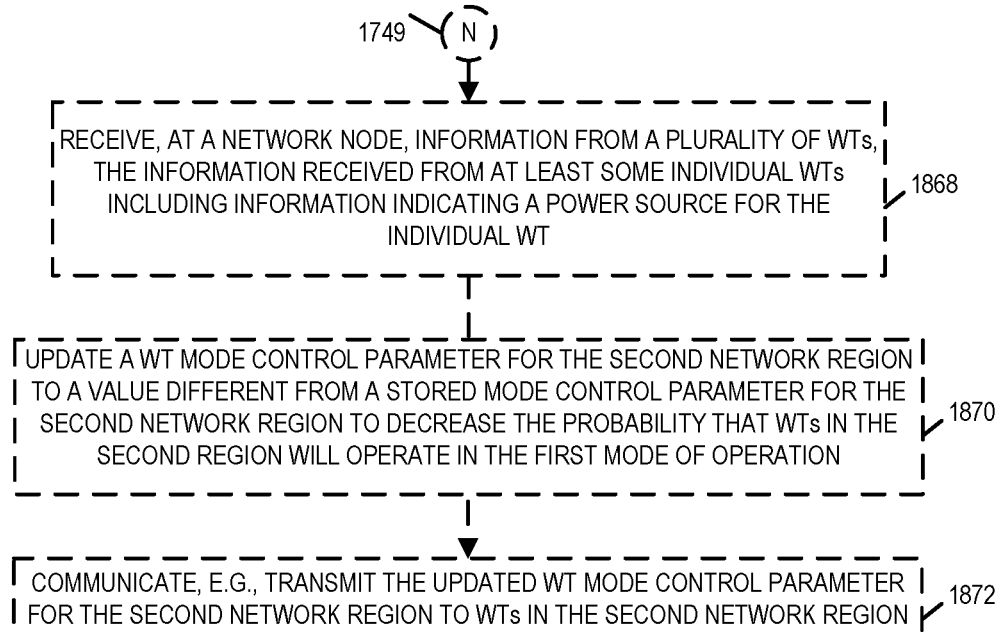
FIGURE 17M

METHODS AND APPARATUS FOR COLLECTING AND/OR USING WIRELESS COMMUNICATION RELATED INFORMATION TO FACILITATE WT MODE OF OPERATION DECISIONS

RELATED APPLICATIONS

The present application is a continuation-in-part of pending U.S. patent application Ser. No. 15/081,821, filed Mar. 25, 2016 which claims the benefit of U.S. Provisional Patent Application Ser. No. 62/139,308 filed Mar. 27, 2015, titled METHODS AND APPARATUS FOR COLLECTING AND/OR USING WIRELESS COMMUNICATION RELATED INFORMATION and naming the same inventors as the present application, each of the preceding application being hereby incorporated by reference in their entirety.

FIELD

The present application relates to methods and apparatus for monitoring, analyzing, planning and/or controlling a hybrid cellular and non-cellular network, e.g., a communication network supporting both cellular communication and non-cellular multi-hop communication.

BACKGROUND OF THE INVENTION

Cellular communications have gained much popularity since 1990s. With advanced packet switching technologies, any raw signals can be formed in packets which can flow from the sender to the destination via the cellular networks, e.g., CDMA and GSM networks and non-cellular networks, e.g., Wi-Fi, Bluetooth and/or other local area networks. On the other hand, the manufacturing cost of cell phones, or called mobile phones, has decreased significantly, so mobile phones become affordable. It is believed that the mobile phones have penetrated more than 85% of the global population. Furthermore, more functionalities are added to mobile phones, leading the boundaries between mobile phones and personal computing devices to disappear. Many mobiles phones have now become smartphones or personal mobile computers. The smartphones allow subscribers not only to talk but also to enjoy the use of the Internet.

Due to a large volume of subscribers using smartphones, the demand of cellular transmission increases exponentially. However, the bandwidths of cellular networks are limited. A typical solution to the problem of bandwidth deficiency is to install more cellular base stations. Nevertheless, in the greater metropolitan areas, e.g., New York City, Chicago, Los Angeles, London, and Tokyo, there are sparse or no spaces to install more cellular base stations. Even though installing more base stations is feasible, users located at the "marginal-to-inoperative regions," such as the coverage edges of base stations, hilly terrain, concrete walls, or tall buildings, still face weak or blocked signals.

While cellular networks are commonplace, as the need for coverage and/or additional communications capacity grows, there is need for methods and apparatus which facilitate deployments of more advanced networks, e.g., networks which support both cellular communication and on-cellular multi-hop communication where the communications may occur across either or both of the cellular and non-cellular portions of the network. While hybrid networks can offer advantages by leveraging the benefits of different types of communications techniques which can be used in the hybrid network, there is considerable need for methods and apparatus for monitoring such a network and for information and/or equipment which can facilitate the playing, deployment, maintenance and ongoing management of such hybrid networks.

Wireless terminals often support a variety of radio interfaces and modes of operation in which one or more interfaces maybe left unused or used in a restricted manner. For example during a non-WiFi mode of operation a WiFi interface maybe disabled while cellular communications may still be permitted via a cellular network interface.

Parameters used for controlling the mode of operation in which a WT will operate can be static and common to all the devices in a given communications system or set by a user, e.g. with a user disabling WiFi interface for a period of time. Unfortunately the use of static parameters which may generally produce satisfactory results in determining which mode of operation, and thus which interface or interfaces a device will use at a given time, may not lead to optimal results in terms of mode of operation selection in all locations throughout the network. This may result in too many devices trying to operate in a particular region and too few devices operating in a particular mode in another region.

While an individual WT may use locally available information as part of the mode of operation determination, it will normally not have a view of the overall network and an understanding of signal strength or other conditions that may affect decisions being made by nearby wireless terminals (WTs). In addition, the individual WT lacks an understanding of the overall number of devices operating in a particular mode in a given area or more generally the distribution of devices operating as gateways or relays throughout the network. The effect of limited knowledge of network conditions and device operation can be particularly damaging to overall throughput when devices make decisions of not only what interfaces to use at a given time but also whether or not they should perform relay or gateway related functions which maybe part of some modes of operation.

In view of the above it should be appreciated that how to control the mode of operation of devices in a network is a technical problem which can affect the overall throughput of a network, loading on individual devices, power consumption at one or more devices which may have limited battery power and/or a host of other factors which can affect communications network throughput and reliability.

In view of the above, it should be appreciated that there is a need for methods and apparatus for monitoring, analyzing, planning and/or controlling a hybrid network, e.g., a network supporting both cellular communication and non-cellular multi-hop commendation in the network and/or a need for methods and apparatus which would allow the mode of operation in which a WT decides to operate to be influenced by network knowledge which maybe not be directly available to a WT and/or which allows for one or more parameters used to control a WTs decision as to what mode of operation to operate in at a given time to be dynamically influenced or controlled, e.g., based on information from a wide variety of sources and/or devices in a communications network.

SUMMARY OF THE INVENTION

Methods and apparatus for monitoring, analyzing, planning and/or controlling a hybrid cellular and non-cellular network, e.g., by determining and communicating one or more control parameters to wireless terminals are described. The method and apparatus are well suited for use in a communication network supporting both cellular communication and non-cellular, e.g., single or multi-hop, communication. The cellular communication may and sometimes does involve communication with one or more cellular network components, e.g., components used to support CDMA and/or GSM communication using licensed spectrum in at least some embodiments. Non-cellular communication may and sometimes does involve the use of WiFi and/or Bluetooth and often involves communication using unlicensed spectrum. The non-cellular network may and sometimes is implemented as a local area network which may and sometimes does have connectivity to one or more cellular networks, e.g., via a gateway device.

In various embodiments, mobile devices, e.g., mobile wireless user devices, report network conditions and/or transmission statistics to a core network element, e.g., a network node in the form of a server which can and sometimes does operate as a management system. In some embodiments the functionality of the management system is incorporated into a node in the communications network which servers as a gateway or other node in the communications system but in many embodiments it is implemented as a separate node.

Information about the amount of data transmitted or otherwise communicated via network elements is reported to the server. Also information about the quality of a cellular communications channel and an alternative single or multi-hop communications channel which can be used to communicate to/from a cellular network elements is reported. In this manner, the server can collect, process and generate information which facilitates an understanding how the non-cellular portion of the network facilitates communications with portions of the cellular network and/or provides a meaningful alternative communications path to the cellular network.

The collected information can, and in some embodiments is, processed and displayed. The information is also processed in some embodiments to make automated network management control decisions and/or decisions about when, where and what type of network elements should be deployed to enhance system capacity and/or address network loading issues in a cost effective manner.

In various embodiments communications statistics and channel quality measurements are made for a plurality of different devices in a network. In addition to collecting and displaying information about the amount of data transferred via various elements in the network, information relating to channel quality, e.g., gain, benefits obtained by certain devices using multi-hop communications rather than cellular communications are determined and displayed.

The displayed information in some embodiments is presented on a map allowing a network manager, technician and/or other entity concerned with network performance to visually obtain information about the cellular and non-cellular multi-hop portion of the network in one or more geographic areas.

Based on the collected information and statistics, network component deployment suggestions may, and in some embodiments are, determined a management system. In various embodiments, base station and/or gateway transmission power control determinations are made based on the collected statics. In this manner, automated management of the network may be implemented with the transmission power of different devices being optimized, in some embodiments, to maximize overall data capacity and/or active other network objectives such as reduced latency or jitter.

Based on cellular and/or multi-hop network loading and/or data transmission information, recommendations, and/or control decisions are made by the system, e.g., in an automated manner, as to where additional network components, e.g., femto cells supporting cellular communication and/or gateways supporting non-cellular and cellular communications functions. The management and control system can, and in some embodiments do, affect communications system capacity.

Upon deployment of additional network elements, network configuration information is updated, additional statics collected and transmission power or other features of the various network elements automatically adjusted by the data collection and management system of the present invention.

Advantages of the subject matter described herein utilize analysis of operation information to improve better the allocation of resources in hybrid cellular and non-cellular multi-hop communication network. Some wireless devices in the hybrid network may use multi-hopping systems in a non-cellular network to securely connect themselves to a cellular network. Non-cellular networks, such as wireless local/wide area networks, e.g., WiFi networks, Bluetooth networks and the Internet, are ubiquitous and are also directly or indirectly connected with cellular networks. The subject matter described herein exploits the hybrid of cellular and non-cellular networks to expand the coverage of cellular base stations. To allocate communication resources in a more efficient way, the subject matter described herein deploys a system to monitor and analyze the communication operations and the communication data. The analysis results can benefit telecommunication carriers.

Methods and apparatus for controlling the portion of WTs operating in a particular mode of operation in one or more regions of a network are described. In various embodiments WTs make individual decisions as to which mode of operation they will operate in based on signal strength measurements and/or metrics communicated in beacon or other signals about the quality of connection through which a WT may attached to a network. The metrics maybe used by the WTs to individually select between a plurality of different modes of operation with the WTs using both cellular network interfaces and non-cellular interfaces in some modes of operation but not in others.

While mode of operation decisions may be and in some embodiments are made in WTs, the WTs are provided with one or more control parameters which influence the decision making process. Such control parameters include, for example signal a cellular signal quality threshold, etc. The parameters affect the decision as to what mode of operation the device using the parameter will operate in given the conditions encountered by the WT making a mode of operation decision.

A control node can communicate via one or more base stations control parameter updates to the WTs. Since the mode decisions made by WTs depends not only on the control parameters but also the conditions encountered by individual WTs, it is difficult to determine precisely what parameter setting should be used to achieve a desired portion of the WTs operating in a particular mode of operation. For load balancing and/or other reasons an operator may desire to have a certain portion of WTs in a region operating in each of several modes of operation at a given time. Unfortunately it can be difficult for the operator to determine the appropriate parameter setting to achieve the desired distribution of nodes operating in a given region. While a default set of parameter values may be used, it would be desirable if the parameter values could be easily adjusted from one region to another to achieve desired ratios of WTs operating in each region in particular modes of operation. It would also be desirable if different regions could have different portions of nodes operating in various modes at proportions specified by an operator in a given region.

In various embodiments the control parameters that influence WT mode of operation decisions are set of an initial set of default values. The number of WTs operating in one or more modes of operation are detected. A decision is made as to whether the number of WTs operating in a particular mode are to be increased or decreased. Control parameters are adjusted in successive reporting and monitoring intervals, e.g., in a methodical process with one or a few parameters being adjusted during each adjustment period. Over time, based on feedback of the number of devices operating in a particular mode in a region the parameters are adjusted to achieve the operator specified portions of device operating in one or more specified modes of operation in a given region. Through the use of feedback and automatic parameter adjustment an operator can control the portion of devices operating in a region without having to understand or specify particular values for the multiple control parameters that influence mode of operation decisions by WTs.

Since WT control parameters are determined on a regional basis, an operator can specify different portions of devices to operate in a particular mode in a given region. By automating the adjustment of control parameters a relatively complicated task of manually specifying individual control parameters can be avoided and an operator can easily control and/or adjust the portion of devices operating in one or more different modes of operation by simply indicating the desired portion of devices which should operate in a specified mode in a region under control.

In various embodiments WTs support at least a first mode first mode of operation, e.g., a client or relay mode of operation, in which at least some (but all in some embodiments) uplink traffic directed to a cellular network is transmitted via a non-cellular interface to another device for communication to the cellular network, e.g., directly via a cellular interface or via another network node, and in which at least some (but all in some embodiments) downlink traffic originating from a cellular network is received via a non-cellular interface. For example, in the first mode in some embodiment downlink and uplink traffic maybe to/from the device operating in the first mode or in some cases could be traffic being relayed by the device operating in the first mode. In addition to the first mode of operation WTs support a second mode of operation which is a mode of operation, e.g. a gateway mode of operation, in which all uplink traffic, directed to a cellular network, that is received by the WT operating in the second mode from another WT, is transmitted via a cellular interface in the WT and in which all downlink traffic directed to another WT and originating from a cellular network is received via the cellular interface in the WT operating in the second mode.

One or more subvariants of the first and second modes of operation maybe and sometimes are supported by a WT. In some embodiments a non-cellular non-relay data mode of operation is supported. In this mode of operation which is referred to as a first mode of operation in some places in the present application data to/from a WT (locally generated data) operating in the non-cellular non-relay data mode of operation is communicated via a non-cellular interface (e.g., WiFi interface) to another device (e.g. a relay or gateway device). In the non-cellular non-relay data mode of operation the WT does not operate as a relay for other devices and a cellular interface in the WT operating in this mode, if present, is not used for data transfer. This non-cellular non-relay data mode of operation is sometimes referred to as a first mode of operation.

Other WT modes of operation are also supported in some embodiments. For example in some embodiments WTs not operating in the first mode operate as relay device and or gateway devices thereby relaying data for other devices in the network in the case of a relay operation or from one network to another network as in the case of gateway operation. During relay and gateway supported modes of operation, the WT supports the relay or gateway function in addition to transmitting/receiving its own data.

To reduce the load on cellular network elements in a particular region of a network, a network control device may seek to some portion of WTs operating in the first mode of operation to thereby avoid direct utilization of cellular network components by such devices while still allowing the devices to obtain service and network connectivity via non-cellular interfaces of other devices and to directly communicate with other devices via non-cellular interfaces. While a network control device may seek to keep some portion of the WTs in a region operating in the first mode, to support such devices and still allow for utilization of cellular network components, the network control device may also seek to limit the overall portion of devices operating in the first mode to directly or indirectly influence the portion of devices in a network region operating one of the other supported modes, e.g., modes in which relay and/or gateway functions are supported.

In at least some embodiments, WTs report to the network control device information indicating what mode of operation they are operating in as well as information on the quality of one or more network connections available to the WT, e.g., cellular, gateway or relay connections. The network control device collects the information from the WTs and then analyzes the information to determine, on a per region basis, if the portion of WTs operating in a particular mode should be modified, e.g., because the portion of the wireless terminals operating in the first mode or another mode is above a first threshold used to set a minimum portion of WTs which should operate in the first mode in the region or a second threshold used to set a maximum portion of WTs which should operate in the first mode in the first region.

After determining the portion of WTs in a region operating in each of the different supported modes of operation, the network control device compares the determined portions to one or more thresholds to determine what if any changes in the portion of devices operating in the first mode or another mode should be made. For example when the portion of devices operating in the first mode is below a first threshold, the network control device may and sometimes does determine that the portion of WTs operating in the first mode should be increased. When the portion of devices operating in the first mode is above a second threshold the network control device may determine that the number of devices operating in the first mode should be decreased. Altering the number of devices in the first mode in a region can be and sometimes is achieved by updating a control parameter used by devices in to determine whether they should operate in the first mode or another mode of operation. While the decision as to which mode a WT device may operate in is made by the WT based on information available to it and the control parameter, by altering the control parameter used in a region for making the mode control determination the network control device can influence the mode determination process and control the portion of WTs in a region operating in a particular mode.

As devices shift out of the first mode of operation the number of devices operating in a mode in which relay or gateway operations are supported will increase. Similarly as devices are controlled by changing the mode control parameter to shift into the first mode of operation, the relative portion of nodes operating as relays and/or gateways in a region will decrease as the number of WTs operating in the first mode will increase. Thus, by varying a control parameter used by devices to determine if they should operate in the first mode of operation, the network control device can indirectly or directly influence the ratio of devices operating in the first mode to devices operating in one or more other modes, e.g., modes in which relay and gateway functions are supported.

In various embodiments the network control device maintains a set of control parameters corresponding to a network region. One or more of the parameters is updated and transmitted to the WTs in the region based on the information received from WTs in the region or from WTs in multiple different regions. Depending on the position of devices and/or other factors in different network regions, e.g., different geographic regions or different cellular coverage areas, a given parameter value may result in different portions of WTs operating in a particular mode of operation. For this reason in some embodiments parameter values are maintained and updated on a per region bases to achieve a desired portion of devices operating in a given region in a particular mode to achieve efficient use of available communications resources.

In some embodiments the parameter used to control the number of devices operating in the first mode of operation is a received signal strength threshold parameter. In some embodiments a WT terminal measured as received signal strength, compares it to the signal strength parameter it is instructed to use at a given time the control system and decides on which of a plurality of WT modes to operate in based, at least in part, on the comparison of the detected received signal strength and the signal strength parameter.

In at least one embodiment a network node, e.g., a network control device implements the steps of an exemplary method including receiving, at the network node, information from a plurality of WTs in a first region, the information received from at least some individual WTs including information indicating a communication mode in which the individual WT is operating, said communications mode being one of a plurality of different communications modes including a first communications mode; determining for at least some different network regions (e.g., geographic region or LAC with bad cellular signal strength maybe next to region where devices that can act as a gateway have good cellular signal strength) (a total number of WTs in the network region and) a portion of WTs in the network region operating in a first mode (e.g., client or rely mode) of operation; comparing the portion of WTs in one or more individual regions to a first threshold to identify regions in which the portion of WTs operating in the first mode of operation should be increased; updating a WT mode control parameter for a first network region, identified to have a portion of WTs operating in the first mode of operation below the first threshold, to increase the probability that WTs in the first region will operate in said first mode of operation; and communicating (e.g., sending the updated WT mode control parameter to base stations which then transmit the parameter to WTs) the updated WT mode control parameter for the first network region to WTs in the first network region. Various other features are directed to a network node which includes a processor and memory and implemented the steps of the exemplary method.

Numerous additional features, benefits and embodiments will be apparent in view of the detailed description which follows.

BRIEF DESCRIPTION OF THE DRAWINGS

FIG. 3 shows an illustrative non-limiting example of a display of operation information; in this case, data statistics shows signal strengths, coverage gains, Wi-Fi signals, and percentages of time plugged into power.

FIG. 17H shows an eight part of a diagram showing the steps of a method, which can be implemented by a network node, in accordance with the invention.

FIG. 17M shows a thirteenth part of a diagram showing the steps of a method, which can be implemented by a network node, in accordance with the invention.

FIG. 17 is a diagram shows how FIGS. 17A through 17M can be combined to form a flow chart showing the steps of the exemplary method, which can be implemented by a network node, in accordance with the invention.

DETAILED DESCRIPTION

Figure 1:
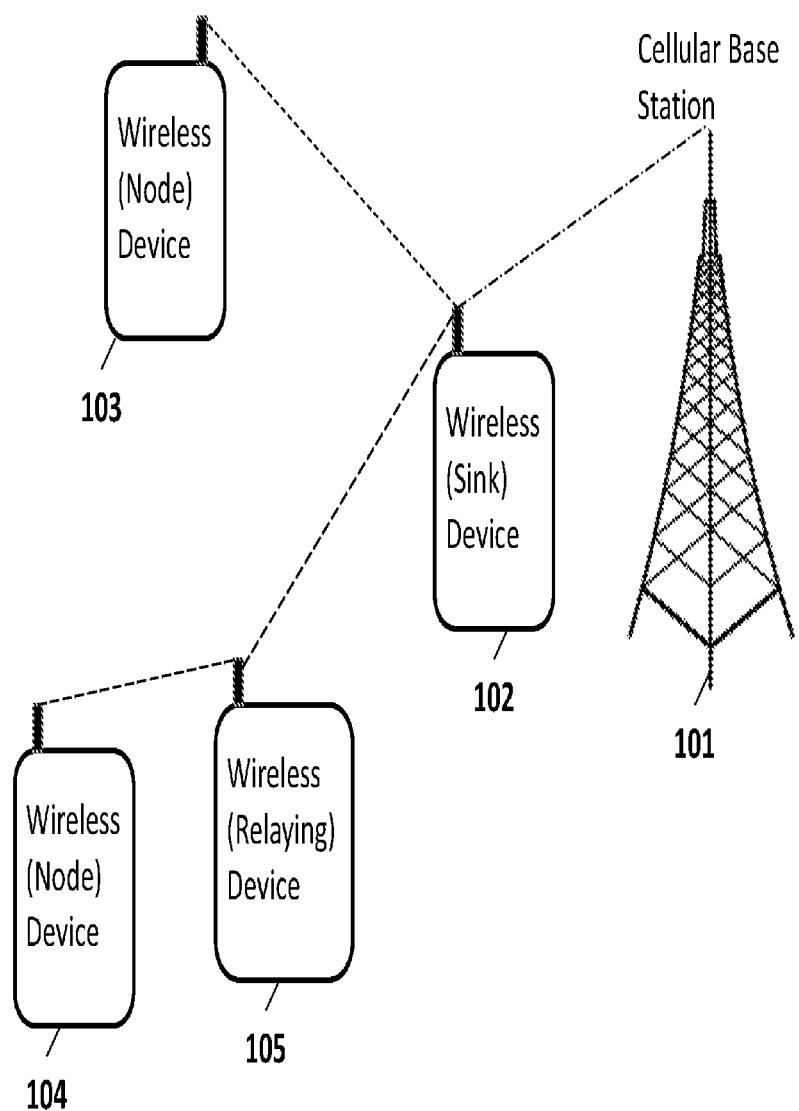
FIG. 1 shows a non-limiting example of a hopping system; in this case, the sink device relays the cellular communication to the node devices that connect to the sink device by single-hopping or multi-hopping on the non-cellular network.

Cellular communications have gained much popularity since 1990s. The principle of cellular communications is to divide a broad land area into a number of regular shaped cells, for example hexagonal, square, or circular shapes. Each of the cells is assigned one or more cellular base stations or cellular towers as hubs to manage wireless connectivity between mobile phones (or called cell phones) and the base stations. The base stations are further connected to public switched telephone network (PSTN), so traditionally the mobile phones in cellular networks were dedicated to voice communications.

With the advent of packet switching technologies, raw signals (e.g., voices, sounds, and scenes) can be formed in packets which can flow from a sender to a destination without a direct link between the sender and the destination. When cellular networks are deployed with packet switching technologies, a mobile computing device can connect to the Internet or other data networks via a data cellular network. Thanks to modern semiconductor engineering, the sizes of electronic circuitries keep shrinking. When a mobile phone is equipped with electronic chips for handling traditional cellular networks and data cellular networks, the boundary between mobile phone and mobile computing device becomes illusive. Most modern mobile phones are also mobile computing devices.

The manufacturing cost of mobile devices has decreased significantly. Mobile devices have become affordable to the general public. It is believed that the mobile devices have penetrated more than 85% of the global population. With a dramatically increasing number of mobile device users, telecommunication providers face a challenge to expand their coverage. Moreover, more functionalities (e.g., camera, web search, emails, maps, Internet surfing) have been added to mobile phones and mobile devices. Mobile device users demand more bandwidth to enjoy the added functionalities. Such a demand compounds the challenge faced by the telecommunication providers.

To address the surging bandwidth demand in cellular networks, a typical solution is to install more cellular base stations. Nevertheless, in the greater metropolitan areas, by way of non-limiting examples, such as New York City, Chicago, Los Angeles, London, and Tokyo, there are sparse or no spaces to install more cellular base stations. In the cases where installing more base stations is feasible, users located at the "marginal-to-inoperative regions," such as the coverage edges of base stations, hilly terrain, concrete walls, or tall buildings, still face weak or blocked signals. As a sequel, a new way to increase the cellular coverage is necessary.

In typical cellular communication systems, a mobile device directly communicates with a cellular base station. In other words, the device connects to the cellular base station via a "single hop," where the signals are transmitted and received directly between the device and the cellular base station without being mediated or relayed through an intermediary device. Based on the single hopping communication, the maximum number of mobile phones simultaneously connecting to the base station is limited because the bandwidth of the base station is limited. Although sophisticated schemes of modulation and error-correcting codes can be adopted, the data rates are sometimes sacrificed.

In addition to cellular networks, there exist various non-cellular wireless networks, for instance, but not limited to, wireless local area networks, wireless wide area networks, Bluetooth networks, and in general the Internet. Modern technologies allow both cellular interface and non-cellular interface to be embedded in a mobile device. In other words, a modern mobile device can participate in a cellular network via its cellular interface, or participate in a non-cellular network via the non-cellular interface. While the two interfaces independently sit in the same mobile device, the subject matter described herein exploits both types of interfaces to expand the coverage of cellular networks.

The system disclosed herein can use multi-hop schemes in a hybrid of cellular networks and non-cellular networks. The system in some embodiments can be applied to not only mobile devices but also generic wireless devices. To expand the coverage of a cellular communication system, a first wireless device with a poor cellular signal, or without a cellular access, may use its non-cellular interface to communicate to a second wireless device which has a good cellular signal and relays the signals from the first wireless device to the cellular base station. In such embodiments, the cellular resources, such as data rate and bandwidth, of the second wireless device is shared with the first wireless device. The first wireless device successfully communicates to the cellular base station via two hops: hopping to the second wireless device that in turn hops to the cellular base station. The "double-hop" connectivity in these embodiments can be extended to a "multi-hop" connectivity in other embodiments. For example, the first wireless device can hop to the second wireless device, then to a third wireless device, and finally to a cellular base station. The number of hops can be as many as possible, as long as some criteria is satisfied, by way of non-limiting examples, such as battery life, noise level, interference level, data rate, and bandwidth.

The multi-hopping technologies allow the cellular networks to expand their coverage. Complement to the technologies, a new method is necessary to monitor the operations of the hybrid communication network based on the multi-hopping method. The subject matter described herein collects various types of operation information, including but not limited to, device data, traffic data, base station data, gateway data, geographic related data, etc, allowing telecommunication operators to determine the best communication settings and resources.

Described herein, in various embodiments, are computer-implemented systems that comprise: (a) a processing device comprising an operating system configured to perform executable instructions and a memory device; (b) a computer program including instructions executable by the processing device to create an application comprising: (i) a software module configured to receive operation information of a communication network, wherein the communication network is a hybrid cellular and non-cellular multi-hop communication network; and (ii) a software module configured to generate a user interface display, wherein the user interface display comprises a summary of the operation information. In some embodiments, systems further include a software module configured to generate a report summarizing effectiveness of the current operation or generate a recommendation for improving operation efficiency.

Also described herein, in various embodiments, are methods that comprise: (a) receiving operation information of a communication network, wherein the communication network is a hybrid cellular and non-cellular multi-hop communication network; (b) generating a user interface display, wherein the user interface display comprises a summary of the operation information; and (c) providing comments for operation improvement.

Also described herein, in various embodiments, are non-transitory computer-readable storage media encoded with a computer program including instructions executable by a processor to create an application comprising: (a) a software module configured to receive operation information of a communication network, wherein the communication network is a hybrid cellular and non-cellular multi-hop communication network; and (b) a software module configured to generate a user interface display, wherein the user interface display comprises a summary of the operation information.

In some embodiments, the media, devices, networks, systems, and methods described herein include one or more wireless devices. Suitable wireless devices are, by way of non-limiting examples, mobile phones, mobile computing devices, smartphones, portable computers, tablet computers, mobile computers, hot spots, routers, gateways, switches, cameras, audio recorders, video recorders, music players, video players, portable electronic devices, and wearable electronic devices. Alternatively, the wireless devices may be non-portable devices containing cellular interfaces and/or non-cellular interfaces; by way of a non-limiting example, a computing device may have an adaptor for cellular communication and another adaptor for non-cellular communication.

In some embodiments, a wireless device used by the subject matter described herein is equipped with a non-cellular interface only; i.e., the device does not comprise a cellular interface. With appropriate configuration, the wireless device can utilize the non-cellular interface to connect to another wireless device that relays the signals to a cellular network. For instance, mobile computing devices (e.g., iPads) equipped with only non-cellular interfaces (e.g., Wi-Fi chipsets) may be embodied.

In some embodiments, the wireless devices on a hybrid network described in the subject matter are of the same type. By way of non-limiting examples, the wireless devices could be mobile phones, or portable computing devices. In other embodiments, the types of the wireless devices on a hybrid network are mixed. For instance, by way of a non-limiting example, a wireless device may be a smartphone, another wireless device may be a laptop, and another wireless device may be a Wi-Fi hot spot.

In some embodiments, the media, devices, networks, systems, and methods described herein include a wireless device equipped with a digital processor, or use of the same. In further embodiments, the digital processor includes one or more hardware central processing units (CPUs) that carry out the device's functions. In still further embodiments, the digital processor further comprises an operating system configured to perform executable instructions.

In some embodiments, the wireless device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple®iOS®, Research In Motion® BlackBerry OS®, Google® Android®, Microsoft® Windows Phone® OS, Microsoft® Windows Mobile® OS, Linux®, and Palm®WebOS®.

In some embodiments, the wireless device includes a storage and/or memory device. The storage and/or memory device is one or more physical apparatuses used to store data or programs on a temporary or permanent basis. In some embodiments, the storage device is a volatile memory and uses power to maintain stored information. In some embodiments, the device is non-volatile memory and retains stored information when the wireless device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the storage device includes, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the wireless device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the wireless device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In some embodiments, the media, devices, networks, systems, and methods described herein include a wireless device as a hybrid, multi-hop network. FIG. 1 is a non-limiting example illustrating some embodiments of a hybrid, multi-hop network. Referring to FIG. 1, the wireless device 102 directly connects to a cellular base station 101. The communication network between the base station 101 and device 102 is based on a cellular communication protocol, namely forming a cellular network. The device 102 embodied in FIG. 1 connects to the base station 101 via a single hop.

Referring to FIG. 1, the wireless device 103 does not have optimal cellular signals directly connecting to the base station 101. However, the signals of the device 103 can hop onto the device 102 which in turn relays the signals to the base station 101. The communication between the device 103 and the base station 101 is a two-hop communication. Moreover, the communication is on a hybrid of cellular network and non-cellular network. The wireless connection between devices 102 and 103 is based on their non-cellular interfaces, by way of non-limiting examples, such as Wi-Fi interfaces, Bluetooth interfaces, LTE-Direct interfaces, optical interfaces, or infrared interfaces. The wireless connection between cellular base station 101 and device 102 is based on the cellular network, where the cellular communication resources of device 102 (by way of non-limiting examples, such as bandwidth and data rate) are shared with the device 103.

Similarly, with reference to FIG. 1, the wireless device 104 does not have optimal cellular signals directly connecting to the base station 101. However, the device 104 can communicate with the base station 101 via three hops: hopping onto the wireless device 105, then onto the wireless device 102, and then onto the base station 101. The wireless links between devices 102, 104 and 105 are based on their non-cellular interfaces, by way of non-limiting examples, such as Wi-Fi interfaces, Bluetooth interfaces, LTE-Direct interfaces, optical interfaces, or infrared interfaces. The wireless link between cellular base station 101 and device 102 is based on the cellular network, where the cellular communication resources of device 102 (by way of non-limiting examples, such as bandwidth and data rate) are shared with the device 104.

In some embodiments, with reference to FIG. 1, the device 102 can concurrently relay signals originated from devices 103 and 104. In some embodiments, the device 102 can communicate with the base station 101 for its own use, while relaying signals from one of the devices 103 and 104 or from both of the devices 103 and 104.

In some cases embodied in FIG. 1, the wireless links in the non-cellular network can operate on the same protocol. In some cases, the links can operate on different protocols. By way of non-limiting examples, suitable protocol options are IEEE 802.11 standards, AP/AP protocols, STA/STA protocols, AP/STA protocols, AP/IBSS protocols, STA/IBSS protocols, AP/P2P-client protocols, AP/P2P-GO protocols, IBSS/IBSS protocols, P2P-GO/P2P-GO protocols, and P2P-Client/P2P-Client protocols, P2P-GO/STA protocols, STA/P2P-Client protocols, P2P-GO/IBSS protocols, P2P-Client/IBSS protocols, and P2P-GO/P2P-Client protocols. Those with skills in the art can recognize various combinations of protocols can be embodied in the subject matter described herein.

Figure 2:
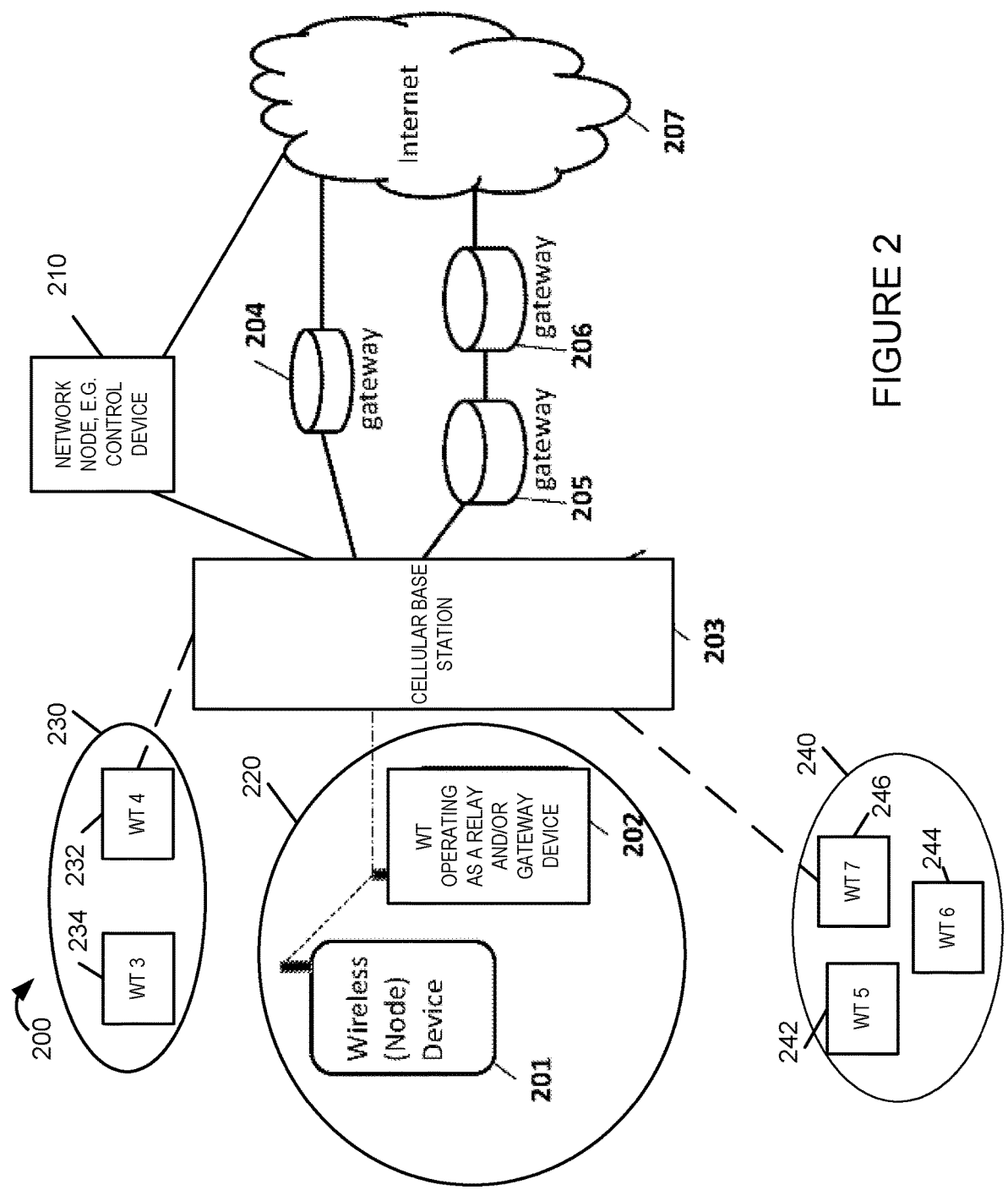
FIG. 2 shows an exemplary communications network including non-cellular and cellular network components and a control device which can receive information and adjust parameters to influence WT terminal operation in one or more regions.

FIG. 2 shows an exemplary communications network including non-cellular and cellular network components and a control device which can receive information and adjust parameters to influence WT terminal operation in one or more regions.

In the FIG. 2 embodiment wireless terminals, also sometimes referred to as wireless devices or nodes, are shown located in three distinct regions, a first region 220, a second region 230 and a third region 240. The first, second and third regions may and sometimes do correspond to different geographic regions.

As will be discussed further below each of the WTs in a region can operate in a plurality of modes of operation, e.g. a first mode of operation or a second mode of operation with one mode of operation being implemented by a WT at a given time.

In at least some embodiments the first mode first mode of operation is a client or relay mode of operation in which at least some (but all in some embodiments) uplink traffic directed to a cellular network is transmitted via a non-cellular interface to another device for communication to the cellular network, e.g., directly via a cellular interface or via another network node, and in which at least some (but all in some embodiments) downlink traffic originating from a cellular network is received via a non-cellular interface. For example, in the first mode in some embodiment downlink and uplink traffic maybe to/from the device operating in the first mode or in some cases could be traffic being relayed by the device operating in the first mode. In addition to the first mode of operation WTs support a second mode of operation which is a mode of operation, e.g. a gateway mode of operation, in which all uplink traffic, directed to a cellular network, that is received by the WT operating in the second mode from another WT, is transmitted via a cellular interface in the WT and in which all downlink traffic directed to another WT and originating from a cellular network is received via the cellular interface in the WT operating in the second mode.

The first region 220 includes a first WT 201 and a second WT 202. The first WT 201 is shown operating in the first mode of operation and communicates, when necessary, with the cellular base station via WT 202 operating as a gateway. The second WT 201 is shown operating in the second mode of operation, e.g., the gateway mode of operation providing connectivity for the first wireless node 201 to the cellular network 203 via a cellular interface of the WT 202 which is used to transmit uplink traffic to the cellular network and receive downlink traffic from the cellular network. Optionally the device 2002 can communicate with the first WT 201 via its non-cellular interface.

The second region 230 includes a third WT 234 and a fourth WT 232 while the third region 240 includes fifth WT 242, sixth WT 244 and seventh WT 246. While communication between WTs may involve use of peer to peer communication or other non-cellular communication, in the FIG. 2 example each region 230, 220 and 240 includes at least one device with connectivity to a cellular network node, e.g., cellular base station 203. For network load balancing, battery power conservation reasons, cost, and/or Quality of Service reasons, it can be desirable to have different portions of WTs in each region operating in a particular mode of operation at a given time. In this way traffic can be balanced between non-cellular and/or cellular networks taking into consideration the number of devices, network load, battery power available to individual WTs, etc. The needs in different regions can change over time and/or vary due to different geographic conditions and/or the location of cellular base stations with respect to the particular region. In various embodiments, as will be discussed below various statistics are collected and reported to a network node 210 which acts as a control device. While the network node 210 is shown on the cellular side of the network, it can be included at any location in the communications network 200 and maybe part of a base station, WiFi access point, or any other device in the network.

When integrated into a cellular base station, the network node 210 can transmit parameters and/or other information to WTs within the coverage area of the base station. For example in some embodiments the cellular base station 203 serves as the network node 210 and transmits parameter update information directly to the first, second and third regions 220, 230 and 240 which are all in the coverage range of the base station 203 which, in some embodiments is the control device 210 or includes the control device 210. In cases where the control device 210 is implemented as a separate node from a base station communication of parameters to WTs may and sometimes does sending the parameters to be communicated to the WTs in a region to a cellular or non-cellular base station or access point for transmission to the WTs in a region where the parameters are to be used by the WTs in making mode decisions. The mode decisions maybe and sometimes are made individually by WTs based on the received parameter to be used and one or more locally available pieces of information such as the amount of battery power available to the WT making the mode decision, the strength of a signal received form an access point or base station and/or one or more other conditions such as whether the WT has cellular network connectivity at a given time or only non-cellular connectivity to another communications device, e.g., lacks cellular network connectivity. An operator can and sometimes does change thresholds used on a per region basis to control the setting of one or more control parameters used to control WT mode decisions. As the thresholds change for determining parameters and/or statistics indicate changes in the portion of devices operating in particular mode in a region the control device 210 can and sometimes does update one or more control parameters for a region and communicates the new parameter value to the WTs in the region to which it applies. In this way the network node can rebalance the portion of devices operating in a particular mode automatically without a human having to determine how the parameter should be changed to balance the portion of devices operating in various modes in a region.

Network node 210 which is a control device can be at any location in the network 200 and can be part of a cellular network or non-cellular network.

Gateway devices 204, 205, and 206 provide connectivity to the Internet allowing devices to reach the Internet via the cellular base station. Alternative connectivity to the Internet maybe and sometimes is obtained by WTs using local access points of non-cellular networks. While WTs are shown in some embodiments one or more of the WTs operates as a WiFi or Bluetooth access point or hot spot. In the communications system 200 there could be more than one gateway, such as gateways 205 and 206 in FIG. 2. In other cases, more than two gateways are possible. When there is more than one gateway, the arrangement of the gateways may be parallel, serial, or mix of parallel and serial. Various types of gateways may be installed on the communication network; examples include packet gateways, service gateways, evolved packet gateways, Internet protocol security gateway.

In some embodiments, the media, devices, networks, systems, and methods described herein include operation information, or collection of it and use of it. In some embodiments, the operation information and/or its data components may be collected at a time point, or during a time period. The operation information may comprise a quantity of transmitted data. In some cases, the operation information may contain a quantity of data transmission sessions. Alternatively, the operation information may contain user device data, base station data, and/or gateway data. The user device data may be collected from a software module running at one or more user devices on the communication network. The base station data may be collected from a software module running at one or more base stations on the communication network. The gateway data may be collected from a software module running at one or more gateway on the communication network. In further embodiments, the user device data is received from a software module running at one or more user devices on the communication network at one or more of the following instances: one or more times daily during non-peak hours, a user device connects to the Internet via a network other than the cellular network and the communication network.

In some embodiments, the data of user devices, gateways, and base stations include (but not limited to): timestamp, global identifier, software version, operating system, device type, device model, communication protocol, data transmission rate, signal modulation method, amount of transmitted data on a cellular interface, amount of transmitted data on a non-cellular interface, amount of transmitted data on the communication network, amount of received data on a cellular interface, amount of received data on a non-cellular interface, amount of received data on the communication network, geospatial location, node role in the hopping system, path of hopping, routing path, duration of an operational event, power source, battery level, charging status, signal strength of accessing the non-cellular network, signal strength of accessing the cellular network, signal strength of accessing the hybrid of the cellular and non-cellular network, signal quality of the cellular network (for example, including effect from interference), signal quality of the hybrid network, base station identifier, location area code, network type, channel information, user device identifier, a number of users, billing data of user devices, mobility level of user device.

In some embodiments, the data may include information about devices within the neighborhood of the reporting device, also known as neighbor devices. Such neighborhood is determined by the range of the peer to peer connections. Such information include (but not limited to): timestamp, global identifier, software version, operating system, device type, device model, communication protocol, data transmission rate, signal modulation method, amount of transmitted data on a cellular interface, amount of transmitted data on a non-cellular interface, amount of transmitted data on the communication network, amount of received data on a cellular interface, amount of received data on a non-cellular interface, amount of received data on the communication network, geospatial location, node role in the hopping system, path of hopping, routing path, duration of an operational event, power source, battery level, charging status, signal strength of accessing the non-cellular network, signal strength of accessing the cellular network, signal strength of accessing the hybrid of the cellular and non-cellular network, signal quality of the cellular network (for example, including effect from interference), signal quality of accessing the non-cellular network, signal quality of accessing the cellular network, signal quality of accessing the hybrid of the cellular and non-cellular network, signal interference of accessing the non-cellular network, signal interference of accessing the cellular network, signal interference of accessing the hybrid of the cellular and non-cellular network, base station identifier, location area code, network type, non-cellular channel information, cellular channel information, user device identifier, a number of users, billing data of user devices, mobility level of user device. In some embodiments, the area codes are location area codes and/or tracking area codes.

In some embodiments, the data may comprise categories that impact the network operation. Non-limiting examples include weather, financial, political, sports, transportation, technology, news, social networks, foods, blogs, autos, shopping, dating, business, marketing, advertisements, real estate, entertainment, foods, terrain, maps, military, gaming, and jobs.

In some embodiments, the media, devices, networks, systems, and methods described herein include a display of the operation information and/or a display of one or more data components of the operation information. A display may be presented, by way of non-limiting examples, using a graph, a line chart, a heat map, a geographic location, or a combination of them. The display may present the operation information and/or data components taking place at a time point, or lasting during a time period.

In some embodiments, the media, devices, networks, systems, and methods described herein include summarizing the operation information and its data components and display of the summary. The summary may be completed by statistical analyses and intelligent computational analysis. The display of the summary may be using, by way of non-limiting examples, a graph, a line chart, a heat map, a geographic location, or a combination of them. The display may present the summary taking place at a time point, or lasting during a time period. In some cases, the summary may be used to determine information, such as service deficiencies, in the cellular network or in the hybrid network. Alternatively, the summary may be used to detect service interruptions in the cellular network or in the hybrid network. Sometimes, the summary can be used to identify communication resource shortage.

The summary of the operation information, obtained from the collection of neighbor information from multiple network devices, may include a graph describing the connectivity of such network devices. By way of non-limiting examples, said graph can be used to measure the density of the devices, or the level of network activity in particular neighborhoods. Surges in network activity can be used to identify local events. Said graph can also be used to identify potential indirect connections to the cellular network and their corresponding gains. Said potential indirect connections can be used to identify one or more devices, and their location, such that by improving their data throughput (either short-term by allocating them more bandwidth, or long-term by deploying additional network infrastructure), the overall network performance is best improved.

The summary of the operation information may be filterable by regions of the communication network, by a time period of operation, by one or more data components, by a combination of them.

The summary of the operation information may be used to recommend future operation plan, filterable by regions of the communication network, by a time period of operation, by one or more data components, by a combination of them.

FIG. 3 shows an embodied display of operation data statistics. In the embodiment, the components 302, 304 and 306 in the display are dropdown menus. The menu 302 allows a user to select which time frame to display the data summary. Non-limiting examples of time frames include past hours, past day, past week, past month, and/or past year. In certain applications, the time frame is defined by the user. The menu 304 allows a user to select which types of devices in the network. Non-limiting examples of device types include all devices, devices with specific operating systems (e.g., Android, iOS, Windows), devices with specific manufactures (e.g., Apple, Sumsung, HTC, Blackberry, Nokia, Motorola), devices with specific types (e.g., smartphones, tablets, vehicles, portable computers, desktops, servers). The menu 306 allows a user to select which regions of base stations. Non-limiting examples of device types include all base stations, base stations in a nation, in a state, in a metro, in a street block, near a building, inside a building, or in a region defined by the user.

Referring to FIG. 3, some embodiments show at least one type of statistics. FIG. 3 shows coverage gain acquired by using the hopping technology. The display further shows the signal strength of the devices using the hopping technology. The display can show the cellular signal strength. The display can show the Wi-Fi signal between a node and its next-hop. The display can show the percentage of time wherein the device(s) were plugged into power (e.g., AC outlets, USB ports). The display can show the data of gateway devices, node devices, and battery status. The node devices include the devices connected indirectly to a cellular base station via hopping, or directly to a cellular base station.

Figure 4:
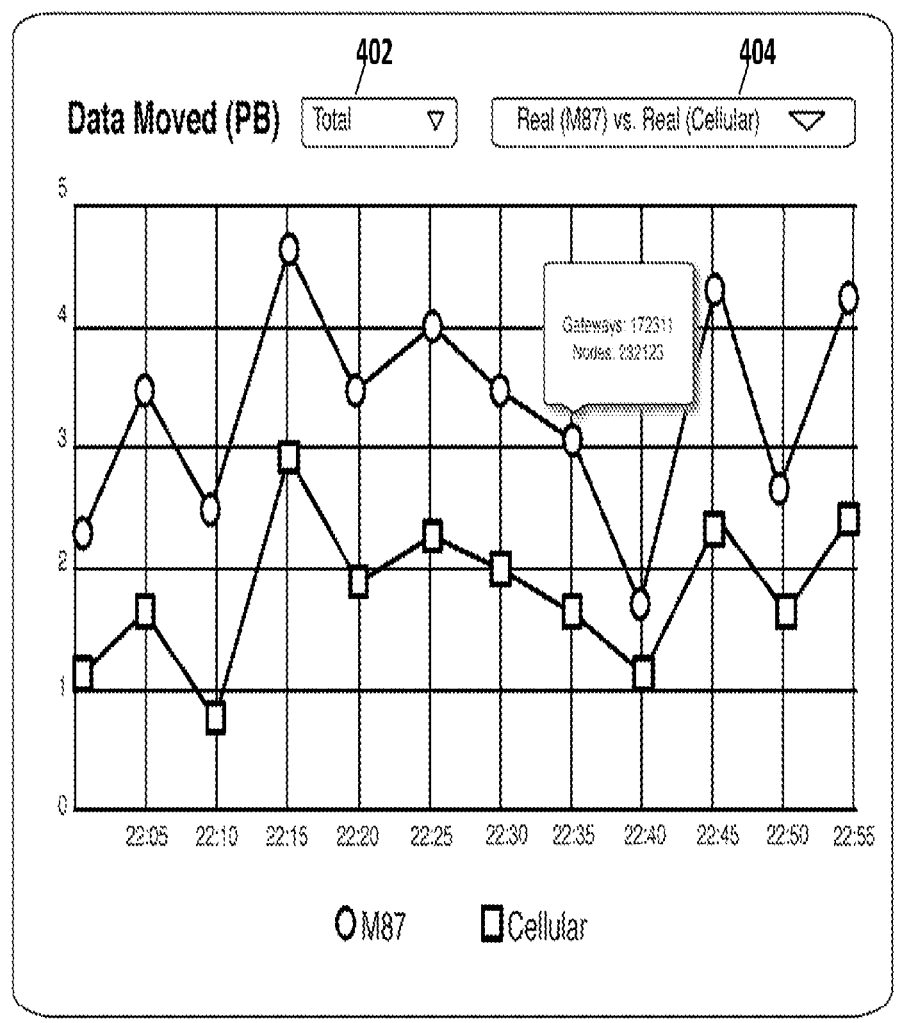
FIG. 4 shows an illustrative non-limiting example of a display of data traffic; in this case, the data traffic with using the multi-hopping technology and without using the hopping technology is shown as line charts.

FIG. 4 shows embodiments where the quantity of data moved is displayed. The figure has two drop down menus 402 and 404. The menu 402 allows the user to select the statistics type. Non-limiting example include total quantity, average quantity, median quantity, and/or a specific statistical measure defined by the user. The menu 404 allows the user to select the statistics type. Non-limiting example include total quantity, average quantity, median quantity, and/or a specific statistical measure defined by the user. The menu 406 allows the user to select the data to be real data or modeled data; furthermore, the menu 406 allows the user to select the data with versus without using hopping technology. In this embodiment, the menu 406 chose an option "Real (M87) vs. Real (Cellular)", which means showing the real traffic data through the network of M87, the assignee of the instant application, versus the real traffic data through the cellular network. In some embodiments, the data traffic is simulated, and the non-limiting examples of the options include: "Real (M87) vs. Real (Cellular)," "Modeled (M87) vs. Real (Cellular)," and/or "Real (M87) vs. Modeled (Cellular)."

In FIG. 4, the data traffic of M87 (i.e., using the hopping technology) and Cellular (i.e., without using the hopping technology) is shown as line charts. When a mouse hovers over a data point, a more detailed data analytics can be displayed. In this figure, a data point shows there are 172311 gateways and 232123 nodes forming the data point.

Figure 5:
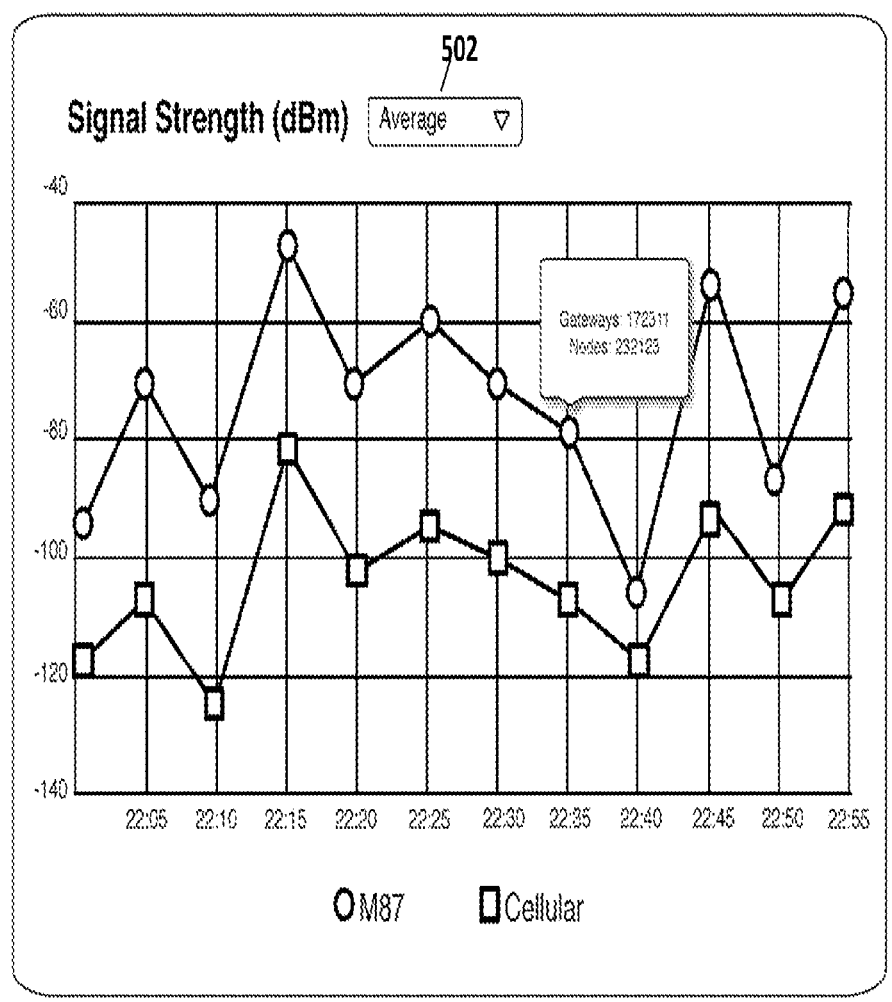
FIG. 5 shows an illustrative non-limiting example of a display of signal strengths; in this case, the signal strengths with using the multi-hopping technology and without using the hopping technology are displayed as line charts.

FIG. 5 shows embodiments where the strengths of signals are displayed. The figure comprises a drop down menu 502, which allows the user to select average strength, highest strength, lowest strength, median strength, and/or a user-defined measure of strength. Furthermore, the time frame of the signal strength can be adjusted by the user. In additional embodiments, there is an option to display the signal strength as plots, charts, and/or superimposed on a geographical region. In FIG. 5, the signal strengths are displayed as line charts.

Figure 6:
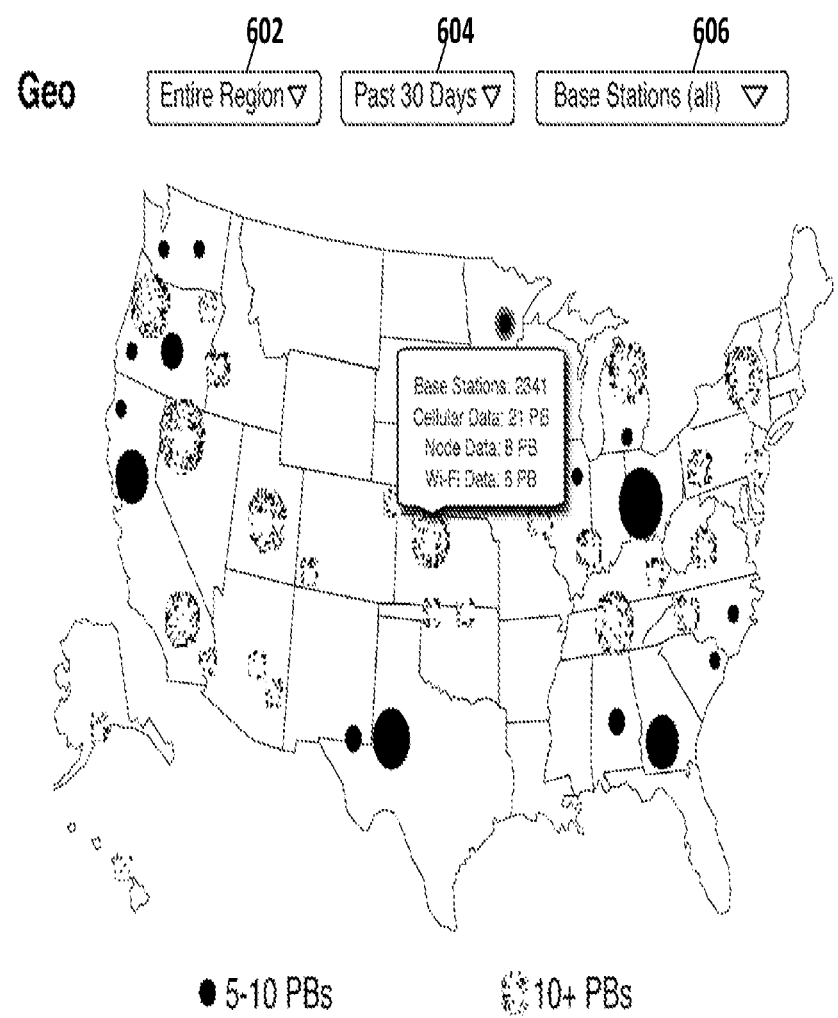
FIG. 6 shows an illustrative non-limiting example of a display of operation information on a geographical region; in this case, the operation information on a national map is shown.

FIG. 6 shows an embodied interface for displaying the operation information on a geographical region. The interface comprises three dropdown menus 602, 604, and 606. The menu 602 allows the user to select which region to display; non-limiting examples include nation, state, country, metro, street block, building, floor, and/or a user defined region. In some embodiments, the user defined region is entered by texts. In certain applications, the user defined regions is drawn by the user on a map. The menu 604 allows the user to determine which time frame to show the data; non-limiting examples include past hour, past day, past week, past month, past year, and/or a user defined time frame. In some embodiments, the user defined time frame is entered by texts. In certain applications, the user defined time frame is selected via a sliding bar. The menu 606 allows the user to select which base stations to show the data; non-limiting examples include all base stations, all base stations in a state, cellular base stations, Wi-Fi base stations, macro cellular base stations, and small cellular base stations.

In the embodiment shown in FIG. 6, the traffic data superimposed on a national map is display as dots, or groups of dots. The type of a dot and/or the size of a dot indicate the quantity of data traffic in the region. When a mouse hovers over a dot, more detailed information is displayed. In the example in FIG. 6, the mouse was moving to the state of Kansas, and a small window popped up to show there were 2341 base stations, cellular data traffic (i.e., data moved vial cellular networks) was 21 petabytes, node data traffic (i.e., data moved via a node device) was 8 petabytes, and the Wi-Fi data traffic (i.e., data moved vial Wi-Fi networks) was 6 petabytes.

Figure 7:
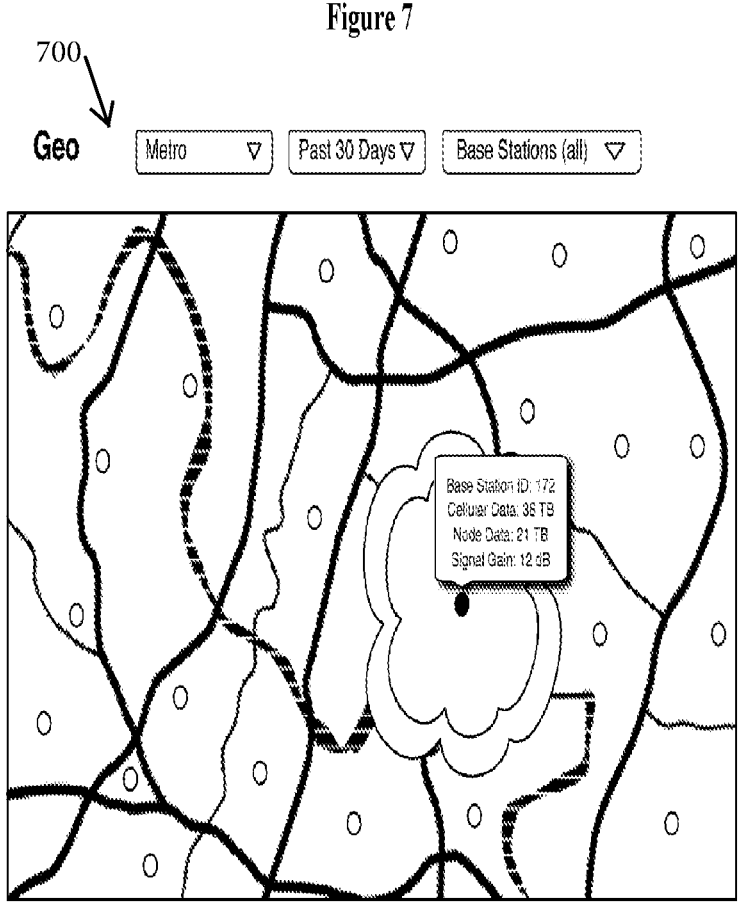
FIG. 7 shows an illustrative non-limiting example of a display of operation information on a geographical region; in this case, the operation information on a metro map is shown.

FIG. 7 is the embodiment of FIG. 6 zoomed in the metro level. In this embodiment, the dots on the map are corresponding to the base stations. When a base station is selected by the user, the dot changes its color. In this embodiment, the white dots are unselected base stations and the black dot is selected. When the base station is selected, its coverage boundaries and its traffic data are shown. In FIG. 7, there are 2 boundaries of the coverage. The smaller boundary is the coverage without using the hopping technology, while the larger boundary is the coverage when the hopping technology is employed. In some embodiments, the boundaries are measured from past data traffic. In other embodiments, the boundaries are estimated by a mathematical model on base station data, device data, and/or gateway data.

Figure 8:
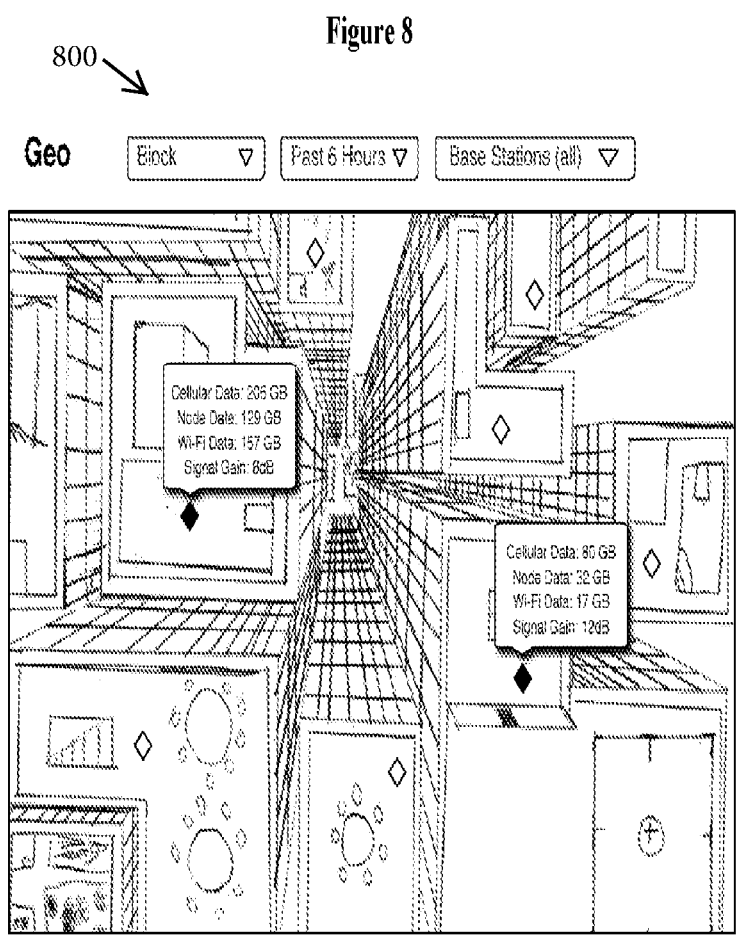
FIG. 8 shows an illustrative non-limiting example of a display of operation information on a geographical region; in this case, the operation information on a street block map is shown.

FIG. 8 is the embodiment of FIG. 6 zoomed in the street block level. In this embodiment, the diamonds on the map are corresponding to the buildings or base stations. When a building is selected by the user, the diamond changes its color. In this embodiment, the white diamonds are unselected buildings and the black diamonds are selected. When a building is selected, its traffic data is shown. In the example of FIG. 8, two buildings were selected: one building had cellular data traffic of 206 gigabytes, node data traffic of 129 gigabytes, Wi-Fi data traffic of 157 gigabytes, and a signal gain of 8 dB; the other building had cellular data traffic of 80 gigabytes, node data traffic of 32 gigabytes, Wi-Fi data traffic of 16 gigabytes, and a signal gain of 12 dB.

Figure 9:
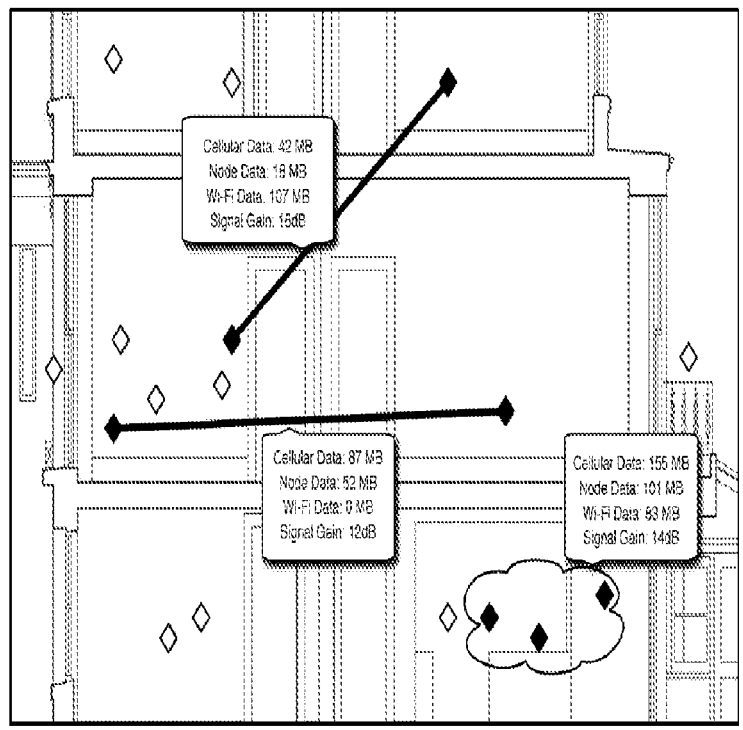
FIG. 9 shows an illustrative non-limiting example of a display of operation information on a geographical region; in this case, the operation information on a building map is shown.

FIG. 9 is the embodiment of FIG. 6 zoomed in the building level. In this embodiment, the diamonds on the map are individual devices. When a device is selected by the user, the diamond changes its color. In this embodiment, the white diamonds are unselected devices and the black diamonds are selected. When a device is selected by the user, the other device linked to the selected device is automatically selected and a link connecting the pair of devices is shown as well. Then, the operation information of the device pair is shown. Alternatively, the user can select a group of devices, and their operation information is displayed. In the example of FIG. 9, two pairs of devices were selected: one pair had cellular data traffic of 42 megabytes, node data traffic of 18 megabytes, Wi-Fi data traffic of 107 megabytes, and a signal gain of 18 dB; the other pair had cellular data traffic of 87 megabytes, node data traffic of 52 megabytes, Wi-Fi data traffic of 0 megabytes, and a signal gain of 12 dB. The group of selected devices had cellular data traffic of 155 megabytes, node data traffic of 101 megabytes, Wi-Fi data traffic of 83 megabytes, and a signal gain of 14 dB.

Figure 10:
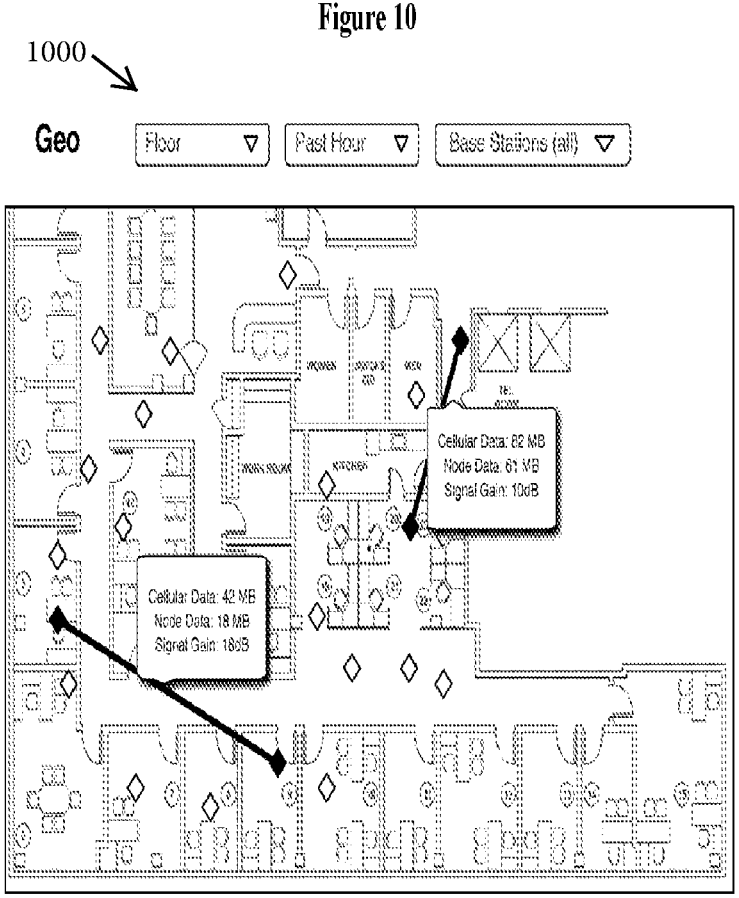
FIG. 10 shows an illustrative non-limiting example of a display of operation information on a geographical region; in this case, the operation information on a floor map is shown.

FIG. 10 is the embodiment of FIG. 6 zoomed in the floor level. In this embodiment, the diamonds on the map are individual devices. When a device is selected by the user, the diamond changes its color. In this embodiment, the white diamonds are unselected devices and the black diamonds are selected. When a device is selected by the user, the other device linked to the selected device is automatically selected and a link connecting the pair of devices is shown as well. Then, the operation information of the device pair is shown. Alternatively, the user can select a group of devices, and their operation information is displayed. In the example of FIG. 10, two pairs of devices were selected: one pair had cellular data traffic of 42 megabytes, node data traffic of 18 megabytes, and a signal gain of 18 dB; the other pair had cellular data traffic of 82 megabytes, node data traffic of 61 megabytes, and a signal gain of 10 dB.

Figure 11:
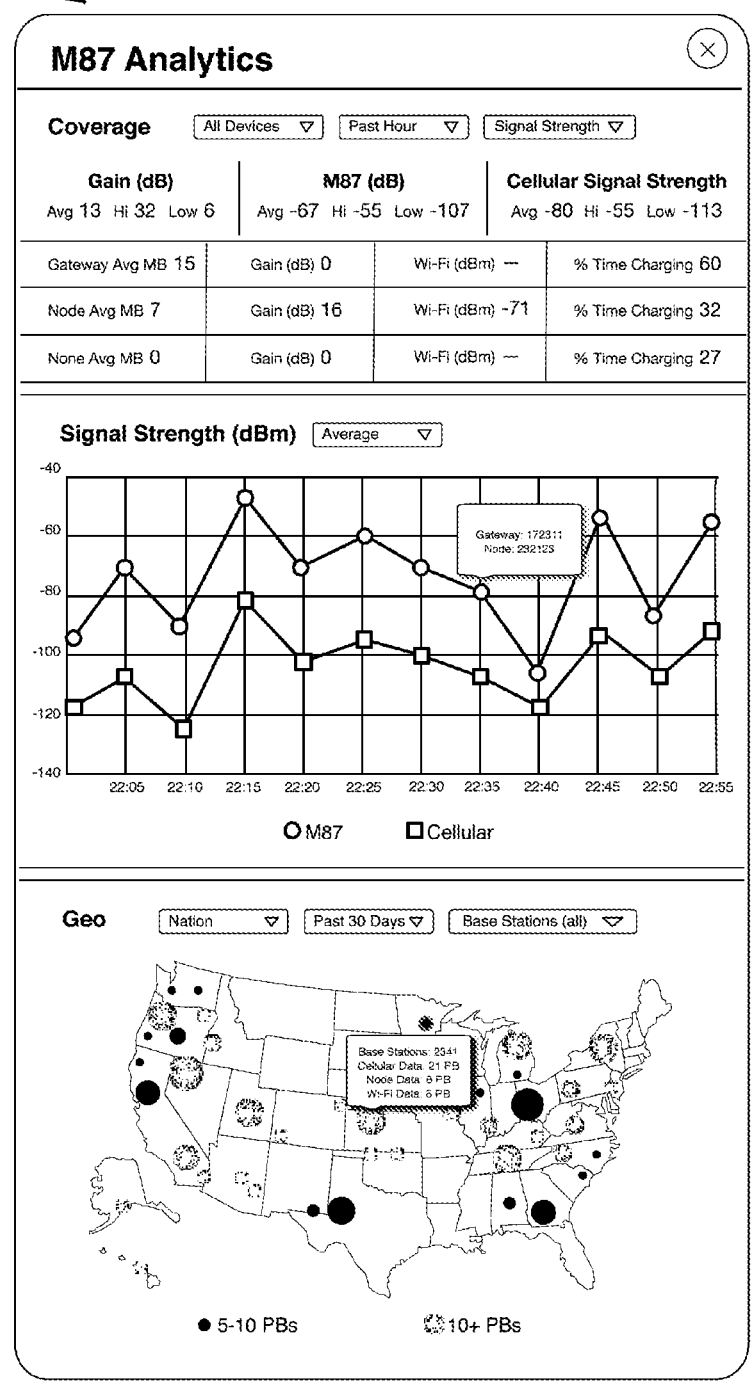
FIG. 11 shows an illustrative non-limiting example of a display of operation information; in this case, a combination of statistics interface, signal strength plot, and national map are displayed.
Figure 12:
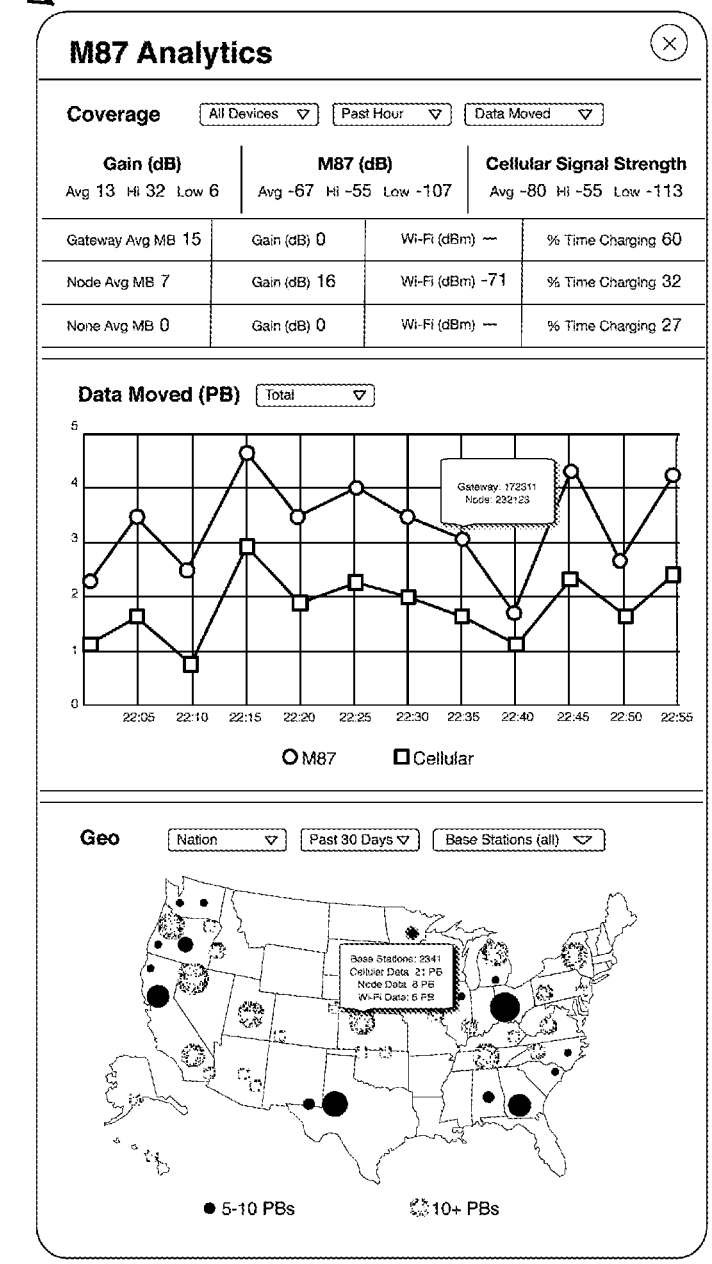
FIG. 12 shows an illustrative non-limiting example of a display of operation information; in this case, a combination of statistics interface, data moved plot, and national map are displayed.
Figure 13:
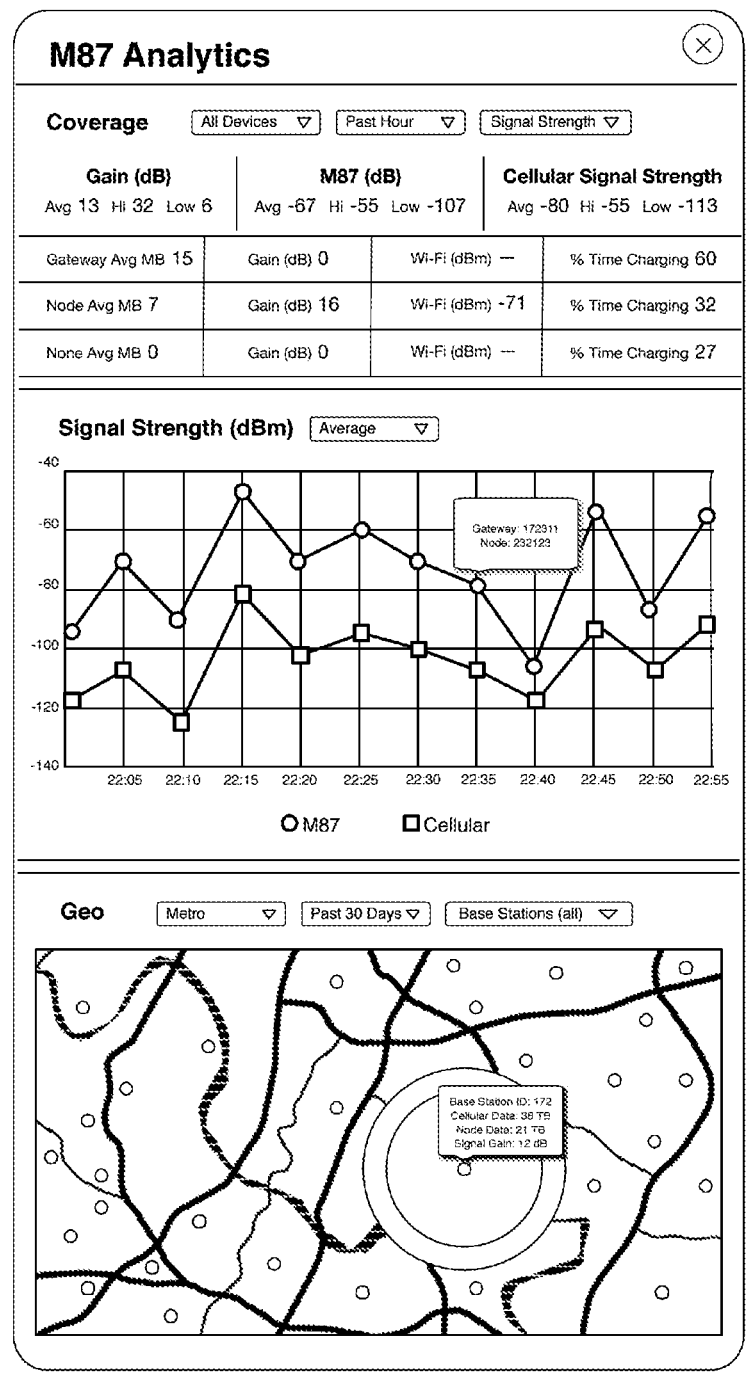
FIG. 13 shows an illustrative non-limiting example of a display of operation information; in this case, a combination of statistics interface, signal strength plot, and metro map are displayed.
Figure 14:
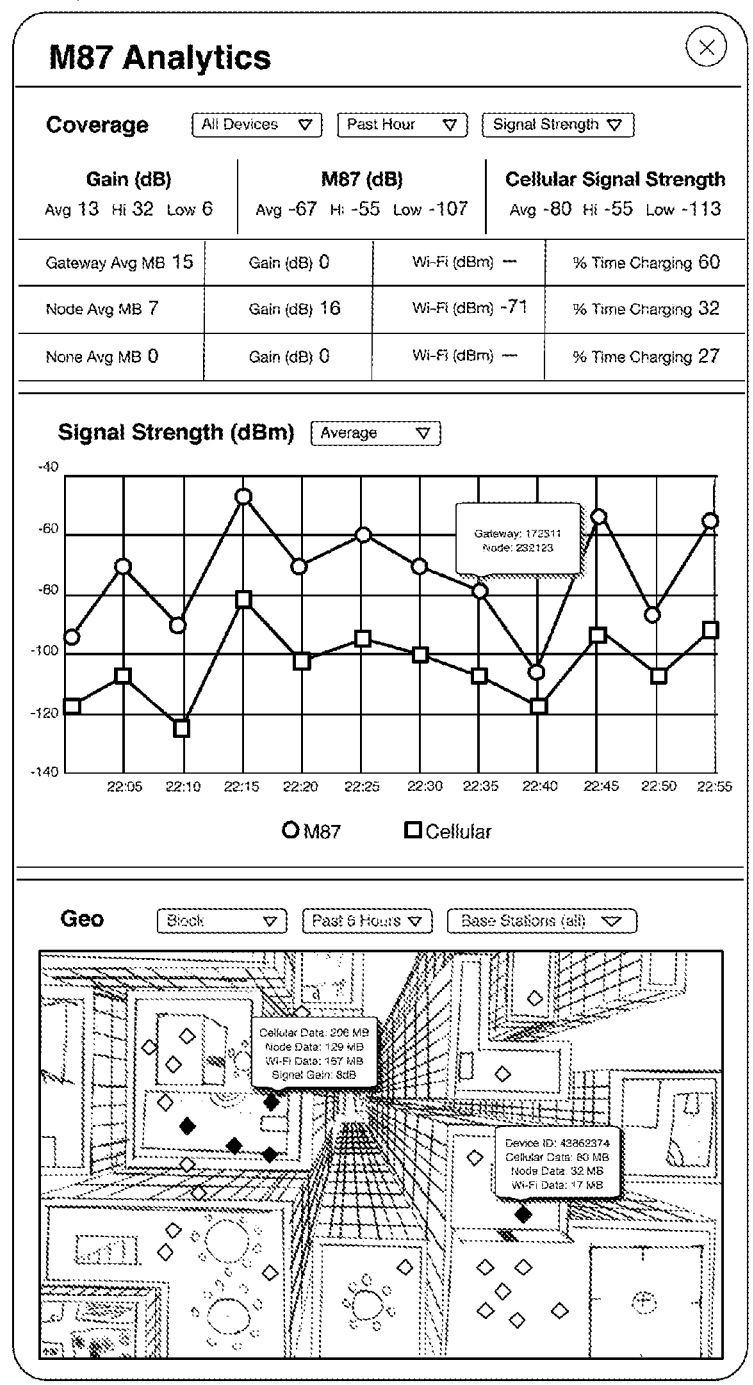
FIG. 14 shows an illustrative non-limiting example of a display of operation information; in this case, a combination of statistics interface, signal strength plot, and street block map are displayed.
Figure 15:
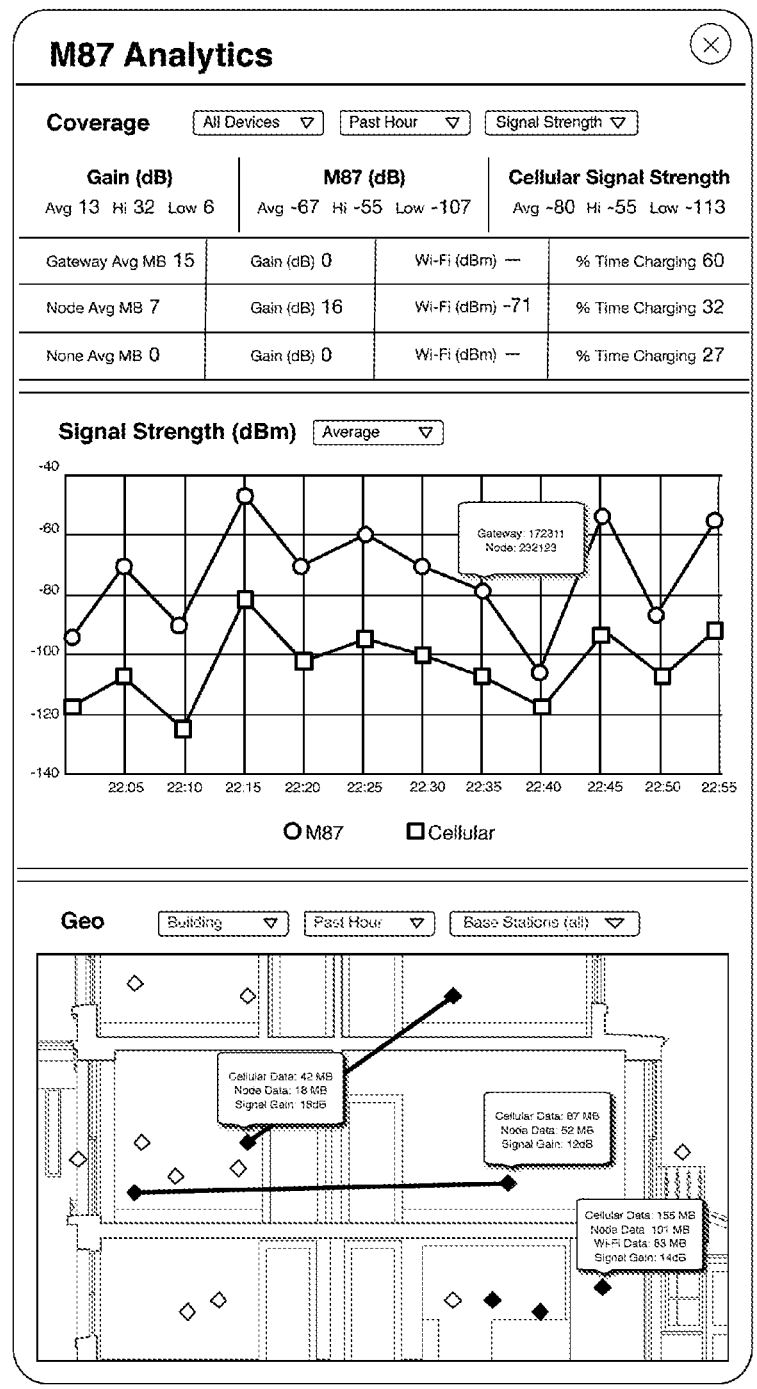
FIG. 15 shows an illustrative non-limiting example of a display of operation information; in this case, a combination of statistics interface, signal strength plot, and building map are displayed.
Figure 16:
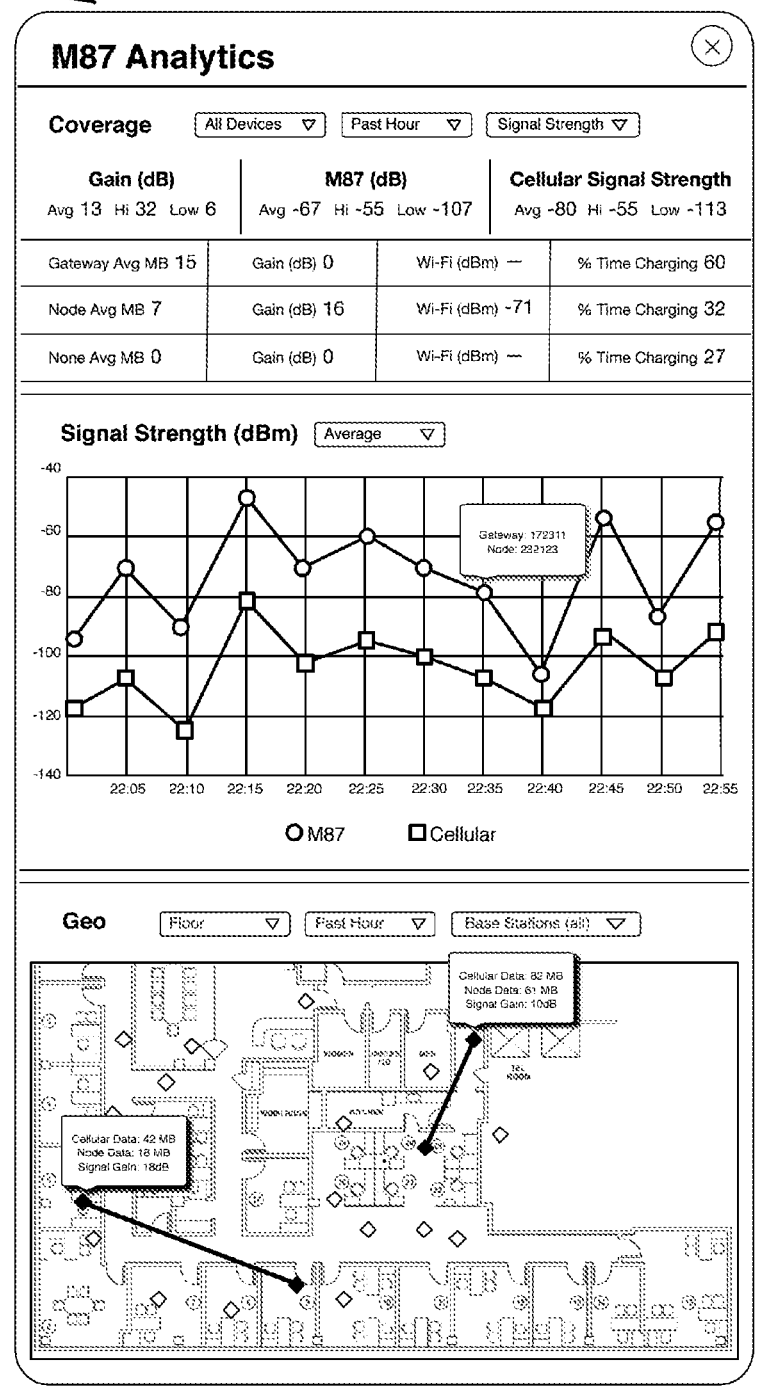
FIG. 16 shows an illustrative non-limiting example of a display of operation information; in this case, a combination of statistics interface, signal strength plot, and floor map are displayed.

The aforementioned figures and/or the components of the figures can be arbitrarily combined, as shown in FIG. 11 to FIG. 16. In FIG. 11, a combination of statistics interface, signal strength plot, and national map are displayed. In FIG. 12, a combination of statistics interface, data moved plot, and national map are displayed. In FIG. 13, a combination of statistics interface, signal strength plot, and metro map are displayed. In FIG. 14, a combination of statistics interface, signal strength plot, and street block map are displayed. In FIG. 15, a combination of statistics interface, signal strength plot, and building map are displayed. In FIG. 16, a combination of statistics interface, signal strength plot, and floor map are displayed. In various embodiments, those with skills in the art are able to combine different components of display to assemble their own desired display.

In some embodiments, the media, devices, networks, systems, and methods described herein include one or more non-transitory computer readable storage media encoded with a program including instructions executable by the operating. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

In some embodiments, the media, devices, networks, systems, and methods described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In some embodiments, a computer program includes a mobile application provided to a wireless device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo®DSi Shop.

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

In some embodiments, the media, devices, networks, systems, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the media, devices, networks, systems, and methods disclosed herein include one or more databases, or use of the same. In view of the disclosure provided herein, those of skill in the art will recognize that many databases are suitable for storage and retrieval of network connections tables, billing records, battery life, bandwidth usages, types of devices, levels of mobility, time of day, subscription fees, user profiles, non-cellular signal strengths, cellular signal strengths, noise levels, and interference levels.

The following illustrative examples are representative of embodiments of the media, devices, networks, systems, and methods described herein and are not meant to be limiting in any way. While preferred embodiments of the present disclosure are herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

FIG. 3 is an example of a software module that displayed the user device data collected from a simulated environment where mobile phones were deployed using multi hopping methods in a hybrid of cellular and Wi-Fi networks. The display showed the operation information of the entire network during the past hour. The operation information contained the coverage information. A panel in the middle of the display showed total megabytes transmitted in the sessions, average coverage, percentage of plugged in, average Wi-Fi strength, signal strength (low, high, average).

FIG. 4 shows the total quantity of the data transmitted in the network during the same experiment.

FIG. 6 shows the geographic heat map indicating the data transmitted at all the base stations in the entire region.

FIG. 7 shows an illustrative non-limiting example 700 of a display of operation information on a geographical region; in this case, the operation information on a metro map is shown.

FIG. 8 shows an illustrative non-limiting example 800 of a display of operation information on a geographical region; in this case, the operation information on a street block map is shown.

FIG. 9 shows an illustrative non-limiting example 900 of a display of operation information on a geographical region; in this case, the operation information on a building map is shown.

FIG. 10 shows an illustrative non-limiting example 1000 of a display of operation information on a geographical region; in this case, the operation information on a floor map is shown.

FIG. 11 shows an illustrative non-limiting example 1100 of a display of operation information; in this case, a combination of statistics interface, signal strength plot, and national map are displayed.

FIG. 12 shows an illustrative non-limiting example 1200 of a display of operation information; in this case, a combination of statistics interface, data moved plot, and national map are displayed.

FIG. 13 shows an illustrative non-limiting example 1300 of a display of operation information; in this case, a combination of statistics interface, signal strength plot, and metro map are displayed.

FIG. 14 shows an illustrative non-limiting example 1400 of a display of operation information; in this case, a combination of statistics interface, signal strength plot, and street block map are displayed.

FIG. 15 shows an illustrative non-limiting example 1500 of a display of operation information; in this case, a combination of statistics interface, signal strength plot, and building map are displayed.

FIG. 16 shows an illustrative non-limiting example 1600 of a display of operation information; in this case, a combination of statistics interface, signal strength plot, and floor map are displayed.

Figure 17A:
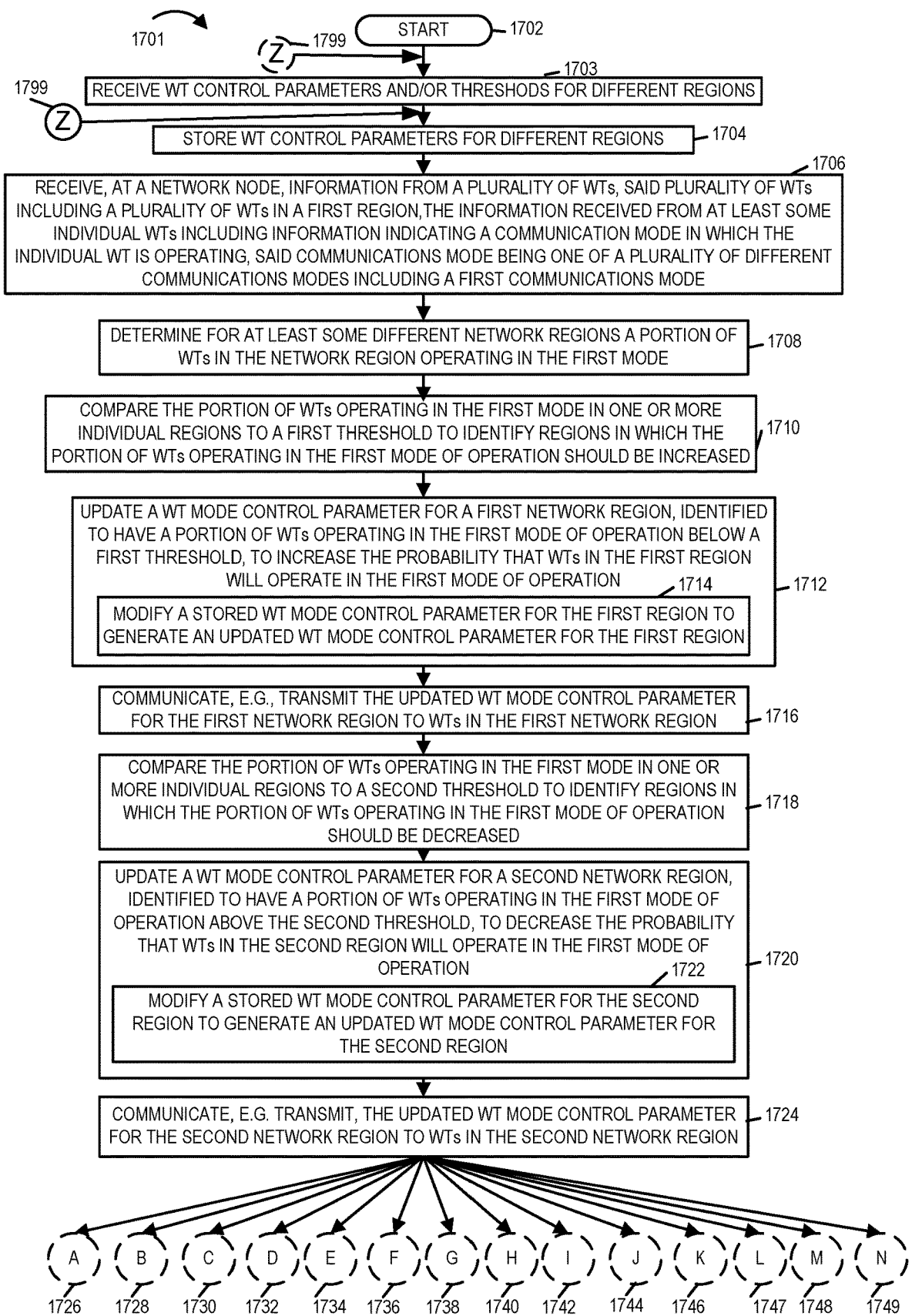
FIG. 17A shows a first part of a diagram showing the steps of a method, which can be implemented by a network node, in accordance with the invention.

FIG. 17A shows a first part of a diagram showing the steps of a method, which can be implemented by a network node, in accordance with the invention.

Figure 17B:
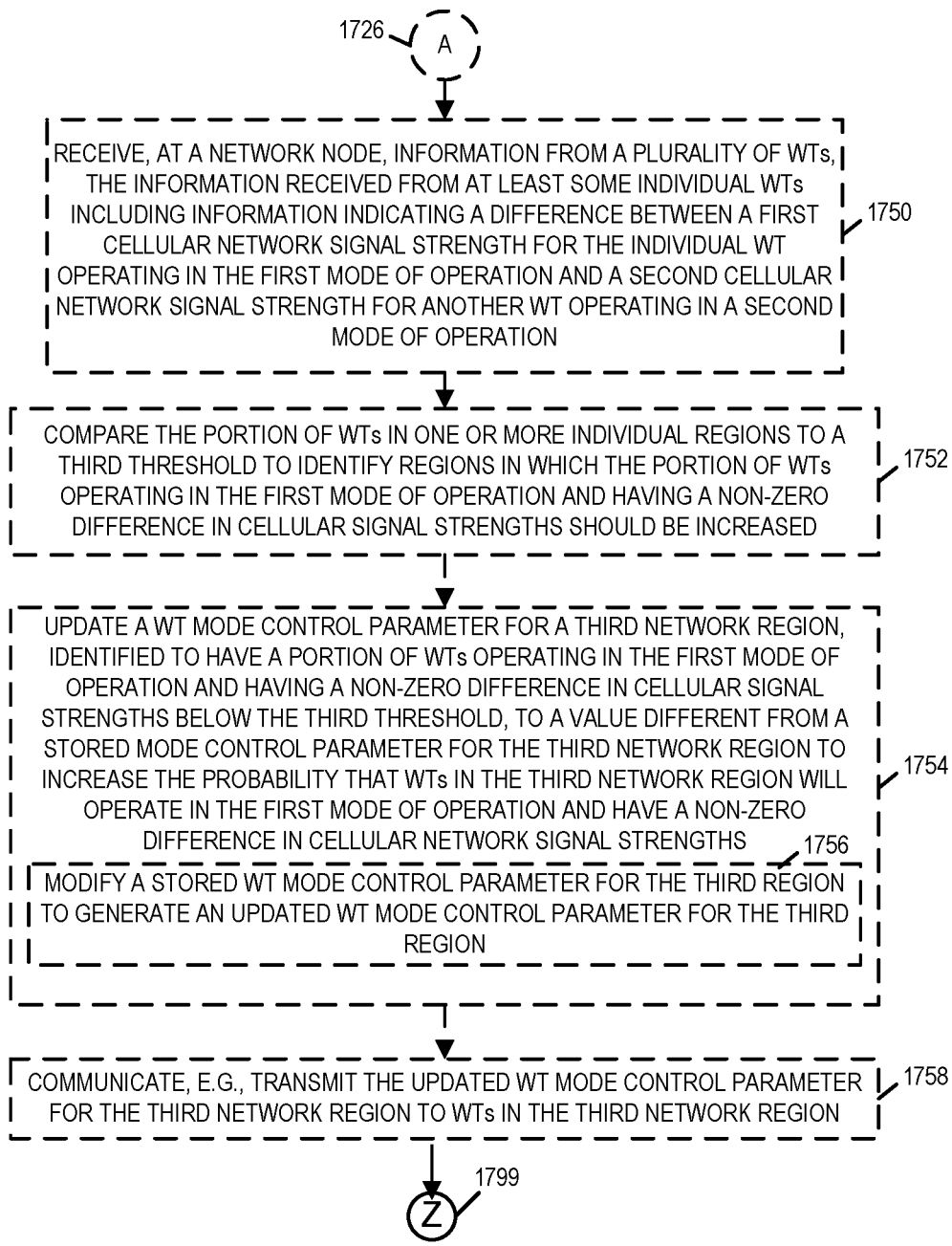
FIG. 17B shows a second part of a diagram showing the steps of a method, which can be implemented by a network node, in accordance with the invention.

FIG. 17B shows a second part of a diagram showing the steps of a method, which can be implemented by a network node, in accordance with the invention.

Figure 17C:
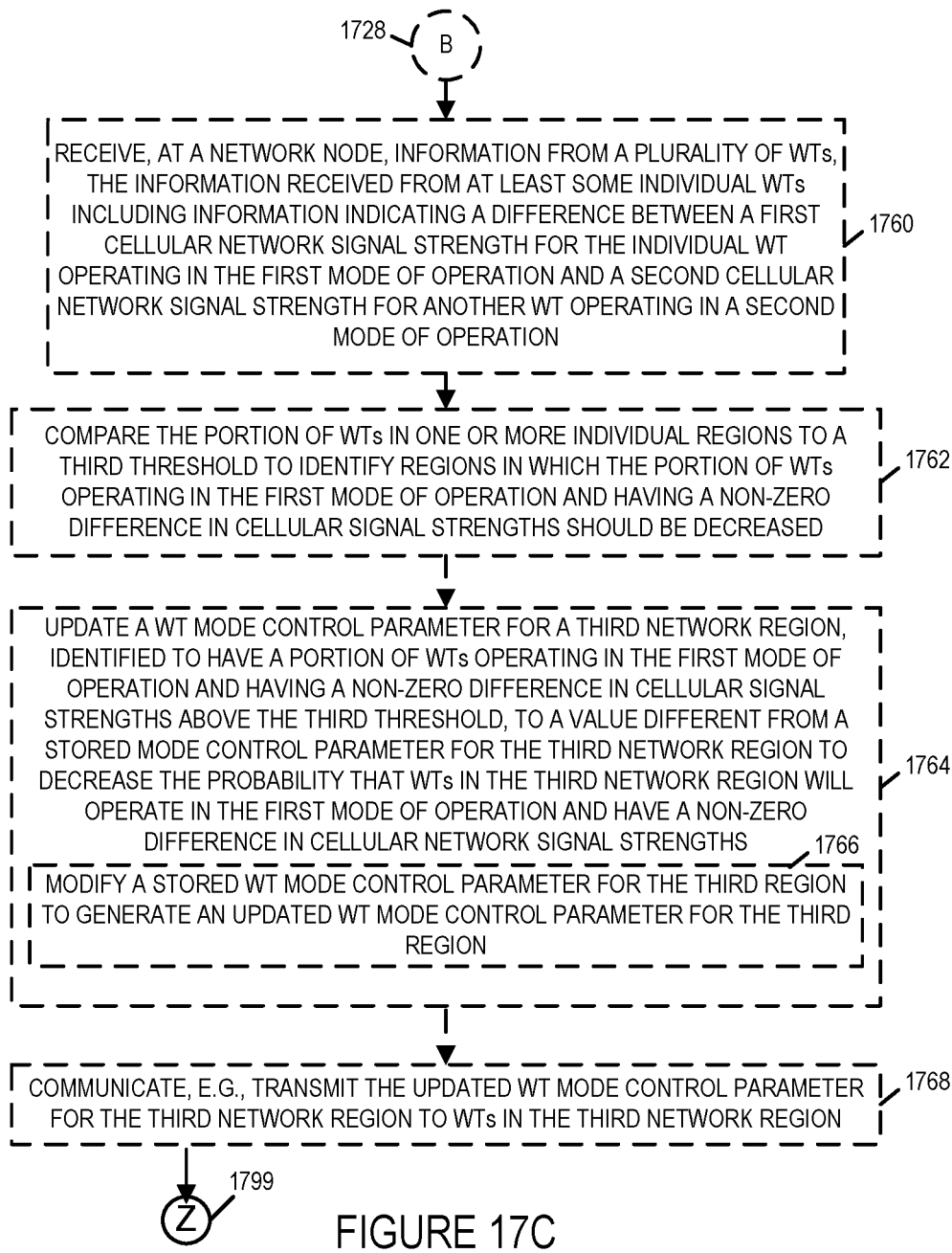
FIG. 17C shows a third part of a diagram showing the steps of a method, which can be implemented by a network node, in accordance with the invention.

FIG. 17C shows a third part of a diagram showing the steps of a method, which can be implemented by a network node, in accordance with the invention.

Figure 17D:
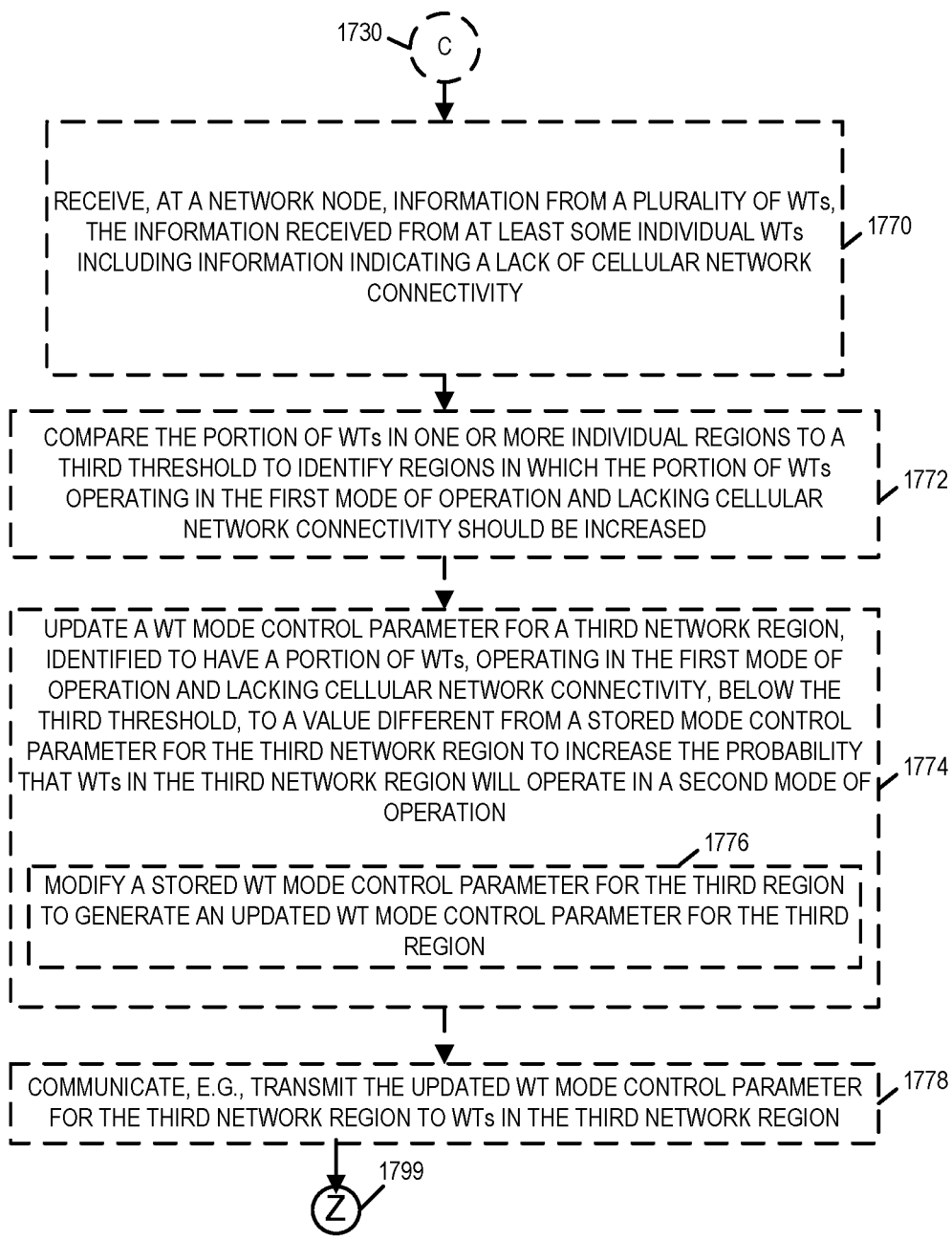
FIG. 17D shows a fourth part of a diagram showing the steps of a method, which can be implemented by a network node, in accordance with the invention.

FIG. 17D shows a fourth part of a diagram showing the steps of a method, which can be implemented by a network node, in accordance with the invention.

Figure 17E:
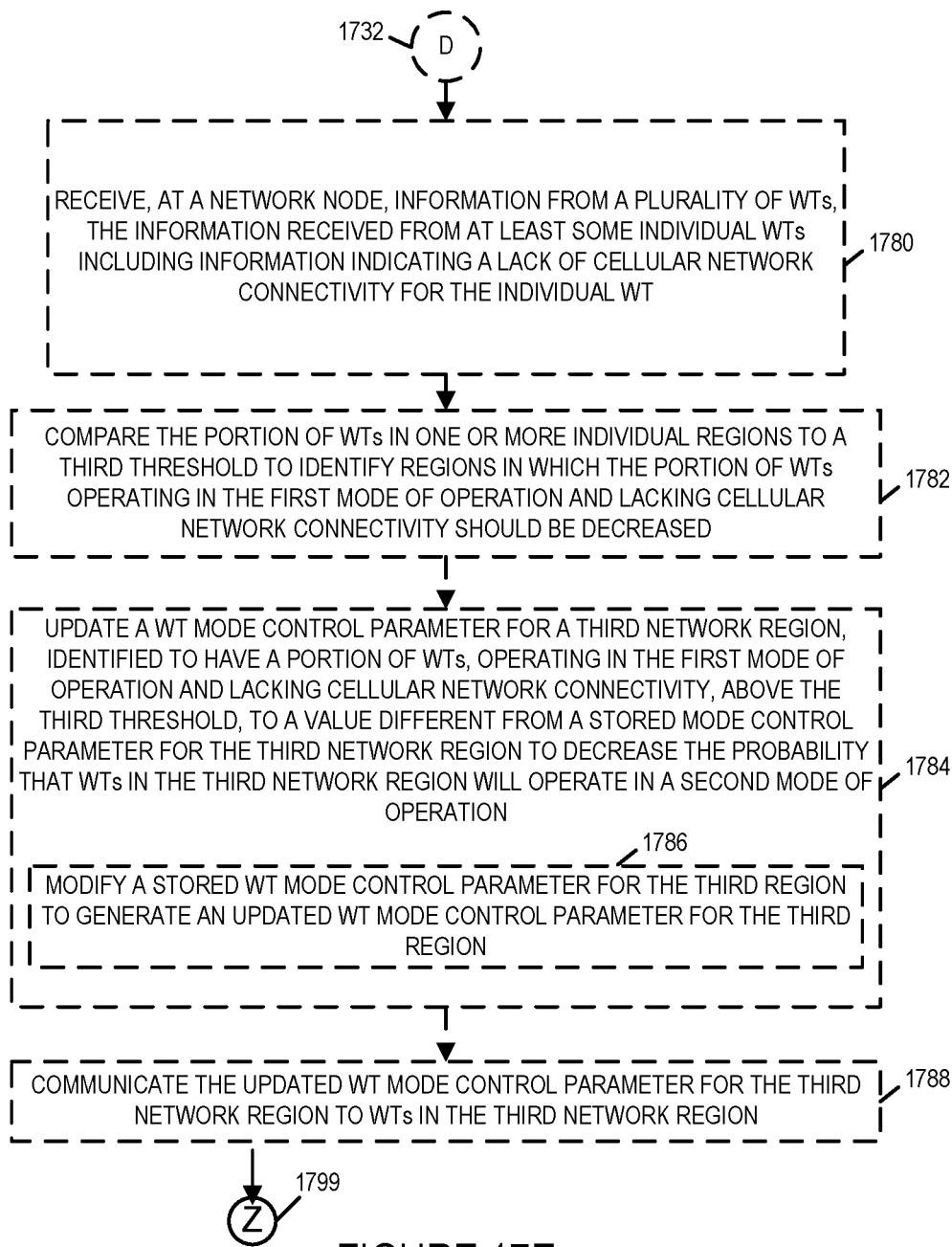
FIG. 17E shows a fifth part of a diagram showing the steps of a method, which can be implemented by a network node, in accordance with the invention.

FIG. 17E shows a fifth part of a diagram showing the steps of a method, which can be implemented by a network node, in accordance with the invention.

Figure 17F:
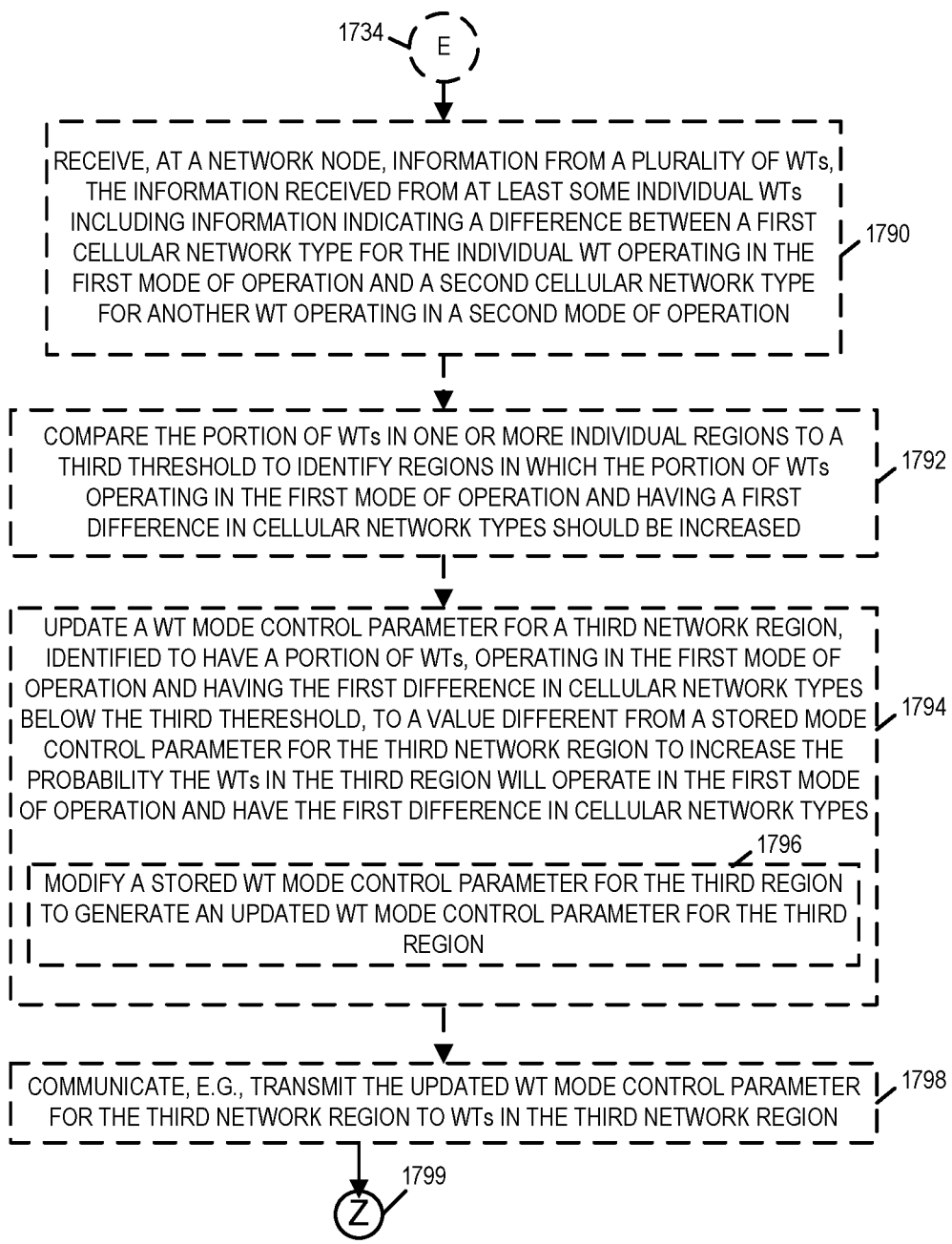
FIG. 17F shows a sixth part of a diagram showing the steps of a method, which can be implemented by a network node, in accordance with the invention.

FIG. 17F shows a sixth part of a diagram showing the steps of a method, which can be implemented by a network node, in accordance with the invention.

Figure 17G:
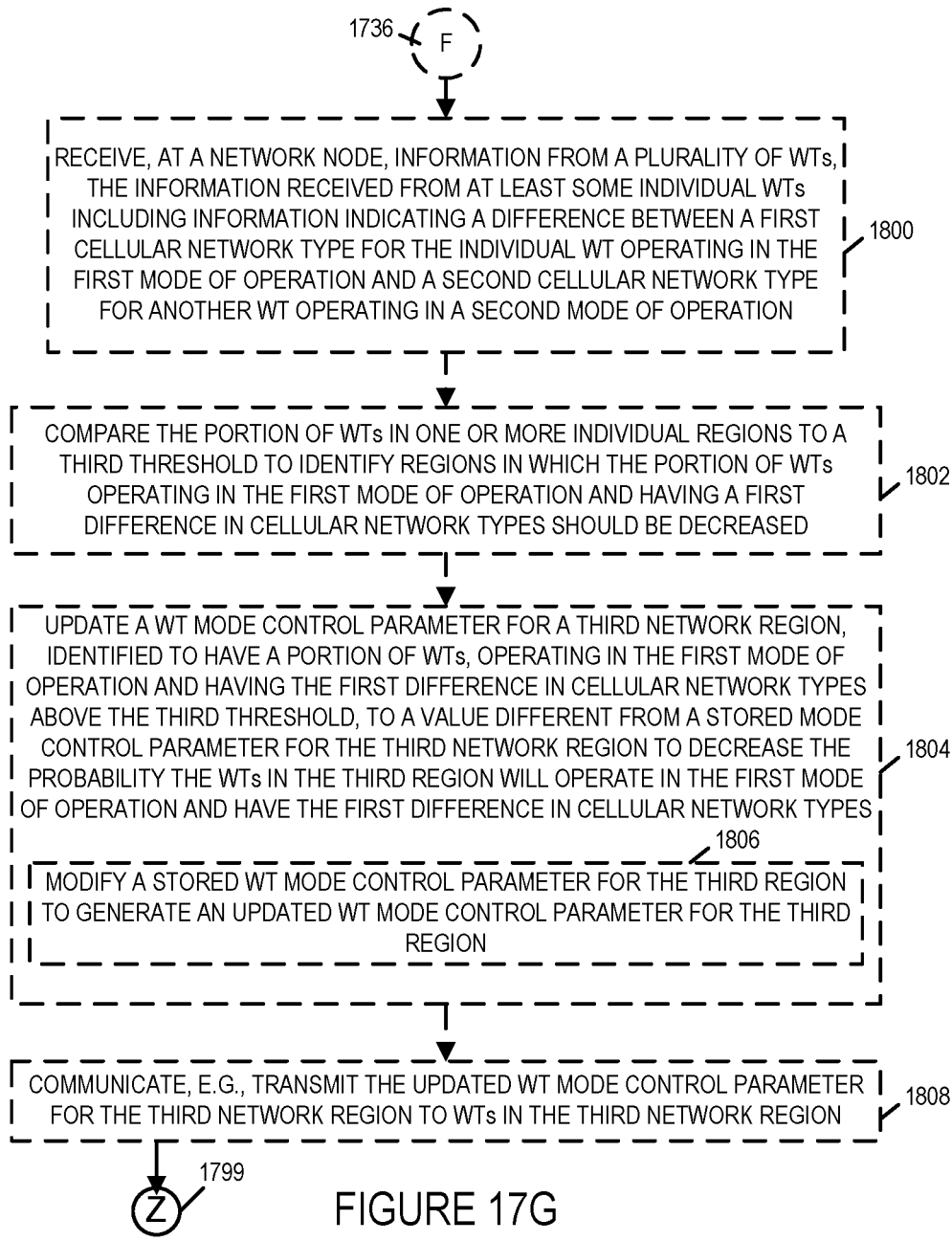
FIG. 17G shows a seventh part of a diagram showing the steps of a method, which can be implemented by a network node, in accordance with the invention.

FIG. 17G shows a seventh part of a diagram showing the steps of a method, which can be implemented by a network node, in accordance with the invention.

FIG. 17H shows an eight part of a diagram showing the steps of a method, which can be implemented by a network node, in accordance with the invention.

Figure 17I:
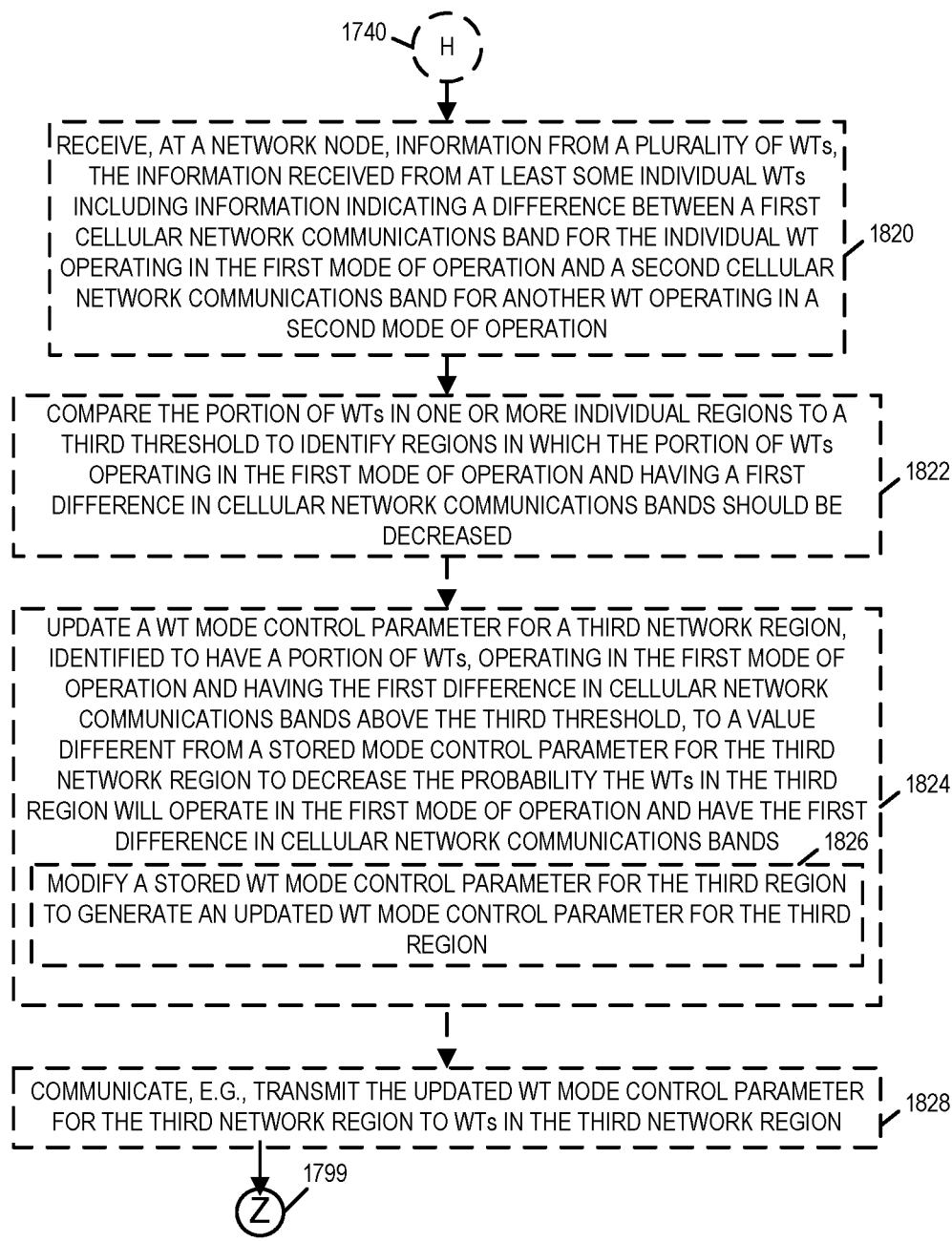
FIG. 17I shows a ninth part of a diagram showing the steps of a method, which can be implemented by a network node, in accordance with the invention.

FIG. 17I shows a ninth part of a diagram showing the steps of a method, which can be implemented by a network node, in accordance with the invention.

Figure 17J:
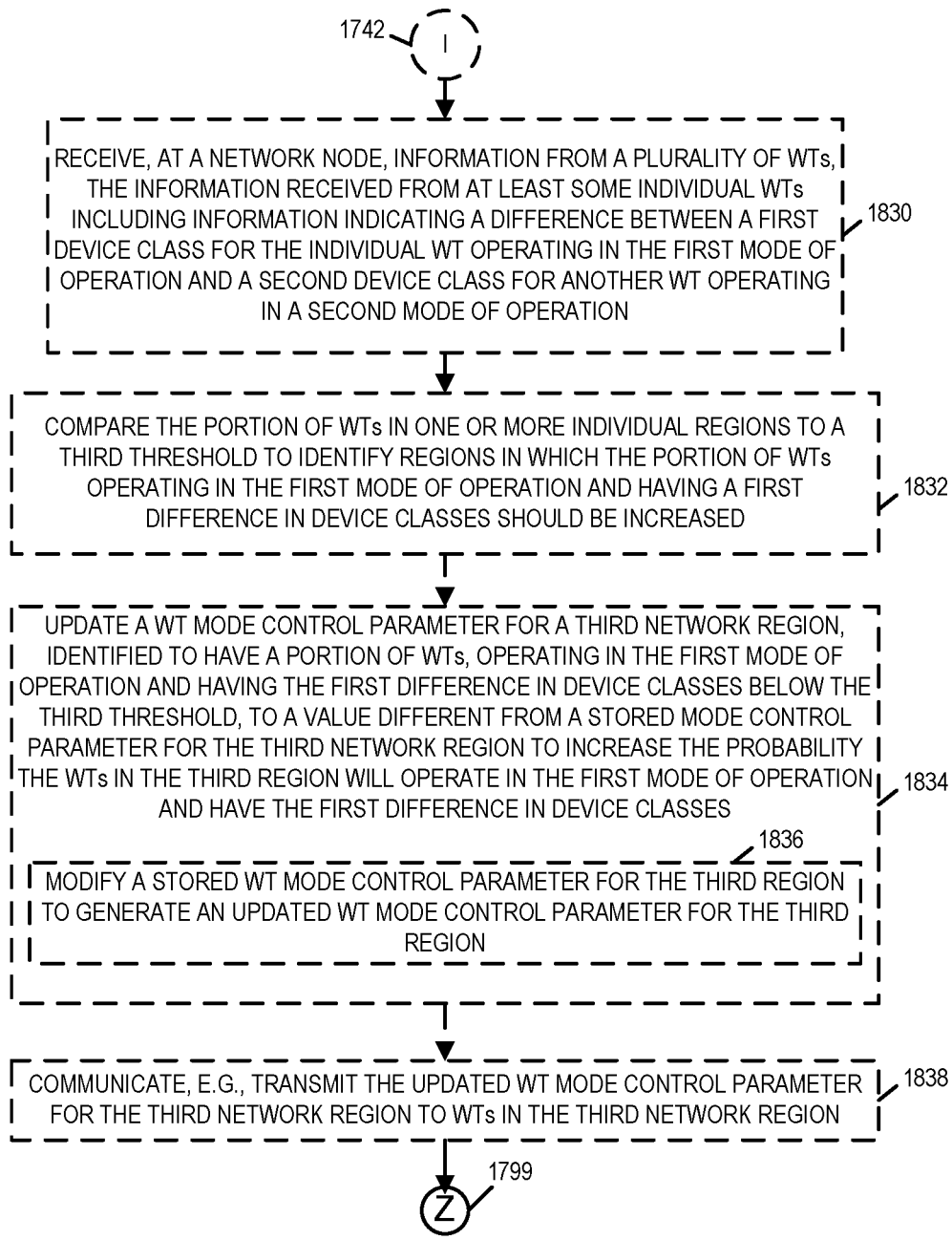
FIG. 17J shows a tenth part of a diagram showing the steps of a method, which can be implemented by a network node, in accordance with the invention.

FIG. 17J shows a tenth part of a diagram showing the steps of a method, which can be implemented by a network node, in accordance with the invention.

Figure 17K:
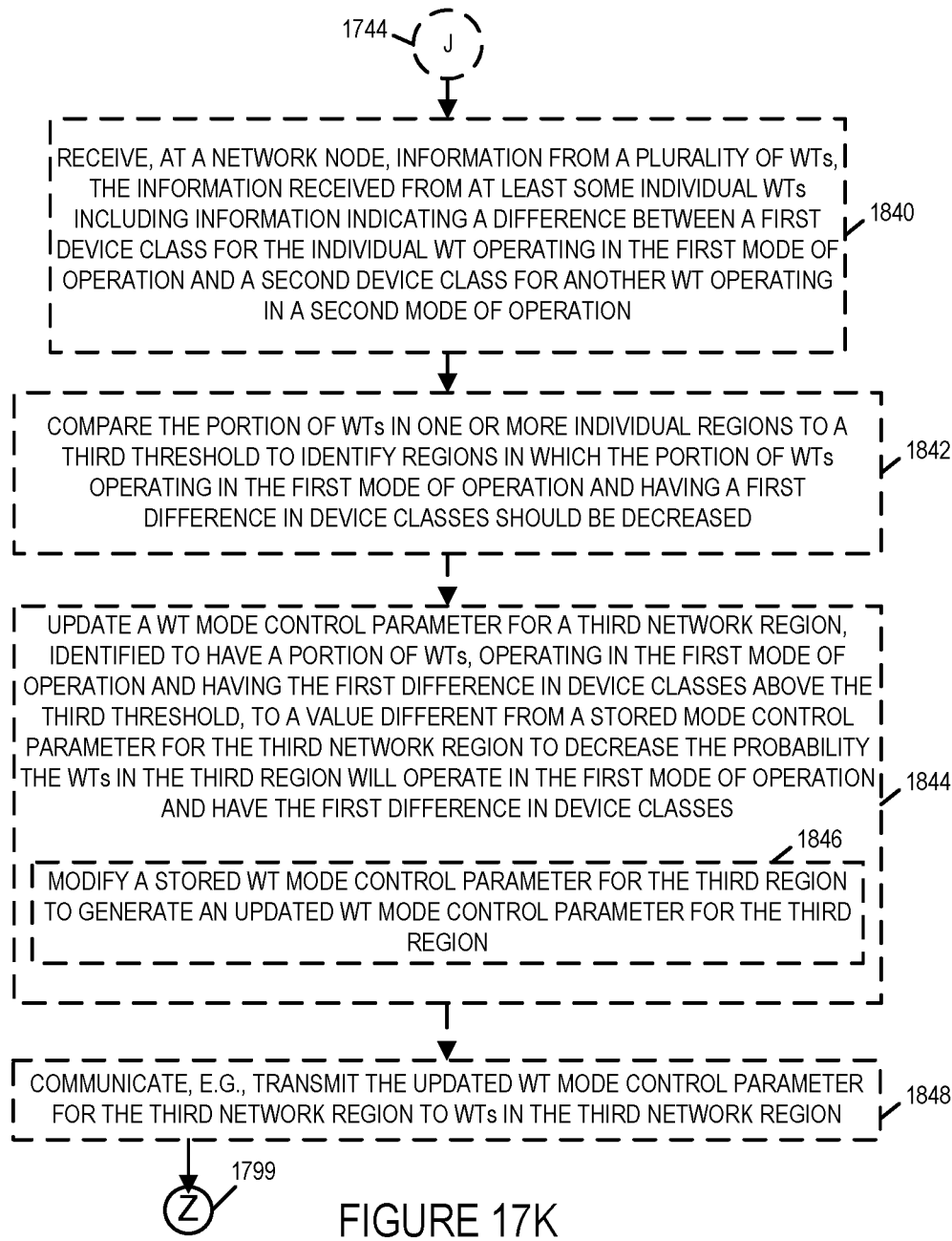
FIG. 17K shows an eleventh part of a diagram showing the steps of a method, which can be implemented by a network node, in accordance with the invention.

FIG. 17K shows an eleventh part of a diagram showing the steps of a method, which can be implemented by a network node, in accordance with the invention.

Figure 17L:
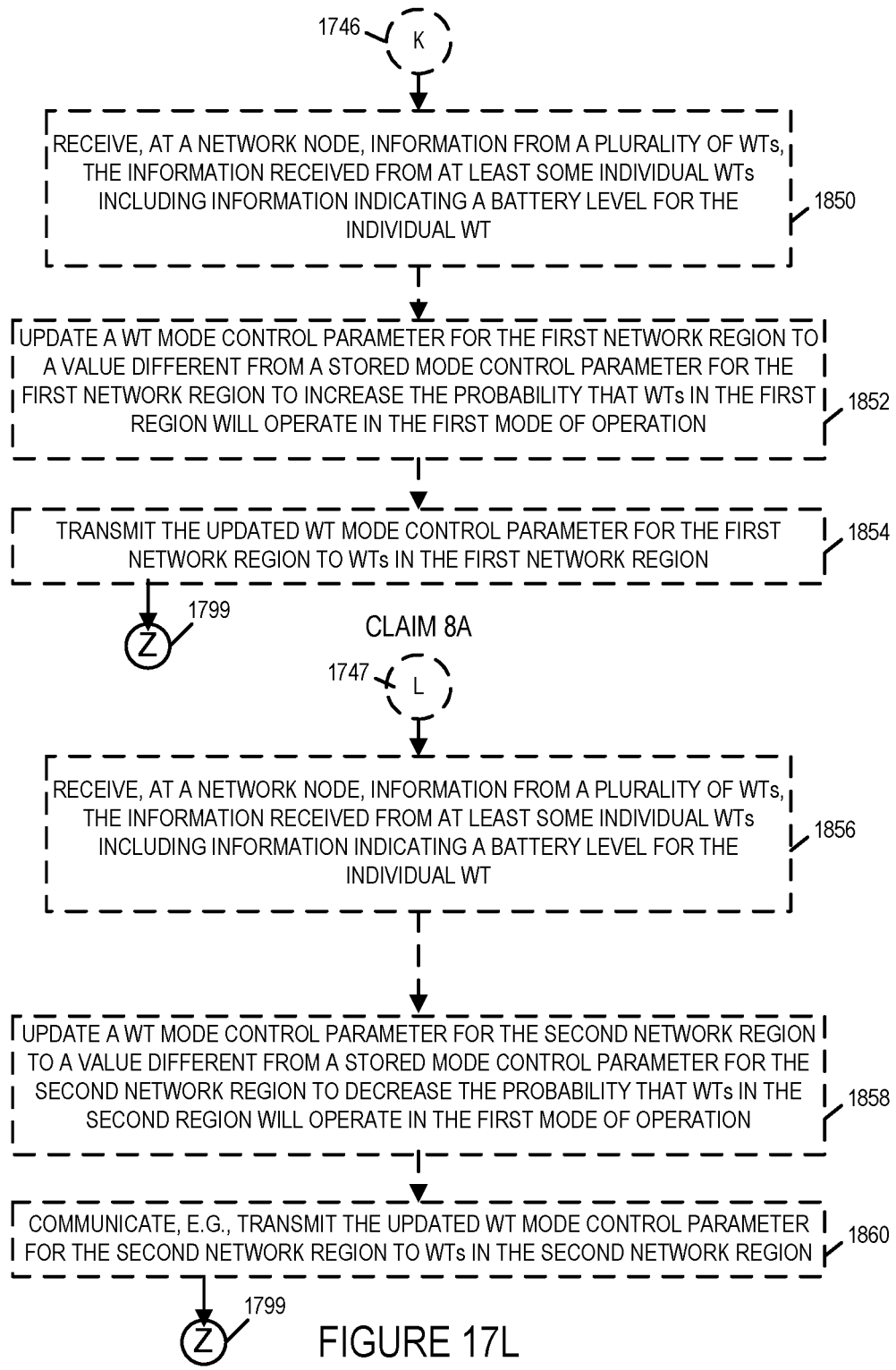
FIG. 17L shows a twelfth part of a diagram showing the steps of a method, which can be implemented by a network node, in accordance with the invention.

FIG. 17L shows a twelfth part of a diagram showing the steps of a method, which can be implemented by a network node, in accordance with the invention.

FIG. 17M shows a thirteenth part of a diagram showing the steps of a method, which can be implemented by a network node, in accordance with the invention.

FIG. 17 is a diagram shows how FIGS. 17A through 17M can be combined to form a flow chart showing the steps of the exemplary method, which can be implemented by a network node, in accordance with the invention. The network node implementing the method 1700 can be any one of the devices shown in the other figures including, for example, network node 2100 shown in FIG. 20, the cellular base station 203, a gateway or relay or even a WT which is assigned the task of acting as a network control device.

The method 1700 begins in start step 1702 with the network node implementing the method being powered on and being controlled by the processor in the node to implement the steps of them method, e.g., under control of instructions store in memory in the network node as the instructions are executed by the processor in the network node.

Operation proceeds from start step 1702 to step 1703 in which WT control parameters and/or thresholds for different regions of the communications network, e.g., first, second and third thresholds discussed below, are received. The parameter and/thresholds may be initial default values at the start of the process but maybe updated values provided by a human operator providing input to the control node as time progresses and the system continues to control or influence the communications network over time, e.g., by communicating updated parameter values to WTs in one or more regions. The parameters are stored in step 1704, e.g., in the network nodes memory. The parameters are stored on a per region basis. While multiple regions may use the same initial set of parameters over time the parameters for each region maybe and sometimes are changes based on the information corresponding to each region that is received by the control node and/or to achieve a particular localized balance of WTs operating in particular modes of operation in a particular region.

In some cases where the parameters received and then stored in step 1704 are initial parameters, the same parameters are preloaded onto WTs or transmitted to WTs in the region in which they are to be used so that the WTs and the control node have a common understanding of the parameters in use at a given time. The parameters received in step 1704 are transmitted to the WTs either via a base station or directly from the network node operating as a control device when the parameters to be used are different from parameters which were previously supplied to the WTs or in cases where the parameters were not previously supplied. Thus by the end of step 1704 both the WTs and the network node have, stored in memory, the current set of parameters to be used for WTs in each of the regions under control of the network node implementing the method 1700.

The method proceeds from step 1704 to step 1706. In step 1706 information is received at the network node implementing the method from a plurality of WTS, said plurality of WTs including a plurality of WTS in a first region 220 as well as information corresponding to other network regions under control of the network node, e.g., second and third regions 230, 240. The information received from at least some of the individual WTs in each region including information indicating a communication mode in which the individual WT providing the information is operating in. The indicated communication mode of operation is one of a plurality of different communications modes in which the WTs can operate. In some embodiments the different communications modes include at least a first mode of operation and a second mode of operation.

In some but not necessarily all embodiments the first mode of operation is a client or relay mode of operation in which at least some (and all in some embodiments) uplink traffic directed from the WT operating in the first mode of operation to a cellular network is transmitted via a non-cellular interface to another device for communication to the cellular network, e.g., directly via a cellular interface or via another network node, and in which at least some (but all in some embodiments) downlink traffic originating from a cellular network is received at the WT implementing the first mode of operation via a non-cellular interface in the WT.

In the first mode in some but not necessarily all embodiments downlink and uplink traffic maybe to/from the device operating in the first mode or in some cases could be traffic being relayed by the device operating in the first mode.

In addition to the first mode of operation WTs support a second mode of operation which in some embodiments is a mode of operation, e.g. a gateway mode of operation, in which all uplink traffic, directed to a cellular network, that is received by the WT operating in the second mode from another WT, is transmitted via a cellular interface in the WT and in which all downlink traffic directed to another WT and originating from a cellular network is received via the cellular interface in the WT operating in the second mode.

At the end of step 1706 the network node has information about the mode of operation of devices in one or more regions as well as other information which is reported by WTs such as battery power available to the WT, signal strength of received signals from base stations and/or APs and or other information that, as discussed above is sometimes reported by WTs. The information included in the various displayed images of WT related information shown in the present application maybe and sometime is received by the network node implementing the method 1700.

Operation proceeds from step 1706 to step 1708. In step 1708 the network node determines for at least some different network regions a portion of WTs n the network region operating in the first mode. This may and sometimes is expressed as a fraction or percent of the total number of devices in the first region, e.g., ⅕ of the devices in the first network region are operating n the first mode of operation.

Operation proceeds from step 1708 to step 1710. In step 1710 the portion of WTs operating in the first mode in each of one or more regions is compared to a first threshold to identify regions in which the portion of WTs operating in the first mode of operation should be increased. For example if the first threshold is ⅗ and it was determined that only ⅕ of the WTs were operating in the first mode the comparison would indicate that the number of WTs operating in the first mode in the first region is below the desired ⅗ level and thus a parameter should be changed to increase the number of device operating in the first mode in the first region.

Operation proceeds from step 1710 to step 1712. In step 1712 a WT mode control parameter for a first network region, identified to have a portion of WTs operating in the first mode of operation below a first threshold is changed to increase the probability that WTs in the first region will operate in the first mode of operation. The parameter maybe, e.g., a battery level parameter, signal strength parameter, SNR parameter or some other parameter used by WTs in the first region when deciding whether they should operate in the first mode of operation or another mode of operation.

In substep 1714 a stored WT mode control parameter is modified, e.g., modified, replaced or updated, to generate an updated mode control parameter for the first region which is more likely to result in WTs operating in the first mode than the mode control parameter value that was previously being used in the first region.

Operation proceeds from step 1712 to step 1716. In step 1716 the network node communicates, e.g. transmits or causes a base station or other node in the network to transmit. the updated WT mode control parameter for the first network region to WTs in the first network region.

Operation proceeds from step 1716 to step 1718 in which the network node compares the portion of WTs operating in the first mode in one or more individual regions to a second threshold to identify regions in which the portion of WTs operating in the first mode of operation should be decreased. By using different thresholds for controlling changes to increase or decrease the number of nodes operating in a particular mode of operation minor changes in the portion of devices operating in a mode need not trigger a change in a WT parameter. This reduces the risk of rapid changes in parameters as devices switch between modes of operation.

Operation proceeds from step 1718 to step 1720. In step 1720 the network nodes updates a WT control parameter for a second network region identified to have a portion of WTs operating in the first mode of operation above the second threshold to decrease the probability that WTs in the second region will operate in the first mode of operation. For example, if the second threshold was ⅘ if the second region had a portion of 4.5/5 WTs operating in the first mode a parameter would be changed to reduce the number of WTs operating in the first mode.

As part of step 1720 the network node may and sometimes does modify a stored WT mode control parameter for the second region, e.g., where the portion of WTs operating in the first mode is to be decreased, to decrease the probability that WTs in the second region will operate in the first mode of operation.

Then in step 1724 the updated WT mode control parameter for the second network region which was updated in step 1720 is communicated, e.g., transmitted, to WTs in the second region either directly from the network node or by the network node sending the updated WT parameter information to another device such as a base station for transmission to the WTs in the second region so that they can stored and use the updated parameter in mode determinations they make.

Operation proceeds from step 1724 to one or more additional steps via connecting nodes A 1726, B 1728, C 1730, D 1732, E 1734, F 1736, G 1738, H 1740, I 1742, J 1744, K 1746, L, 1747, M 1748 and/or N 1749 which can be performed sequentially or in parallel, with the path that is implemented depending in some cases on the particular embodiment and information that is received. Each of the paths will now be discussed.

Via connecting node A 1726 operation proceeds to step 1750 of FIG. 17B. In step 1750 the network node receives information from a plurality of WTs, the information from at least some individual WTs including information indicating a difference between a first cellular network signal strength for the individual WT operating in the first network mode providing the information and a second cellular network signal strength for another WT operating in the second mode of operation. Operation proceeds from step 1750 to step 1752. In step 1752 the network node compares the portion of WTs in one or more individual regions in which the portion of WTs operating in the first mode of operation and having a non-zero difference in cellular signal strengths should be increased. Operation proceeds from step 1752 to step 1754 in which the network node updates a WT mode control parameter for a third network region identified to have a portion of WTs operating in the first mode of operation and having a non-zero difference in cellular signal strength below the third threshold to a value different form a stored mode control parameter for the third network region to increase the probability that WTs in the third network region will operate in the first mode of operation and have a non-zero difference in cellular network signal strength.

As part of step 1754 step 1756 is performed in some embodiments. In step 1756 the network node modifies a stored WT mode control parameter for the third region to generate an updated WT mode control parameter for the third region.

Operation proceeds to step 1758 in which the network node communicates, e.g., transmits the updated mode control parameter or causes the updated mode control parameter generated in step 1754 to WTs in the third network region. Operation proceeds via connecting node Z 1799, e.g., back to step 1706 or alternatively step 1703 depending on the particular embodiment depending on where the return point is implemented.

Referring now to the processing path corresponding to connecting node B 1728, operation proceeds via this path to step 1760 shown in FIG. 17C. In step 1760 the network node receives information from a plurality of WTs, the information from at least some individual WTs including information indicating a difference between a first cellular network signal strength for the individual WT operating in the first network mode providing the information and a second cellular network signal strength for another WT operating in the second mode of operation. Operation proceeds from step 1760 to step 1762. In step 1762 the network node compares the portion of WTs operating in the first mode of operation and having a non-zero difference in cellular signal strengths to a third threshold to identify regions in which the portion of WTs operating in the first mode of operation and having a non-zero difference in cellular signal strengths should be decreased.

Operation proceeds from step 1762 to step 1764 in which the network node updates a WT mode control parameter for a third network region identified to have a portion of WTs operating in the first mode of operation and having a non-zero difference in cellular signal strength above the third threshold to a value different from a stored mode control parameter for the third network region to decrease the probability that WTs in the third network region will operate in the first mode of operation and have a non-zero difference in cellular network signal strength.

As part of step 1764, step 1766 is performed in some embodiments. In step 1766 the network node modifies a stored WT mode control parameter for the third region to generate an updated WT mode control parameter for the third region which is likely to result in a decreased number of WTs operating in the first mode and having a non-zero difference in cellular signal strength.

Operation proceeds to step 1768 in which the network node communicates, e.g., transmits the updated mode control parameter, or causes the updated mode control parameter generated in step 1764 to be transmitted, to WTs in the third network region. Operation proceeds via connecting node Z 1799, e.g., back to step 1706 or alternatively step 1703 depending on the particular embodiment depending on where the return point is implemented.

Referring now to the processing path corresponding to connecting node C 1730, operation proceeds via this path to step 1770 shown in FIG. 17D. In step 1770 the network node receives information from a plurality of WTs, the information from at least some individual WTs including information indicating a lack of cellular network connectivity.

Operation proceeds from step 1770 to step 1772. In step 1772 the network node compares the portion of WTs in one or more individual regions operating in the first mode of operation and lacking cellular network connectivity to a third, or in some cases a fourth, threshold to identify regions in which the portion of WTs operating in the first mode of operation and lacking cellular network connectivity should be increased.

Operation proceeds from step 1772 to step 1774 in which the network node updates a mode control parameter for a third network region identified to have a portion of WTs operating in the first mode of operation and lacking cellular network connectivity below the third threshold to a value different form a stored mode control parameter for the third network region to increase the probability that WTs in the third network region will operate in a second mode of operation. In some embodiments step 1774 includes step 1776 in which the network node modifies a stored WT mode control parameter for the third region to generate an updated WT mode control parameter for the third region.

Operation proceeds from step 1774 to step 1778 in which the network node communicates, e.g., transmits or causes the updated parameter generated in step 1774, to WTS in the third network region. Operation proceeds via connecting node Z 1799, e.g., back to step 1706 or alternatively step 1703 depending on the particular embodiment depending on where the return point is implemented.

Referring now to the processing path corresponding to connecting node D 1732, operation proceeds via this path to step 1780 shown in FIG. 17E. In step 1780 the network node receives information from a plurality of WTs, the information from at least some individual WTs including information indicating a lack of cellular network connectivity.

Operation proceeds from step 1780 to step 1782. In step 1782 the network node compares the portion of WTs operating in the first mode and lacking cellular network connectivity to another threshold, e.g., a third or forth threshold, to identify regions in which the portion of WTs operating in the first mode of operation and lacking cellular network connectivity should be decreased.

Operation proceeds from step 1782 to step 1784 in which the network node updates a parameter for a third network region identified to have a portion of WTs operating in the first mode of operation and lacking cellular network connectivity above the additional threshold to a value different from a stored mode control parameter for the third network region to decrease the probability that WTs in the third network region will operate in a second mode of operation.

In some embodiments step 1784 includes step 1786 which includes modifying a stored WT mode control parameter for the third region to generate an updated WT mode control parameter for the third region.

Operation proceeds from step 1784 to step 1788 in which the updated WT mode control parameter for the third network region generated in step 1784 is communicated to WTs in the third network region. Operation proceeds via connecting node Z 1799, e.g., back to step 1706 or alternatively step 1703 depending on the particular embodiment depending on where the return point is implemented.

Referring now to the processing path corresponding to connecting node E 1734, operation proceeds via this path to step 1790 shown in FIG. 17F. In step 1790 the network node receives information from a plurality of WTs, the information from at least some individual WTs including information indicating a difference between a first cellular network type for the individual WT operating in the first mode of operation and a second cellular network type for another WT operating in a second mode of operation.

Operation proceeds from step 1790 to step 1792. In step 1792 the network node compares the portion of WTs in one or more individual regions operating in the first mode to identify regions in which the portion of WTs operating in the first mode of operation and having a first difference in cellular network types should be increased.

Operation proceeds from step 1792 to step 1794. In step 1794 the network node updates a WT mode control parameter for a third network region identified of have a portion of WTs operating in the first mode of operation and having the first difference in cellular network types below the third threshold to a value different form a stored mode control parameter for the third network region to increase the probability the WTs in the third region will operate in the first mode of operation and have the first difference in cellular network types. In some embodiments step 1794 includes step 1794 in which the network node modifies a stored WT mode control parameter for the third region to generate an updated WT mode control parameter for the third region.

Operation proceeds from step 11794 to step 1798 in which the network node communicates the updated WT mode control parameter for the third network region to WTs in the third network region. Operation proceeds via connecting node Z 1799, e.g., back to step 1706 or alternatively step 1703 depending on the particular embodiment depending on where the return point is implemented.

Referring now to the processing path corresponding to connecting node F 1736, operation proceeds via this path to step 1800 shown in FIG. 17G In step 1800 the network node receives information from a plurality of WTs with the received information including information indicating a difference between a first cellular network type for the individual WT operating in the first mode of operation and a second cellular network type for another WT operating in a second mode of operation.

Operation proceeds from step 1800 to step 1802 in which the network node compares the portion of WTs in one or more individual regions to a third threshold to identify regions in which the portion of WTs operating in the first mode of operation and having a first difference in cellular network types should be decreased.

Operation proceeds from step 1802 to step 1804. In step 1804 the network node updates a WT mode control parameter for a third network region identified to have a portion of WTs operating in the first mode of operation and having the first difference in cellular network types above a third threshold to a value different from a stored mode control parameter for the third network region to decrease the probability of WTs in the third region will operate in the first mode of operation and have the first difference in cellular network types. In some embodiments step 1804 includes step 1806 in which the network node modifies a stored WT mode control parameter for the third region to generate an updated WT mode control parameter for the third region.

Operation proceeds from step 1804 to step 1808 in which the network node communicates the updated WT mode control parameter for the third network region to WTs in the third network region. Operation proceeds via connecting node Z 1799, e.g., back to step 1706 or alternatively step 1703 depending on the particular embodiment depending on where the return point is implemented.

Referring now to the processing path corresponding to connecting node G 1738, operation proceeds via this path to step 1810 shown in FIG. 17H. In step 1810 the network node receives information from a plurality of WTs, the received information form at least some of the individual WTs including information indicating a difference between a first cellular network communication band for the individual WT operating in the first mode of operation and a second cellular network communications band for another WT operating in a second mode of operation.

Operation proceeds from step 1810 to step 1812. In step 1812 the network node compares the portion of WTs in one or more individual regions to a third or additional threshold to identify regions in which the portion of WTs operating in the first mode of operation and having a first difference in cellular network communications bands should be increased.

Operation proceeds from step 1812 to step 1814. In step 1814 the network node updates a WT mode control parameter for a third network region identified to have a portion of WTs operating in the first mode of operation and having the first difference in cellular network communications bands below the third threshold to a value different form a stored mode control parameter for the third network region to increase the probability the WTs in the third region will operate in the first mode of operation and have the first difference in cellular network communications bands. In some embodiments step 1814 includes step 1816 in which the network node modifies a stored WT mode control parameter for the third region to generate an updated WT mode control parameter for the third region.

Operation proceeds from step 1814 to step 1818 in which the updated WT mode control parameter for the third network region generated in step 1814 is communicated to WTs in the third network region. Operation proceeds via connecting node Z 1799, e.g., back to step 1706 or alternatively step 1703 depending on the particular embodiment depending on where the return point is implemented.

Referring now to the processing path corresponding to connecting node H 1740, operation proceeds via this path to step 1820 shown in FIG. 17I. In step 1820 the network node receives information from a plurality of WTs with the received information from at least some individual WTs including information indicating a difference between a first cellular network communications band for the individual WT operating in the first mode of operation and a second cellular network communications band for another WT operating in a second mode of operation.

Operation proceeds from step 1820 to step 1822. In step 1822 the network node compares the portion of WTs in one or more individual regions to a third threshold to identify regions in which the portion of WTs operating in the first mode of operation and having a first difference in cellular network communications bands should be decreased.

Operation proceeds from step 1822 to step 1824. In step 1824 the network node updates a WT mode control parameter for a third network region, identified to have a portion of WTs operating in the first mode of operation and having the first difference in cellular network communications bands above the third threshold, to a value different form a stored mode control parameter for the third network region to decrease the probability that WTs in the third region will operate in the first mode of operation and have the first difference in cellular network communications bands.

In some embodiments step 1824 includes step 1826 in which the network node modifies a stored WT mode control parameter for the third region to generate an updated WT mode control parameter for the third region.

Operation proceeds from step 1824 to step 1828. In step 1828 the network node communicates the updated WT mode control parameter generated in step 1824 to WTs in the third network region. Operation proceeds via connecting node Z 1799, e.g., back to step 1706 or alternatively step 1703 depending on the particular embodiment depending on where the return point is implemented.

Via connecting node I 1742, operation proceeds to step 1830 shown on FIG. 17J. In step 1830, information from a plurality of WTs is received at a network node. The information received from at least some individual WTs of the plurality of WTs including information indicating a difference between a first device class for the individual WT operating in the first mode of operation and a second device class for another WT operating in a second mode of operation. Operation proceeds from step 1830 to step 1832.

In step 832, the network node compares the portion of WTs in one or more individual regions to a third threshold to identify regions in which the portion of WTs operating in the first mode of operation and having a first difference in device classes should be increased. Operation proceeds from step 1832 to step 1834.

In step 1834, the network node updates a WT mode control parameter for a third network region, identified to have a portion of WTs, operating in the first mode of operation and having the first difference in device classes below the third threshold, to a value different from a stored mode control parameter for the third network region to increase the probability that WTs in the third network region will operate in the first mode of operation and have the first difference in device classes. In some embodiments, step 1834 includes sub-step 1836.

In step 1836, the network node modifies a stored WT mode control parameter for the third network region to generate an updated WT mode control parameter for the third network region. Operation proceeds from step 1834 to step 1838.

In step 1838, the network node communicates, e.g., transmits, the updated WT mode control parameter or causes the updated mode control parameter generated in step 1836 for the third network region to WTs in the third network region. Operation proceeds from step 1838 via connection node Z 1799, e.g., back to step 1706 or alternatively step 1703 depending on the particular embodiment depending on where the return point is implemented.

Via connecting node J 1744, operation proceeds to step 1840 shown on FIG. 17K. In step 1840, the network node receives information from a plurality of WTs, the information from at least some individual WTs including information indicating a difference between a first device class for the individual WT operating in the first mode of operation and a second device class for another WT operating in a second mode of operation. Operation proceeds from step 1840 to step 1842.

In step 1842, the network node compares the portion of WTs in one or more individual regions to a third threshold to identify regions in which the portion of WTs operating in the first mode of operation and having a first difference in device classes should be decreased. Operation proceeds from step 1842 to step 1844.

In step 1844, the network node updates a WT mode control parameter for a third network region, identified to have a portion of WTs, operating in the first mode of operation and having the first difference in device classes above the third threshold, to a value different from a stored mode control parameter for the third network region to decrease the probability the WTs in the third network region will operate in the first mode of operation and have the first difference in device classes. In some embodiments, step 1844 includes sub-step 1846.

In sub-step 1846, the network node modifies a stored WT mode control parameter for the third network region to generate an updated WT mode control parameter for the third network region. Operation proceeds from step 1844 to step 1848.

In step 1848, the network node communicates, e.g., transmits, the updated WT mode control parameter for the third network region to WTs in the third network region. Operation proceeds from step 1848 via connection node Z 1799 e.g., back to step 1706 or alternatively step 1703 depending on the particular embodiment depending on where the return point is implemented.

Via connecting node K 1746, operation proceeds to step 1850 shown on FIG. 17L. In step 1850, the network node receives information from a plurality of WTs, the information from at least some individual WTs including information indicating a battery level for the individual WT. Operation proceeds from step 1850 to step 1852.

In step 1852, the network node updates a WT mode control parameter for the first network region to a value different from a stored mode control parameter for the first network region to increase the probability that WTs in the first network region will operate in the first mode of operation. Operation proceeds from step 1852 to step 1854.

In step 1854, the network node communicates, e.g., transmits, the updated WT mode control parameter for the first network region to WTs in the first network region. Operation proceeds from step 1854 via connection node Z 1799 e.g., back to step 1706 or alternatively step 1703 depending on the particular embodiment depending on where the return point is implemented.

Via connecting node L 1747, operation proceeds to step 1856 shown on FIG. 17L. In step 1856, the network node receives information from a plurality of WTs, the information from at least some individual WTs including information indicating a battery level for the individual WT. Operation proceeds from step 1856 to step 1858.

In step 1858, the network node updates a WT mode control parameter for the second network region to a value different from a stored mode control parameter for the second network region to decrease the probability that WTs in the second network region will operate in the first mode of operation. Operation proceeds from step 1858 to step 1860.

In step 1860, the network node communicates, e.g., transmits, the updated WT mode control parameter for the second network region to WTs in the second network region. Operation proceeds from step 1860 via connection node Z 1799 e.g., back to step 1706 or alternatively step 1703 depending on the particular embodiment depending on where the return point is implemented.

Via connecting node M 1748, operation proceeds to step 1862 shown on FIG. 17M. In step 1862, the network node receives information from a plurality of WTs, the information from at least some individual WTs including information indicating a power source for the individual WT. Operation proceeds from step 1862 to step 1864.

In step 1864, the network node updates a WT mode control parameter for the first network region to a value different from a stored mode control parameter for the first network region to increase the probability that WTs in the first network region will operate in the first mode of operation. Operation proceeds from step 1864 to step 1866.

In step 1866, the network node communicates, e.g., transmits, the updated WT mode control parameter for the first network region to WTs in the first network region. Operation proceeds from step 1866 via connection node Z 1799 e.g., back to step 1706 or alternatively step 1703 depending on the particular embodiment depending on where the return point is implemented.

Via connecting node N 1749, operation proceeds to step 1868 shown on FIG. 17M. In step 1868, the network node receives information from a plurality of WTs, the information from at least some individual WTs including information indicating a power source for the individual WT. Operation proceeds from step 1868 to step 1870.

In step 1870, the network node updates a WT mode control parameter for the second network region to a value different from a stored mode control parameter for the second network region to decrease the probability that WTs in the second network region will operate in the first mode of operation. Operation proceeds from step 1870 to step 1872.

In step 1872, the network node communicates, e.g., transmits, the updated WT mode control parameter for the second network region to WTs in the second network region. Operation proceeds from step 1872 via connection node Z 1799 e.g., back to step 1706 or alternatively step 1703 depending on the particular embodiment depending on where the return point is implemented.

Figure 18:
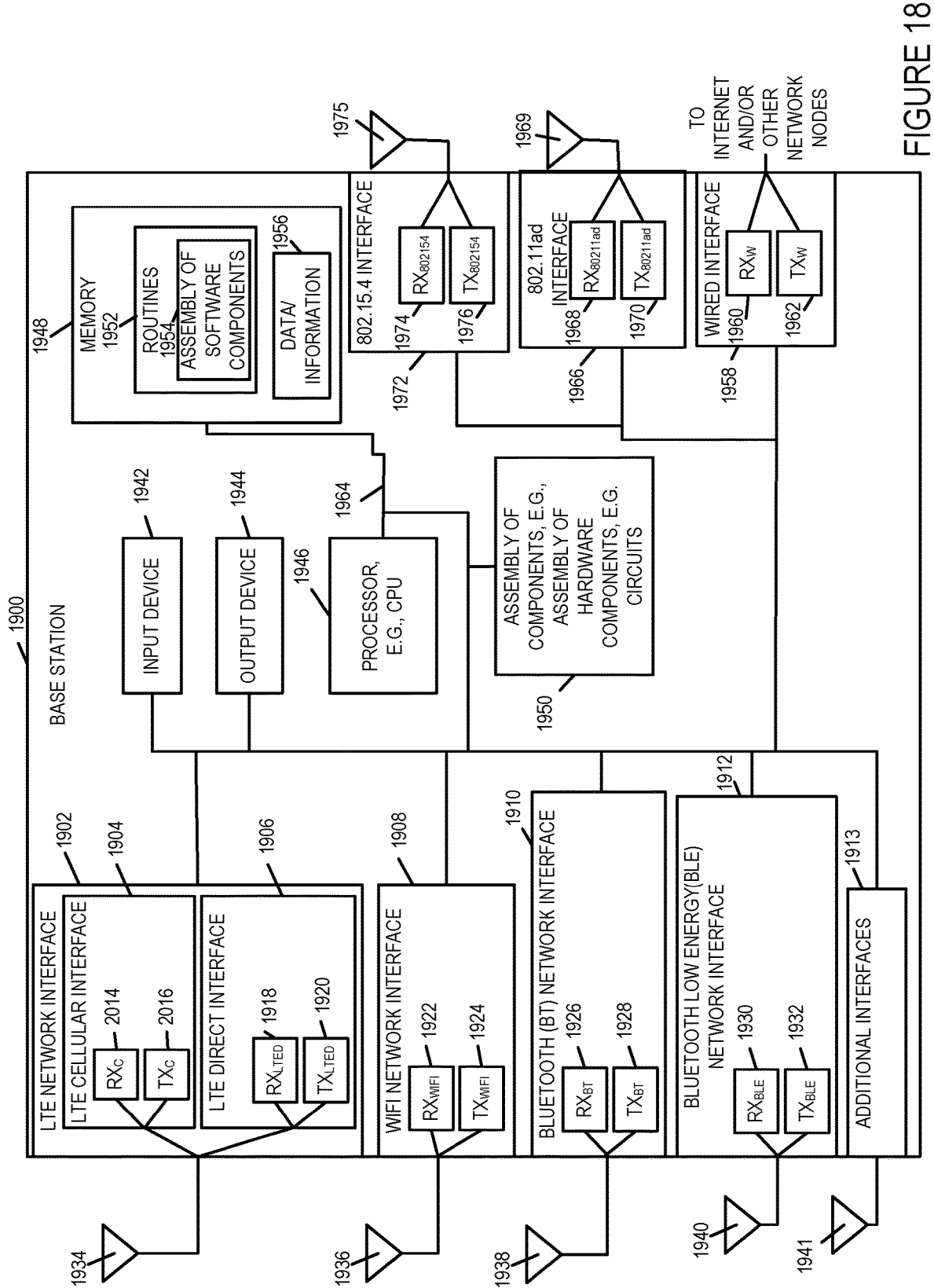
FIG. 18 shows an exemplary base station that can be used in the exemplary system of FIG. 2 in accordance with the invention.

FIG. 18 shows an exemplary base station that can be used in the exemplary system of FIG. 2 in accordance with the invention.

FIG. 18 is a drawing of an exemplary base station 1900 in accordance with various exemplary embodiments. In various embodiments, a network node, e.g., a network node implementing the steps of the flowchart 1700 of FIG. 17, communicates with WTs via base station 1900.

Exemplary base station 1900 includes an LTE network interface 1902 including a LTE cellular interface 1904 and a LTE Direct (LTED) interface 1906, a WIFI network interface 1908, a Bluetooth (BT) network interface 1910, a Bluetooth low energy (BLE) network interface 1912, additional wireless interfaces 1913, e.g., other WPAN interfaces, etc., a wired interface 1958, a 802.11ad interface 1966, a 802.15.4 interface 1972, an input device 1942, an output device 1944, a processor 1946, e.g., a CPU, a memory 1948, and an assembly of components 1950, e.g., an assembly of hardware components, e.g., circuits, coupled together via a bus 1964 over which the various elements may interchange data and information.

LTE cellular interface 1904 includes a cellular receiver (RXC) 1914 and a cellular transmitter (TXC) 1916 coupled to antenna 1934, via which base station 1900 may receive and transmit cellular wireless signals, respectively. LTE direct (LTE-D) interface 1906 includes a LTE direct receiver (RXLTED) 1918 and a LTE direct transmitter (TXLTED) 1920 coupled to antenna 1934, via which base station 1900 may receive and transmit LTE direct wireless signals, respectively.

WIFI interface 1908 includes a WIFI receiver (RXWIFI) 1922 and a WIFI transmitter (TXWIFI) 1924 coupled to antenna 1936, via which base station 1900 may receive and transmit WIFI wireless signals, respectively BT interface 1910 includes a BT receiver (RXBT) 1926 and a BT transmitter (TXBT) 1928 coupled to antenna 1938, via which device 1900 may receive and transmit BT wireless signals, respectively. BT wireless signals include BT beacons. BLE interface 1912 includes a BLE receiver (RXBLE) 1930 and a BLE transmitter (TXBLE) 1932 coupled to antenna 1940, via which device 1900 may receive and transmit BLE wireless signals, respectively. BLE wireless signals include BLE beacons. Additional interfaces 1913 include one or more receivers and one or more transmitters and is coupled to antenna 1941, via which base station 1900 may receive and transmit wireless. In some embodiments, a different number of antenna are used and/or a different antenna configuration is used, e.g., a different antenna for receive and transmit, multiple antennas for receive and multiple antennas for transmit, the same antenna or same set of antennas for different interfaces, etc. In some embodiments, different numbers of antennas are used for at least some different interfaces.

Wired interface 1958 includes a receiver RW 1960 and a transmitter TW 1962, via which base station 1900 may receive and transmit signals over the Internet and/or to other base stations, e.g., via a wired and/or fiber optic backhaul link or links. 802.11ad interface 1966 includes a receiver RX80211ad 1968 and a transmitter TX80211ad 1970, coupled to antenna 1969, via which device 1900 may receive and transmit signals, respectively.

802.15.4 interface 1972 includes a receiver RX802154 1974 and a transmitter TX802154 1976 coupled to antenna 1975 via which base station 1900 may receive and transmit signals, respectively.

Input device 1942 includes, e.g., touch screen interface, keypad, keyboard, microphone, camera, switches, monitoring sensors, etc., via which a user of device 1900 may input information and/or device 1900 may autonomously or semi autonomously collect data.

Output device 1944 includes, e.g., a display, a speaker, etc., for outputting data/information to a user of device 1900. Memory 1948 includes routines 1952 and data/information 1956. Routines 1952 include an assembly of components 1954, e.g., an assembly of software components.

Figure 19:
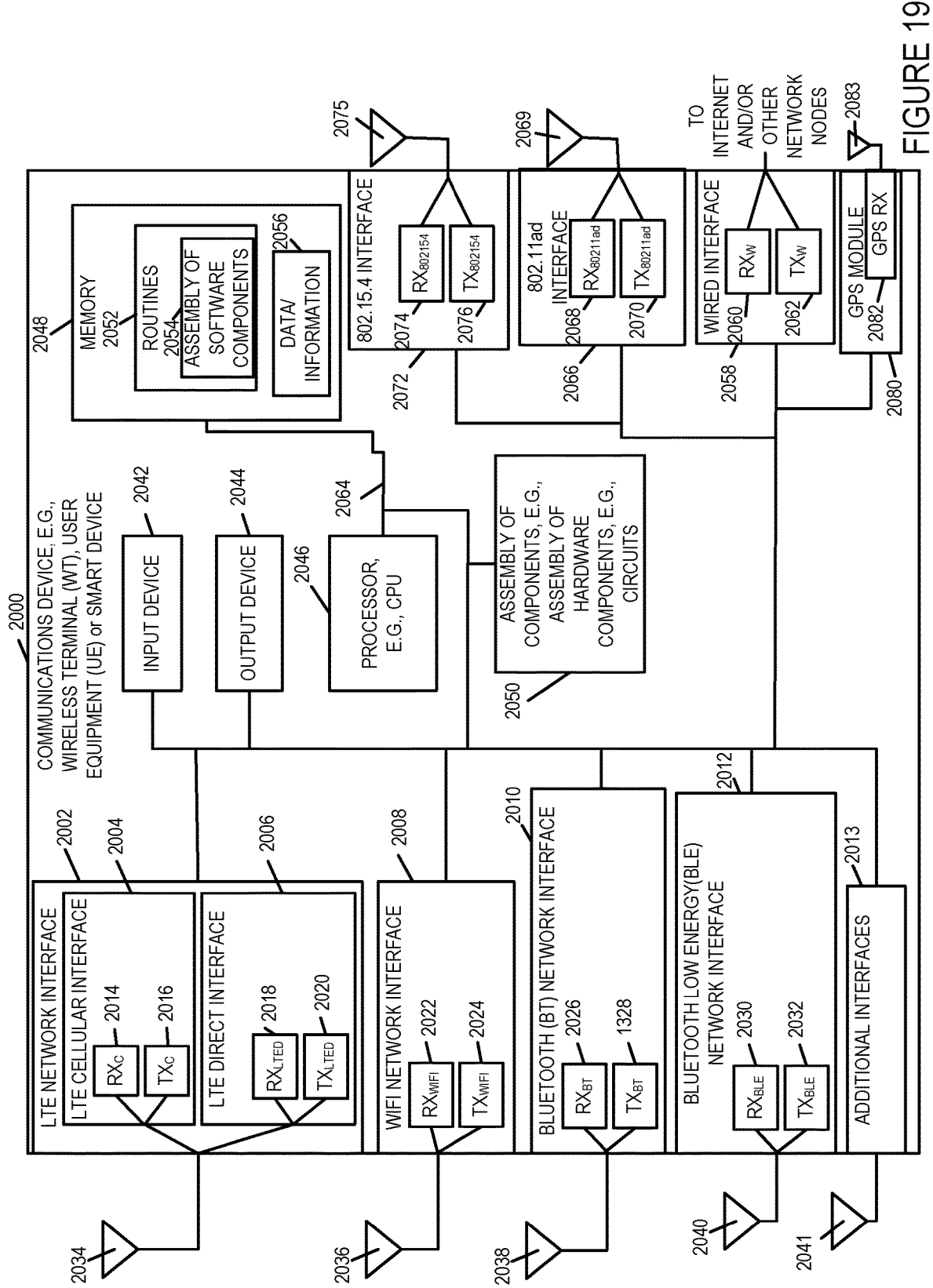
FIG. 19 shows an exemplar communications device, e.g. WT, that can be used in the exemplary system shown in FIG. 2 in accordance with the invention.

FIG. 19 is a drawing of an exemplary communications device 2000, e.g., a wireless terminal (WT), a user equipment device (UE) or a smart device, in accordance with various exemplary embodiments. In various embodiments, communications device 2000, e.g., a WT, communicates with a network node implementing steps of method 1700 of FIG. 17 via a base station.

Exemplary communications device 2000 includes an LTE network interface 2002 including a LTE cellular interface 2004 and a LTE Direct (LTED) interface 2006, a WIFI network interface 2008, a Bluetooth (BT) network interface 2010, a Bluetooth low energy (BLE) network interface 2012, additional wireless interfaces 2013, e.g., other WPAN interfaces, etc., a wired interface 2058, a 802.11ad interface 2066, a 802.15.4 interface 2072, a GPS Module 2080, an input device 2042, an output device 2044, a processor 2046, e.g., a CPU, a memory 2048, and an assembly of components 2050, e.g., an assembly of hardware components, e.g., circuits, coupled together via a bus 2064 over which the various elements may interchange data and information.

LTE cellular interface 2004 includes a cellular receiver (RXC) 2014 and a cellular transmitter (TXC) 2016 coupled to antenna 2034, via which device 2000 may receive and transmit cellular wireless signals, respectively. LTE direct (LTE-D) interface 2006 includes a LTE direct receiver (RXLTED) 2018 and a LTE direct transmitter (TXLTED) 2020 coupled to antenna 2034, via which device 2000 may receive and transmit LTE direct wireless signals, respectively.

WIFI interface 2008 includes a WIFI receiver (RXWIFI) 2022 and a WIFI transmitter (TXWIFI) 2024 coupled to antenna 2036, via which device 2000 may receive and transmit WIFI wireless signals, respectively.

BT interface 2010 includes a BT receiver (RXBT) 2026 and a BT transmitter (TXBT) 2028 coupled to antenna 2038, via which device 2000 may receive and transmit BT wireless signals, respectively. BLE interface 2012 includes a BLE receiver (RXBLE) 2030 and a BLE transmitter (TXBLE) 2032 coupled to antenna 2040, via which device 2000 may receive and transmit BLE wireless signals, respectively. Additional interfaces 2013 includes one or more receivers and one or more transmitters and is coupled to antenna 2041, via which device 2000 may receive and transmit wireless signals including beacon signals. In some embodiments, a different number of antenna are used and/or a different antenna configuration is used, e.g., a different antenna for receive and transmit, multiple antennas for receive and multiple antennas for transmit, the same antenna or same set of antennas for different interfaces, etc. In some embodiments, different numbers of antennas are used for at least some different interfaces.

Wired interface 2058 includes a receiver RW 2060 and a transmitter TW 2062, via which device 2000 may receive and transmit signals over the Internet and/or to other base stations, e.g., via a wired and/or fiber optic backhaul link or links. 802.11ad interface 2066 includes a receiver RX80211ad 2068 and a transmitter TX80211ad 2070, coupled to antenna 2069, via which device 2000 may receive and transmit signals.

802.15.4 interface 2072 includes a receiver RX802154 2074 and a transmitter TX802154 2076 coupled to antenna 2075 via which device 2000 may receive and transmit signals, respectively.

Input device 2042 includes, e.g., touch screen interface, keypad, keyboard, microphone, camera, switches, monitoring sensors, etc., via which a user of device 2000 may input information and/or device 2000 may autonomously or semi autonomously collect data.

Output device 2044 includes, e.g., a display, a speaker, etc., for outputting data/information to a user of device 2000. Memory 2048 includes routines 2052 and data/information 2056. Routines 2052 include an assembly of components 2054, e.g., an assembly of software components.

Figure 20:
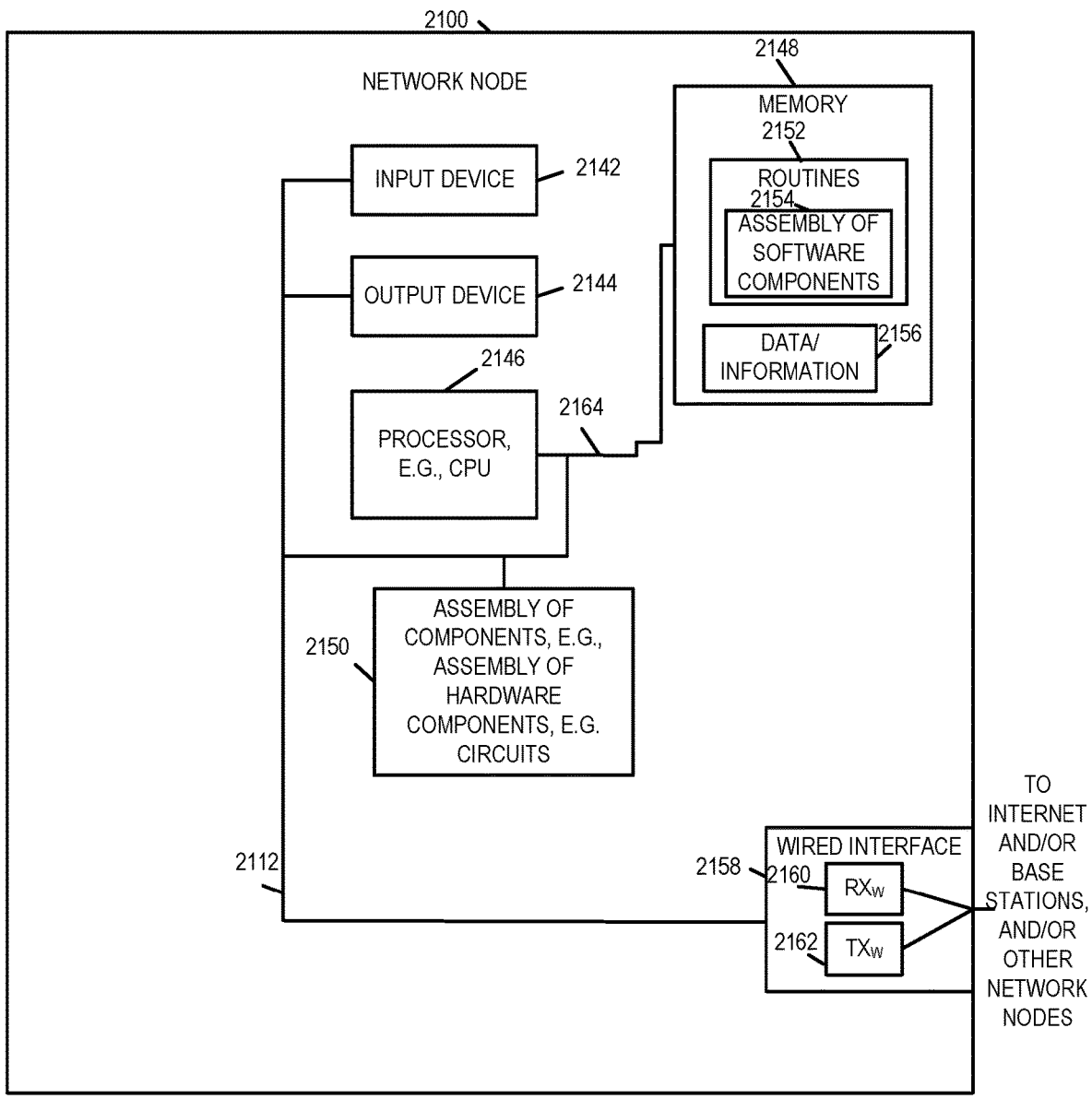
FIG. 20 illustrates an exemplary network node that can be used in the exemplary system of FIG. 2 as a control device or which can be incorporated into a base station such as the one shown in FIG. 18 in which case the control device would include both the components of the base station and the network node components shown in FIG. 20.

FIG. 20 illustrates an exemplary network node 2100 that can be used in the exemplary system of FIG. 2 as a control device or which can be incorporated into a base station such as the one shown in FIG. 18 in which case the control device would include both the components of the base station and the network node components shown in FIG. 20.

The exemplary network node 2100 in accordance with various exemplary embodiments. Exemplary network node 2100 is, e.g., a network node implementing the method of flowchart 1700 of FIG. 17.

Exemplary network node 2100 includes a wired interface 2158, an input device 2142, an output device 2144, a processor 2146, e.g., a CPU, a memory 2148, and an assembly of components 2150, e.g., an assembly of hardware components, e.g., circuits, coupled together via a bus 2164 over which the various elements may interchange data and information.

Wired interface 2158 includes a receiver RW 2160 and a transmitter TW 2162, via which network node 2100 may receive and transmit signals over the Internet to other network node, and/or to base stations, e.g., via a wired and/or fiber optic backhaul link or links. In some embodiments, network node 2100 communicates with a wireless terminals via a base station.

Input device 2142 includes, e.g., touch screen interface, keypad, keyboard, microphone, camera, switches, monitoring sensors, etc., via which a user of device 2100 may input information and/or device 2100 may autonomously or semi autonomously collect data.

Output device 2144 includes, e.g., a display, a speaker, etc., for outputting data/information to a user of device 2100. Memory 2148 includes routines 2152 and data/information 2156. Routines 2152 include an assembly of components 2154, e.g., an assembly of software components. Data/information 2156 includes, e.g., information from a plurality of WTs including information indicating a communications mode in which an individual WT is operating, thresholds, and WT control parameters.

In each of the base station 1900, communications device 2000 and network node 2100 the processor in the device controls the device to operate as described in accordance with the invention, i.e., to implement the steps described as being implemented in the present application.

In each of the following lists of numbered method or apparatus embodiments, a reference to a preceding numbered embodiment refers to an embodiment in the same list. For example a dependent embodiment in the first list refers to a preceding embodiment in the first list while a dependent embodiment in the second list refers to a preceding numbered embodiment in the second list.

First List of Numbered Exemplary Method Embodiments

Numbered Method Embodiment 1 A method of providing network management information, the method comprising: collecting, at one or more devices, a first set of operation information, said first set of operation information including at least first information indicating a first amount of data transferred by said one or more devices over a non-infrastructure network, said non-infrastructure network being a peer to peer network, and a second amount of data transferred by said one or more devices over an infrastructure network, said infrastructure network being one of a cellular network or a local area network operating in infrastructure mode; receiving, at one or more core network nodes, said first set of operation information from said one or more devices; and performing one or both of: i) determining a control parameter from said first set of operation information and communicating the control parameter to at least one wireless terminal and ii) displaying at least some of said operation information corresponding to said one or more devices on a display.

Numbered Method Embodiment 2 The method of method embodiment 1, wherein said one or more devices are mobile phones.

Numbered Method Embodiment 3 The method of method embodiment 1, wherein displaying includes displaying said at least some of said operation information corresponding to said one or more devices on a display of a terminal, a mobile phone or other devices corresponding to a service technician or network manager.

Numbered Method Embodiment 4 The method of method embodiment 1, wherein said one or more core network nodes are servers in a network management system.

Numbered Method Embodiment 5 The method of method embodiment 4, wherein said servers are analysis servers.

Numbered Method Embodiment 6 The method of method embodiment 1, wherein said second amount of data is the amount of data transferred over the cellular network and wherein the first set of operation information further includes a third amount of data which is the amount of data transferred over the local area network operating in infrastructure mode to the cellular network.

Numbered Method Embodiment 7 The method of method embodiment 6, wherein said operation information corresponding to said one or more devices further includes: information indicating a performance improvement obtained by using an indirect connection to a base station in a cellular network as an alternative to a direct cellular connection to said base station.

Numbered Method Embodiment 8 The method of method embodiment 7, wherein said indirect connection is a cellular connection obtained via at least one peer to peer hop involving non-cellular communication.

Numbered Method Embodiment 9 The method of method embodiment 8, wherein said information indicating a performance improvement is a gain value.

Numbered Method Embodiment 10 The method of method embodiment 9, further comprising: receiving geographic location information for each of the said one or more devices.

Numbered Method Embodiment 11 The method of method embodiment 10, comprising displaying the location of said one or more devices along with at least some of the corresponding operation information on a map which also illustrating the location of at least one cellular base station.

Numbered Method Embodiment 12 The method of method embodiment 11, further comprising: identifying a set of information about the network, said set of information includes at least location within the coverage area of a portion of a building where the majority of data traffic corresponding to the location is determined to be via the cellular network rather than infrastructure WiFi; making a recommendation to a cellular service provider to deploy additional infrastructure, said additional infrastructure includes a femto cellular base station, a pico cellular base station, or a distributed antenna system, in said location.

Numbered Method Embodiment 13 The method of method embodiment 12, further comprising: controlling the transmission power, resource allocation and device association of a base station or gateway based on at least some of the information included in said first set of network usage information.

Numbered Method Embodiment 14 A method of providing network management information, the method comprising: receiving, at a core network node, a first set of information corresponding to a first device, said first set of information including a device identifier and first signal information including information indicating a gain to a first cellular network attachment point of a first base station (e.g., a first sector of a base station), a gain to said first cellular network attachment obtained if an indirect connection is used to communicate to said first cellular network attachment point, and a first base station identifier corresponding to said first cellular network attachment point; receiving, at the core network node, a second set of information corresponding to a second device, said second set of information including a second device identifier and second signal information including information indicating a gain between the second device and the first cellular network attachment point of the first base station, a gain to said first cellular network attachment obtained by the second device if a indirect connection is used to communicate to said first cellular network attachment point and a first base station identifier corresponding to said first cellular network attachment point; storing the received information in memory; and generating a display of a geographic area with at least some of said received information or providing a network management recommendation based on the received information.

Numbered Method Embodiment 15 The method of method embodiment 14, wherein the second identifier identifies the node providing the information; and wherein the first cellular network attachment point of the first base station is a first sector of a cellular base station.

Numbered Method Embodiment 16 The method of method embodiment 15, wherein said core network node is server in a network management system.

Numbered Method Embodiment 17 The method of method embodiment 15, wherein said core network node is an analysis and network control server; and wherein said second device is a mobile device.

Numbered Method Embodiment 18 A method of providing network management information, the method comprising: collecting, at one or more devices, operating on a first network, a first set of operation information, said first set of operation information including a device identifier and first set of neighbor information, said first set of neighbor information including identifiers of one or more neighbor devices, operation information of said neighbor devices on a second network, information indicating gains of peer to peer connections from said one or more devices to said neighbor devices; receiving, at one or more core network nodes, said first set of operation information from said one or more devices; and generating a connectivity map of said one or more devices; and making a recommendation to one or more network attachment points of said first network to adjust their operation parameters, said operation parameters including the amount of resource allocated to said one or more devices; and making a recommendation to a cellular service provider to deploy additional infrastructure, said additional infrastructure includes a femto cellular base station, a pico cellular base station, or a distributed antenna system, in location that would improve signal quality of devices with the most number of neighbors.

Numbered Method Embodiment 19 The method of method embodiment 18, wherein said second network is a Wi-Fi network; and wherein said second network is a peer-to-peer network.

In various embodiments WTs support at least a first mode first mode of operation, e.g., a client or relay mode of operation, in which at least some (but all in some embodiments) uplink traffic directed to a cellular network is transmitted via a non-cellular interface to another device for communication to the cellular network, e.g., directly via a cellular interface or via another network node, and in which at least some (but all in some embodiments) downlink traffic originating from a cellular network is received via a non-cellular interface. For example, in the first mode in some embodiment downlink and uplink traffic maybe to/from the device operating in the first mode or in some cases could be traffic being relayed by the device operating in the first mode. In addition to the first mode of operation WTs support a second mode of operation which is a mode of operation, e.g. a gateway mode of operation, in which all uplink traffic, directed to a cellular network, that is received by the WT operating in the second mode from another WT, is transmitted via a cellular interface in the WT and in which all downlink traffic directed to another WT and originating from a cellular network is received via the cellular interface in the WT operating in the second mode.

Second List of Numbered Exemplary Method Embodiments

Numbered Method Embodiment 1 A communications method, the method comprising: receiving, at a network node, information from a plurality of WTs, the information received from at least some individual WTs including information indicating a communication mode in which the individual WT is operating, said communications mode being one of a plurality of different communications modes including a first communications mode; determining for at least some different network regions (e.g., geographic region or LAC with bad cellular signal strength maybe next to region where devices that can act as a gateway have good cellular signal strength) (a total number of WTs in the network region and) a portion of WTs in the network region operating in a first mode (e.g., client or relay mode) of operation; comparing the portion of WTs in one or more individual regions to a first threshold to identify regions in which the portion of WTs operating in the first mode of operation should be increased; and updating a WT mode control parameter for a first network region, identified to have a portion of WTs operating in the first mode of operation below the first threshold, to increase the probability that WTs in the first region will operate in said first mode of operation; and communicating (e.g., sending the updated WT mode control parameter to base stations which then transmit the parameter to WTs) the updated WT mode control parameter for the first network region to WTs in the first network region.

Numbered Method Embodiment 2. The method of Numbered Method Embodiment 1, further comprising: comparing the portion of WTs in one or more individual regions to a second threshold to identify regions in which the portion of WTs operating in the first mode of operation should be decreased; and updating a WT mode control parameter for a second network region, identified to have a portion of WTs operating in the first mode of operation above the second threshold, to decrease the probability that WTs in the second region will operate in said first mode of operation.

Numbered Method Embodiment 3. The method of Numbered Method Embodiment 1, further comprising: storing WT mode control parameters for different regions; and wherein updating the WT mode control parameter includes modifying a stored WT mode control parameter for the first network region to generate the updated WT mode control parameter for the first region.

Numbered Method Embodiment 4. The method of Numbered Method Embodiment 3, further comprising: receiving, at the network node, information from a plurality of WTs, the information received from at least some individual WTs including information indicating a difference between a first cellular network signal strength for the individual WT operating in the first mode of operation and a second cellular network signal strength for another WT operating in a second mode of operation (e.g. gateway mode); comparing the portion of WTs in one or more individual regions to a third threshold to identify regions in which the portion of WTs operating in the first mode of operation and having a non-zero difference in cellular network signal strengths should be increased; and updating a WT mode control parameter (e.g. signal gain threshold) for a third network region, identified to have a portion of WTs operating in the first mode of operation and having a non-zero difference in cellular network signal strengths below the third threshold, to a value different from a stored mode control parameter for the third network region to increase the probability that WTs in the third network region will operate in the first mode of operation and have a non-zero difference in cellular network signal strengths.

Numbered Method Embodiment 5. The method of Numbered Method Embodiment 3, further comprising: receiving, at the network node, information from a plurality of WTs, the information received from at least some individual WTs including information indicating a lack of cellular network connectivity; comparing the portion of WTs in one or more individual regions to a third threshold to identify regions in which the portion of WTs operating in the first mode of operation and lacking cellular network connectivity should be increased; and updating a WT mode control parameter (e.g. gateway signal threshold, gateway battery threshold) for a third network region, identified to have a portion of WTs operating in the first mode of operation and lacking cellular network connectivity below the third threshold, to a value different from a stored mode control parameter for the third network region to increase the probability that WTs in the third network region will operate in the first mode of operation (e.g. client mode).

Numbered Method Embodiment 6. The method of Numbered Method Embodiment 3, further comprising: receiving, at the network node, information from a plurality of WTs, the information received from at least some individual WTs including information indicating a difference between a first cellular network type for the individual WT operating in the first mode of operation and a second cellular network type for another WT operating in a second mode of operation (e.g. gateway mode) (network types are discrete→their difference is also discrete and can be enumerated); comparing the portion of WTs in one or more individual regions to a third threshold to identify regions in which the portion of WTs operating in the first mode of operation and having a first difference in cellular network types should be increased; and updating a WT mode control parameter (e.g. client signal threshold, a gateway signal threshold, client network type threshold or gateway network type threshold) for a third network region, identified to have a portion of WTs operating in the first mode of operation and having the first difference in cellular network types below the third threshold, to a value different from a stored mode control parameter for the third network region to increase the probability that WTs in the third network region will operate in the first mode of operation and have the first difference in cellular network types.

Numbered Method Embodiment 7. The method of Numbered Method Embodiment 3, further comprising: receiving, at the network node, information from a plurality of WTs, the information received from at least some individual WTs including information indicating a difference between a first cellular network communication band for the individual WT operating in the first mode of operation and a second cellular network communication band for another WT operating in a second mode of operation (e.g. gateway mode) (communication bands are discrete→their difference is also discrete and can be enumerated); comparing the portion of WTs in one or more individual regions to a third threshold to identify regions in which the portion of WTs operating in the first mode of operation and having a first difference in cellular network communication bands should be increased; and updating a WT mode control parameter (e.g. client signal threshold, gateway, signal threshold, /client network type threshold, gateway network type threshold, client communication band threshold, or gateway communication band threshold) for a third network region, identified to have a portion of WTs operating in the first mode of operation and having the first difference in cellular network communication bands below the third threshold, to a value different from a stored mode control parameter for the third network region to increase the probability that WTs in the third network region will operate in the first mode of operation and have the first difference in cellular network communication bands.

Numbered Method Embodiment 8. The method of Numbered Method Embodiment 3, further comprising: receiving, at the network node, information from a plurality of WTs, the information received from at least some individual WTs including information indicating a difference between a first device class for the individual WT operating in the first mode of operation and a second device class for another WT operating in a second mode of operation (e.g. gateway mode) (device classes are discrete→their difference is also discrete and can be enumerated); comparing the portion of WTs in one or more individual regions to a third threshold to identify regions in which the portion of WTs operating in the first mode of operation and having a first difference in device classes should be increased; and updating a WT mode control parameter (e.g., client device class threshold or gateway device class threshold) for a third network region, identified to have a portion of WTs operating in the first mode of operation and having the first difference in device classes below the third threshold, to a value different from a stored mode control parameter for the third network region to increase the probability that WTs in the third network region will operate in the first mode of operation and have the first difference in device classes.

Numbered Method Embodiment 9. The method of Numbered Method Embodiment 3, further comprising: receiving, at the network node, information from a plurality of WTs, the information received from at least some individual WTs including information indicating a battery level for the individual WT; updating a WT mode control parameter (e.g. client battery threshold or gateway battery threshold) for the first network region to a value different from a stored mode control parameter for the first network region to increase the probability that WTs in the first region will operate in the first mode of operation.

Numbered Method Embodiment 10. The method of Numbered Method Embodiment 3, further comprising: receiving, at the network node, information from a plurality of WTs, the information received from at least some individual WTs including information indicating a power source for the individual WT; updating a WT mode control parameter (e.g. client power-source threshold or gateway power-source threshold) for the first network region to a value different from a stored mode control parameter for the first network region to increase the probability that WTs in the first region will operate in the first mode of operation.

Numbered Method Embodiment 11. The method of Numbered Method Embodiment 1, wherein said first mode first mode of operation is a mode of operation (e.g., a client or relay mode of operation), in which at least some (but all in some embodiments) uplink traffic directed to a cellular network is transmitted via a non-cellular interface to another device for communication to the cellular network (e.g., directly via a cellular interface or via another network node) and in which at least some (but all in some embodiments) downlink traffic originating from a cellular network is received via a non-cellular interface (e.g., downlink and uplink traffic maybe to/from the device operating in the first mode or in some cases could be traffic being relayed by the device operating in the first mode).

Numbered Method Embodiment 12. The method of Numbered Method Embodiment 11, wherein said second mode of operation is a mode of operation (e.g. gateway mode) in which all uplink traffic, directed to a cellular network, that is received by the WT operating in the second mode from another WT, is transmitted via a cellular interface in the WT and in which all downlink traffic directed to another WT and originating from a cellular network is received via the cellular interface in the WT operating in the second mode.

Numbered Method Embodiment 13. The method of Numbered Method Embodiment 2, further comprising: storing WT mode control parameters for different regions; and wherein updating the WT mode control parameter for the second network region includes modifying a stored WT mode control parameter for the second network region to generate the updated WT mode control parameter for the second region.

Numbered Method Embodiment 14. The method of Numbered Method Embodiment 13, further comprising: receiving, at the network node, information from a plurality of WTs, the information received from at least some individual WTs including information indicating a difference between a first cellular network signal strength for the individual WT operating in the first mode of operation and a second cellular network signal strength for another WT operating in a second mode of operation (e.g. gateway mode); comparing the portion of WTs in one or more individual regions to a third threshold to identify regions in which the portion of WTs operating in the first mode of operation and having a non-zero difference in cellular network signal strengths should be decreased; and updating a WT mode control parameter (e.g. signal gain threshold) for a third network region, identified to have a portion of WTs operating in the first mode of operation and having a non-zero difference in cellular network signal strengths above the third threshold, to a value different from a stored mode control parameter for the third network region to decrease the probability that WTs in the third network region will operate in the first mode of operation and have a non-zero difference in cellular network signal strengths.

Numbered Method Embodiment 15. The method of Numbered Method Embodiment 13, further comprising: receiving, at the network node, information from a plurality of WTs, the information received from at least some individual WTs including information indicating a lack of cellular network connectivity; comparing the portion of WTs in one or more individual regions to a third threshold to identify regions in which the portion of WTs operating in the first mode of operation and lacking cellular network connectivity should be decreased; and updating a WT mode control parameter (e.g. gateway signal threshold, gateway battery threshold) for a third network region, identified to have a portion of WTs operating in the first mode of operation and lacking cellular network connectivity above the third threshold, to a value different from a stored mode control parameter for the third network region to decrease the probability that WTs in the third network region will operate in the first mode of operation (e.g., client mode).

Numbered Method Embodiment 16. The method of Numbered Method Embodiment 13, further comprising: receiving, at the network node, information from a plurality of WTs, the information received from at least some individual WTs including information indicating a difference between a first cellular network type for the individual WT operating in the first mode of operation and a second cellular network type for another WT operating in a second mode of operation (e.g., gateway mode) (network types are discrete→their difference is also discrete and can be enumerated); comparing the portion of WTs in one or more individual regions to a third threshold to identify regions in which the portion of WTs operating in the first mode of operation and having a first difference in cellular network types should be decreased; and updating a WT mode control parameter (e.g. client signal threshold, gateway signal threshold, client network type threshold or gateway network type threshold) for a third network region, identified to have a portion of WTs operating in the first mode of operation and having the first difference in cellular network types above the third threshold, to a value different from a stored mode control parameter for the third network region to decrease the probability that WTs in the third network region will operate in the first mode of operation and have the first difference in cellular network types.

Numbered Method Embodiment 17. The method of Numbered Method Embodiment 13, further comprising: receiving, at the network node, information from a plurality of WTs, the information received from at least some individual WTs including information indicating a difference between a first cellular network communication band for the individual WT operating in the first mode of operation and a second cellular network communication band for another WT operating in a second mode of operation (e.g., gateway mode) (communication bands are discrete→their difference is also discrete and can be enumerated); comparing the portion of WTs in one or more individual regions to a third threshold to identify regions in which the portion of WTs operating in the first mode of operation and having a first difference in cellular network communication bands should be decreased; and updating a WT mode control parameter (e.g., client signal threshold, gateway signal threshold, client network type threshold, gateway network type threshold, client communication band threshold, or gateway communication band threshold) for a third network region, identified to have a portion of WTs operating in the first mode of operation and having the first difference in cellular network communication bands above the third threshold, to a value different from a stored mode control parameter for the third network region to decrease the probability that WTs in the third network region will operate in the first mode of operation and have the first difference in cellular network communication bands.

Numbered Method Embodiment 18. The method of Numbered Method Embodiment 13, further comprising: receiving, at the network node, information from a plurality of WTs, the information received from at least some individual WTs including information indicating a difference between a first device class for the individual WT operating in the first mode of operation and a second device class for another WT operating in a second mode of operation (e.g., gateway mode) (device classes are discrete→their difference is also discrete and can be enumerated); comparing the portion of WTs in one or more individual regions to a third threshold to identify regions in which the portion of WTs operating in the first mode of operation and having a first difference in device classes should be decreased; and updating a WT mode control parameter (e.g. client device class threshold or gateway device class threshold) for a third network region, identified to have a portion of WTs operating in the first mode of operation and having the first difference in device classes above the third threshold, to a value different from a stored mode control parameter for the third network region to decrease the probability that WTs in the third network region will operate in the first mode of operation and having the first difference in device classes.

Numbered Method Embodiment 19. The method of Numbered Method Embodiment claim 13, further comprising: receiving, at the network node, information from a plurality of WTs, the information received from at least some individual WTs including information indicating a battery level for the individual WT; updating a WT mode control parameter (e.g. client battery threshold or gateway battery threshold) for the second network region to a value different from a stored mode control parameter for the second network region to decrease the probability that WTs in the second region will operate in the first mode of operation.

Numbered Method Embodiment 20. The method of Numbered Method Embodiment 13, further comprising: receiving, at the network node, information from a plurality of WTs, the information received from at least some individual WTs including information indicating a power source for the individual WT; updating a WT mode control parameter (e.g. client power-source threshold or gateway power-source threshold) for the second network region to a value different from a stored mode control parameter for the second network region to decrease the probability that WTs in the second region will operate in the first mode of operation.

List of Numbered Exemplary Apparatus Embodiments

Numbered Apparatus Embodiment 1. A network node, the network node comprising: memory storing mode control parameters and at least a first threshold value; a receiver; a transmitter; and a processor configured to control the network node to: receive information from a plurality of WTs, the information received from at least some individual WTs including information indicating a communication mode in which the individual WT is operating, said communications mode being one of a plurality of different communications modes including a first communications mode; determine for at least some different network regions (e.g., geographic region or LAC with bad cellular signal strength maybe next to region where devices that can act as a gateway have good cellular signal strength) (a total number of WTs in the network region and) a portion of WTs in the network region operating in a first mode (e.g., client or relay mode) of operation; compare the portion of WTs in one or more individual regions to a first threshold to identify regions in which the portion of WTs operating in the first mode of operation should be increased; update a WT mode control parameter for a first network region, identified to have a portion of WTs operating in the first mode of operation below the first threshold, to increase the probability that WTs in the first region will operate in said first mode of operation; and communicate (e.g., sending the updated WT mode control parameter to base stations which then transmit the parameter to WTs) the updated WT mode control parameter for the first network region to WTs in the first network region.

Numbered Apparatus Embodiment 2. The network node of Numbered Apparatus Embodiment 1, wherein the processor configured to control the network node to: compare the portion of WTs in one or more individual regions to a second threshold to identify regions in which the portion of WTs operating in the first mode of operation should be decreased; and update a WT mode control parameter for a second network region, identified to have a portion of WTs operating in the first mode of operation above the second threshold, to decrease the probability that WTs in the second region will operate in said first mode of operation.

Numbered Apparatus Embodiment 3. The network node of Numbered Apparatus Embodiment 1, wherein the processor configured to control the network node to: store WT mode control parameters for different regions; and wherein updating the WT mode control parameter includes modifying a stored WT mode control parameter for the first network region to generate the updated WT mode control parameter for the first region.

Numbered Apparatus Embodiment 4. The network node of Numbered Apparatus Embodiment 3, wherein the processor configured to control the network node to: receive, at the network node, information from a plurality of WTs, the information received from at least some individual WTs including information indicating a difference between a first cellular network signal strength for the individual WT operating in the first mode of operation and a second cellular network signal strength for another WT operating in a second mode of operation (e.g. gateway mode) compare the portion of WTs in one or more individual regions to a third threshold to identify regions in which the portion of WTs operating in the first mode of operation and having a non-zero difference in cellular network signal strengths should be increased; and update a WT mode control parameter (e.g. signal gain threshold) for a third network region, identified to have a portion of WTs operating in the first mode of operation and having a non-zero difference in cellular network signal strengths below the third threshold, to a value different from a stored mode control parameter for the third network region to increase the probability that WTs in the third network region will operate in the first mode of operation and have a non-zero difference in cellular network signal strengths.

Numbered Apparatus Embodiment 5. The network node of Numbered Apparatus Embodiment 3, wherein the processor configured to control the network node to: receive, at the network node, information from a plurality of WTs, the information received from at least some individual WTs including information indicating a lack of cellular network connectivity; compare the portion of WTs in one or more individual regions to a third threshold to identify regions in which the portion of WTs operating in the first mode of operation and lacking cellular network connectivity should be increased; and update a WT mode control parameter (e.g. gateway signal threshold, gateway battery threshold) for a third network region, identified to have a portion of WTs operating in the first mode of operation and lacking cellular network connectivity below the third threshold, to a value different from a stored mode control parameter for the third network region to increase the probability that WTs in the third network region will operate in the first mode of operation (e.g. client mode).

The techniques of various embodiments may be implemented using software, hardware and/or a combination of software and hardware. Various embodiments are directed to apparatus, e.g., mobile nodes such as mobile access terminals, base stations including one or more attachment points, and/or communications systems. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

At least some of the methods and apparatus of various embodiments are applicable to a wide range of communications systems including many OFDM as well as non-OFDM and/or non-cellular systems.

In some embodiments modules are implemented as circuits. In some embodiments, e.g., an all hardware embodiment, each module is implemented as a hardware circuit.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A communications method, the method comprising:
receiving, at a network node, information from a plurality of wireless terminals (WTs), the information received from at least some individual WTs of the plurality of WTs including information indicating a communications mode in which each of the individual WTs is operating, said communications mode being one of a plurality of different communications modes including a first mode of operation;
determining for at least first and second network regions a portion of WTs of the plurality of WTs in the first network region operating in the first mode of operation;
comparing the portion of WTs in the first network region to a first threshold; and
updating a WT mode control parameter for the first network region based on said comparing, wherein the portion of WTs in the first network region operating in the first mode of operation is below the first threshold; and
communicating the updated WT mode control parameter for the first network region to the WTs in the first network region to cause a number of the WTs in the first network region operating in the first mode of operation to be increased.

2. The method of claim 1, further comprising:
comparing the portion of WTs in the second network region to a second threshold; and
updating a WT mode control parameter for the second network region; and
communicating the updated WT mode control parameter for the second network region to the WTs in the second region to cause a number of the WTs in the second network region operating in said first mode of operation to be decreased.

3. The method of claim 1, further comprising:
storing WT mode control parameters for the first and second network regions; and
wherein said updating the WT mode control parameter for the first network region includes modifying a stored WT mode control parameter for the first network region to generate the updated WT mode control parameter for the first region.

4. The method of claim 3, further comprising:
updating the WT mode control parameter for the first network region based on battery level information associated with the WTs in the first network region.

5. The method of claim 3, further comprising:
updating the WT mode control parameter for the first network region based on power source information associated with the WTs in the first network region.

6. The method of claim 1, wherein said first mode of operation is a mode of operation in which at least some uplink traffic directed to a cellular network is transmitted via a non-cellular interface to another device for communication to a cellular network and in which at least some downlink traffic originating from the cellular network is received via the non-cellular interface.

7. The method of claim 6, wherein the plurality of different communications modes comprises a second mode of operation, and wherein said second mode of operation is a mode of operation in which all uplink traffic, directed to the cellular network, that is received by a WT operating in the second mode from another WT, is transmitted via a cellular interface of the WT and in which all downlink traffic directed to another WT and originating from the cellular network is received via the cellular interface in the WT operating in the second mode.

8. The method of claim 1, wherein the first mode of operation is a client mode of operation and the second mode of operation is a gateway mode of operation.

9. A network node, the network node comprising:
memory storing mode control parameters and at least a first threshold value;
a receiver;
a transmitter; and
a processor configured to control the network node to:
receive information from a plurality of wireless terminals (WTs), the information received from at least some individual WTs of the plurality of WTs including information indicating a communication mode in which each of the individual WTs is operating, said communications mode being one of a plurality of different communications modes including a first mode of operation;
determine for at least first and second network regions a portion of WTs of the plurality of WTs in the first and second network regions operating in the first mode of operation;
compare the portion of WTs in the first network region to a first threshold;
update a wireless terminal (WT) mode control parameter for the first network region based on comparing the portion of the WTs in the first network region to the first threshold, wherein the portion of WTs in the first network region operating in the first mode of operation is below the first threshold; and
cause wireless transmission of the updated WT mode control parameter for the first network region to WTs in the first network region to cause a number of the WTs in the first network region operating in the first mode of operation to be increased.

10. The network node of claim 9, wherein the processor is configured to control the network node to:
compare the portion of WTs in the first and second network regions to a second threshold, wherein the portion of the WTs in the second network region is below the second threshold; and
update a WT mode control parameter for the second network region based on comparing the portion of WTs in the second network region to the second threshold to cause a number of WTs in the second network region operating in the second mode of operation to be decreased.

11. The network node of claim 9, wherein the processor is configured to control the network node to:
store WT mode control parameters for the first and second regions; and
wherein said updating the WT mode control parameter for the first network region includes modifying a stored WT mode control parameter for the first network region to generate the updated WT mode control parameter for the first region.

12. A communications method comprising:
receiving, at a network node, information from a plurality of wireless terminals located in a network region;
determining a portion of the plurality of wireless terminals operating in a first mode of operation based on the information from the plurality of wireless terminals;
updating a wireless terminal mode parameter for the network region based on comparing the portion of the plurality of wireless terminals to a threshold; and
causing wireless transmission of the updated wireless terminal mode parameter to wireless terminals of the plurality of wireless terminals located in the network region to cause an amount of the plurality of wireless terminals located in the network region operating in the first mode of operation to be increased.

13. The communications method of claim 12, wherein the first mode of operation is a relay mode of operation.

14. The communications method of claim 12, wherein the plurality of wireless terminals located in the network region are configured to operate in a gateway mode of operation.

15. The communications method of claim 12, wherein the updated wireless terminal mode parameter includes a battery level parameter, a signal strength parameter, or a signal to noise ratio parameter.

16. The communications method of claim 12, further comprising:
determining a portion of wireless terminals located in a second network region operating in the first mode of operation;
updating a wireless terminal mode parameter for the second network region based on comparing the portion of wireless terminals located in the second network region operating in the first mode of operation to a second threshold, wherein the second threshold is different than the threshold; and
causing wireless transmission of the updated wireless terminal mode parameter for the second network region to the wireless terminals located in the second network region to cause an amount of the wireless terminals located in the second network region operating in the first mode of operation to be decreased.

17. The communications method of claim 12, further comprising:
updating a wireless terminal mode parameter for a third network region; and
causing wireless transmission of the updated wireless terminal mode parameter for the third network region to wireless terminals located in the third network region to cause an amount of the wireless terminals located in the third network region operating in the first mode of operation and having a non-zero difference in cellular network signal strength to be increased.

18. The communications method of claim 12, further comprising:
identifying a portion of wireless terminals located in a third network region lacking cellular network connectivity;
updating a wireless terminal mode parameter for a third network region based on comparing the portion of wireless terminals located in the third network region to another threshold; and
causing wireless transmission of the updated wireless terminal mode parameter to cause a number of the wireless terminals located in the third network region operating in the first mode of operation to be increased.

19. The communications method of claim 12, further comprising:
updating a wireless terminal mode parameter for a third network region; and
causing wireless transmission of the updated wireless terminal mode parameter to cause a number of wireless terminals located in the third network region operating in the first mode of operation to be increased.

20. A network node comprising:
memory storing mode control parameters and at least a first threshold value, the mode control parameters comprising a mode control parameter for a network region;
a receiver;
a transmitter; and
a processor configured to control the network node to:
  receive information associated with a plurality of wireless terminals located in the network region;
  determine a portion of the plurality of wireless terminals operating in a first mode of operation based on the information from the plurality of wireless terminals;
  update the mode control parameter for the network region stored in the memory based on a comparison of the portion of the plurality of wireless terminals with the first threshold value; and
  cause wireless transmission of the updated mode control parameter for the network region to wireless terminals of the plurality of wireless terminals located in the network region to cause an amount of the plurality of wireless terminals located in the network region operating in the first mode of operation to be increased.

\* \* \* \* \*